United States Patent [19]
Yoshimura et al.

[11] Patent Number: 5,999,670
[45] Date of Patent: Dec. 7, 1999

[54] OPTICAL DEFLECTOR, PROCESS FOR PRODUCING THE SAME, AND BLADE FOR USE IN PRODUCTION OF OPTICAL DEFLECTOR

[75] Inventors: Ryoko Yoshimura, Hitachinaka; Makoto Hikita, Mito; Satoru Tomaru, Mito; Saburo Imamura, Mito; Mitsuo Usui, Tokyo; Kosuke Katsura, Hachioaji, all of Japan

[73] Assignee: Nippon Telegraph and Telephone Corporation, Tokyo, Japan

[21] Appl. No.: 08/903,067

[22] Filed: Jul. 30, 1997

[30] Foreign Application Priority Data

Jul. 31, 1996 [JP] Japan ................................. 8-202275
Feb. 27, 1997 [JP] Japan ................................. 9-043606

[51] Int. Cl.⁶ ............................................. G02B 6/26
[52] U.S. Cl. .......................... 385/31; 385/14; 385/24; 385/38; 385/39; 385/44; 385/47; 385/48; 385/49; 385/141; 385/143; 385/145; 385/123
[58] Field of Search ................................. 385/14, 15, 18, 385/24, 31, 36, 38, 39, 44, 47, 48, 49, 123, 141, 143, 145, 147

[56] References Cited

U.S. PATENT DOCUMENTS

| 4,173,390 | 11/1979 | Kach ................................. 385/44 X |
| 4,346,961 | 8/1982 | Porter ............................... 385/44 X |
| 4,684,209 | 8/1987 | Mori ................................. 385/44 X |
| 5,305,401 | 4/1994 | Becker et al. ...................... 385/24 |
| 5,666,448 | 9/1997 | Schoenwald et al. ................ 385/44 |
| 5,757,994 | 5/1998 | Schoenwald et al. ................ 385/44 |

FOREIGN PATENT DOCUMENTS

| 0234981 | 9/1987 | European Pat. Off. ........... 385/440 X |
| 0 420 592 A2 | 9/1990 | European Pat. Off. ............. 385/14 X |
| 55-098713 | 7/1980 | Japan ................................. 385/24 X |
| 58-205117 | 11/1983 | Japan ................................. 385/53 X |
| 63-191111 | 8/1988 | Japan ................................. 385/31 X |
| 4-330406 | 11/1992 | Japan ................................. 385/44 X |
| 7-270633 | 10/1995 | Japan ................................. 385/44 X |

OTHER PUBLICATIONS

Polymer Optical Interconnect Technology (Point)—Optoelectronic Packaging and interconnect for Board and Backplane Applications Liu et al., 1996 Electronic Components and Technology Conference, pp. 308–315.

"Monomode Polymer Waveguides with Integrated Mirrors" Wiesmann et al., 22nd European Conference on Optical Communication, ECOC, 1996, Oslo, pp. 265–267.

"Parallel Optical Interconnections for Future Broad Band Systems, based on the 'Fibre in Board Technology'" Picard et al., 1996 Electronic Components and Technology Conference, pp. 264–268.

"Optical Fiber Coupling Approaches for Multi–Channel Laser and Detector Arrays" Jackson et al. SPIE vol. 994 Optoelectronic Materials, Devices, Packaging and Interconnects II (1988), pp. 40–47.

"Optical waveguide interconnections for opto–electronic mulichip modules" Takahara et al., SPIE vol. 1849 Optoelectronic Interconnects (1993) pp. 70–79.

Polymers for Integrated Optical Waveguides Booth, Polymers for Electronic and Photonic Applications, 1993 AT&T Bell Laboratories, pp. 549–598.

"Optical Mount Technology—Present and Future" Mikami et al., The Institute of Electronics, Information and Communication Engineers, Technical Report, EMD95-24, CPM95-50, OPE95-47 (1995-08), pp. 1–6.

*Primary Examiner*—Brian Healy
*Attorney, Agent, or Firm*—Venable; Robert J. Frank; Jeffrey W. Gluck

[57] ABSTRACT

An optical waveguide of an optical deflector comprising a planar optical waveguide or an optical fiber type optical waveguide is cut while perpendicularly pressing a blade having a blade tip with an angle of inclination against the optical waveguide at a desired location thereof to form an oblique end face serviceable as an oblique end face mirror.

49 Claims, 36 Drawing Sheets

OPTICAL DEFLECTOR, PROCESS FOR PRODUCING THE SAME, AND BLADE FOR USE IN PRODUCTION OF OPTICAL DEFLECTOR

BACKGROUND OF THE INVENTION

1. Field of the Invention

The present invention relates to an optical deflector comprising an optical waveguide having a deflection mechanism for use in optical communication, measurement, information processing, etc., and a process for producing the same.

2. Description of the Prior Art

Optical waveguides having such a deflection mechanism include a planar optical waveguide and a fiber optical waveguide. When the term "optical waveguide" is simply mentioned in the following description of the present invention, it is intended to encompass both of a planar optical waveguide and a fiber optical waveguide. In other cases where specific mention is necessary, one type is referred to as a "planar optical waveguide", while other type is referred to as a "fiber optical waveguide" or an "optical fiber."

A 45-degree oblique end face mirror, formed by providing a planar optical waveguide or a fiber optical waveguide with a 45-degree oblique end face, is capable of compact 90-degree deflection. Accordingly, an optical deflector comprising a planar optical waveguide provided with the above-mentioned mirror and an optical deflector comprising a fiber optical waveguide provided with the above-mentioned mirror are expected to be elements effective, for example, in providing a high level of integration of an optical module and reducing the assembling cost.

Active study and development have particularly recently been made of optical transmitter and receiver with a structure wherein arrayed surface emitting (surface sensitive) optical devices are coupled with optical waveguides disposed in horizontal directions relative to the emitting (sensitive) surface of these surface emitting (sensitive) optical devices by means of 45-degree oblique end face mirrors formed at ends of the optical waveguides in order to produce compact and inexpensive parallel optical transmitter and receiver.

Reported technologies of forming a 45-degree oblique end face mirror at an end of a planar optical waveguide include (1) a method wherein an end portion thereof is mechanically cut off obliquely with a microtome (see B. L. Booth, "Polymers for integrated optical waveguides," in Polymers for Electronic and Photonic Applications, C. P. Wong, Ed., New York: Academic, 1993, pp. 549–599), (2) a method wherein such an oblique end face mirror is formed by reactive ion etching [see H. Takahara et al, Proc. of SPIE, vol. 1849, 70–78 (1993)], (3) a laser abrasion method, and (4) a method wherein a 45-degree cut is made with a thin rotary blade [see Osamu Mikami et al, "Hikari Jisso Gijutu no Tenbo (A Review of Optical Packaging Technology)," Shingaku Giho (Shingaku Bulletin), OPE95-47 (1995–08)].

FIGS. 1 and 2 are diagrams illustrating the method (1) wherein an end portion of a planar optical waveguide is mechanically cut off obliquely with a microtome. In FIGS. 1 and 2, numeral 201 refers to a waveguide film, 202 to a blade, 203 to waveguide films having respective oblique end face mirrors formed at the ends thereof by cutting-off with the blade 202. According to the method shown in FIGS. 1 and 2, the waveguide film 201 fixed oblique by 45 degrees relative to the cut-off direction is cut off with the blade 202 to form oblique micro-mirrors (face mirrors). This method (1) is simple but involves problems such as (1-i) an inapplicability thereof to an optical waveguide formed from a rigid material such as glass and to an optical waveguide supported on a rigid substrate such as a silicon or glass substrate, (1-ii) an incapability of forming oblique end face mirrors only for some of optical waveguides formed in parallel with each other in one and the same sample, though possible for all of the optical waveguides, (1-iii) a difficulty in highly accurately positioning a location where an oblique end face mirror is formed, and (1-iv) a slight increase in reflection loss because of a limited smoothness of cut-off surfaces.

On the other hand, the method (2) wherein an oblique end face mirror is formed by reactive ion etching involves problems such as (2-i) a complicated and time-consuming step, (2-ii) a difficulty in determining etching conditions and a difficulty in forming an oblique end face mirror with a good accuracy of the angle of inclination thereof.

On the other hand, the laser abrasion method (3) involves problems such as (3-i) expensive equipment and time-consuming mirror formation, and (3-ii) a difficulty in determining etching conditions and a necessity of great alterations in mirror formation equipment and conditions for every material.

FIGS. 3 and 4 are diagrams illustrating the method (4) wherein a 45-degree cut in a planar optical waveguide is made with a rotary blade to form oblique end face mirrors. In FIGS. 3 and 4, numeral 204 refers to a substrate, 205 to a lower cladding layer, 206 to a core, 207 to an upper cladding layer, 208 to a rotary blade, and 209 to a 45-degree cut. According to this method, a sample is fixed to have the optical axis of the planar optical waveguide at an angle of 45 degrees with the rotary blade, and then cut with the rotary blade 208 at an angle of 45 degrees to form the 45-degree cut 209 in a waveguide consisting of a core and a cladding. This method (4), though advantageous in that a mirror plane excellent in smoothness can be formed by selecting a suitable blade, involves problems such as, (4-i) such a difficulty in fixing a sample as to require specially devised equipment, (4-ii) a difficulty in controlling the angle, and (4-iii) a difficulty in smoothing the oblique end faces by secondary working or processing because the oblique end faces are formed in a narrow cut groove.

On the other hand, a method (5) wherein an end face of an optical fiber is polished obliquely using a polishing machine [see K. P. Jackson et al., Proc. of SPIE, vol. 994, 40–47 (1988)] was contrived as a technology of forming a 45-degree oblique end face mirror at an end of an optical fiber. This method, though widely used due to its capability of obtaining a smooth optical mirror plane, involves problems such as (5-i) a difficulty in securing an accuracy of a position where an oblique end face mirror is formed, (5-ii) a difficulty in delicately controlling the angle of inclination of a mirror plane, (5-iii) a difficulty in polishing a number of samples at once and a low productivity because of the necessity of a long polishing time, and (5-iv) a methodological incapability of localized mirror formation midway of optical paths of a fiber sheet or a fiber board having optical fibers embedded in the sheet or board with a resin.

Meanwhile, in a surface emitting laser for ordinary use in an optical transmitter and receiver module designed to be inexpensive, an oscillation wavelength is in a 0.85 $\mu$m band. Thus, it is important that a waveguide material involves a low loss in this wavelength band. For example, a polyimide known as a heat-resistant polymeric material involves an electron transition absorption ranging from the ultraviolet region to the visible light region with a high loss of about 1 dB/cm in the 0.85 $\mu$m band. Accordingly, an optical waveguide made of a conventional material is unsuitable for use as an optical waveguide constituting an optical deflector.

As described above, conventional optical deflectors comprising an optical path of a planar optical waveguide type are problematic in respect of the method of forming an oblique end face mirror. Specifically, the method (1) wherein oblique end face mirrors are formed by a cutting-off operation involves problems such as (1-i) an inapplicability thereof to an optical waveguide formed using a rigid material or supported on a rigid substrate, (1-ii) an incapability of forming oblique end face mirrors only for some of optical waveguides formed in parallel with each other in one and the same sample, (1-iii) a difficulty in securing an accuracy of a position where oblique end face mirrors are formed, and (1-iv) a slightly high reflection loss attributed to the roughness of cut-off surfaces.

On the other hand, the method (2) wherein an oblique end face mirror is formed by reactive ion etching involves problems such as (2-i) a complicated and time-consuming step, (2-ii) a difficulty in determining conditions and a difficulty in putting the angle of inclination of an oblique end face mirror in accurate agreement with the desired angle.

On the other hand, the laser abrasion method (3) involves problems such as (3-i) expensive equipment and time-consuming mirror formation, and (3-ii) a difficulty in determining etching conditions and a necessity of great alterations in mirror formation equipment arid conditions for every material.

On the other hand, the method (4) wherein a 45-degree cut in a planar optical waveguide is made with a rotary blade to form oblique end face mirrors involves problems such as, (4-i) such a difficulty in fixing a sample as to require specially devised equipment, (4-ii) a difficulty in controlling the angle, and (4-iii) a difficulty in smoothing the oblique end faces by secondary working or processing because the oblique end faces are formed in a narrow cut groove.

On the other hand, in a conventional optical deflector comprising an optical fiber type, an oblique end face mirror is formed by oblique polishing, but the oblique polishing method (5) involves problems such as (5-i) a difficulty in securing an accuracy of a position where an oblique end face mirror is formed, (5-ii) a difficulty in delicately controlling the angle of inclination of a mirror plane, (5-iii) a difficulty in polishing a number of samples at once and a low productivity because of the necessity of a long polishing time, and (5-iv) a methodological incapability of localized mirror formation midway of optical paths of a fiber sheet or a fiber board having optical fibers embedded in the sheet or board with a resin.

SUMMARY OF THE INVENTION

An object of the present invention that has been made in view of the foregoing circumstances is to provide a process for simply and accurately forming an oblique end face (micro-mirror) with a desired angle of inclination at a desired position of a planar optical waveguide or an optical fiber constituting an optical element, and an optical deflector having a peculiar form resulting from the above-mentioned process and a capability of securing function and effect, which cannot be secured by conventional optical deflectors, due to that form.

Another object of the present invention is to provide an optical deflector formed using a material involving a small propagation loss in a 0.85 $\mu$m band, a 1.3 $\mu$m band and a 1.55 $\mu$m band for use in the fields of optical interconnection and optical communication.

A further object of the present invention is to provide a working tool necessary for producing a suitable optical deflector.

In order to attain the foregoing objects, the present invention provides an optical deflector comprising an optical waveguide provided with a deflective oblique end face having a desired angle of inclination, and having a function of deflecting an optical path of light propagated through the optical waveguide to give rise to emergence of the light out of the plane of the optical waveguide or deflecting an optical path of light incident upon the optical waveguide out of the plane of the optical waveguide to effect optical coupling thereof with the optical waveguide, while utilizing reflection on the oblique end face; characterized:

in that a plane of emergence or incidence having a slight inclination relative to a plane perpendicular to the optical axis of the optical waveguide is formed in the optical waveguide in such a way as to face the oblique end face, while forming a V-shaped groove defined by the plane of emergence or incidence and the oblique end face in the optical waveguide.

In the foregoing constitution of this optical deflector, the angle of inclination of the plane of incidence or emergence relative to a plane perpendicular to the optical axis of the optical waveguide may be 1 degree to 30 degrees. The V-shaped groove may be filled with a substance having a refractive index close to that of the core material of the optical waveguide. This substance may be a resin.

The present invention also provides another optical deflector comprising an optical waveguide provided with a deflective oblique end face having a desired angle of inclination, and having a function of deflecting an optical path of light propagated through the optical waveguide to give rise to emergence of the light out of the plane of the optical waveguide or deflecting an optical path of light incident upon the optical waveguide out of the plane of the optical waveguide to effect optical coupling thereof with the optical waveguide, while utilizing reflection on the oblique end face; characterized:

in that a plane of emergence or incidence substantially perpendicular to a plane perpendicular to the optical axis of the optical waveguide is formed in the optical waveguide in such a way as to face the oblique end face, while forming a V-shaped groove defined by the plane of emergence or incidence and the oblique end face in the optical waveguide; and in that the groove is filled with a substance having a reflective index close to that of the core material of the optical waveguide.

In the foregoing constitution of this optical deflector, the substance having a refractive index close to that of the core material of the optical waveguide may be a resin.

In the foregoing constitution, the optical waveguide may be either a planar optical waveguide or an optical fiber. The core and cladding of the optical waveguide may be made of respective glass materials. Alternatively, the core of the optical waveguide may be made of a glass material, while the cladding thereof may be made of a polymeric material. Further alternatively, the core and claddings of the optical waveguide may be made of respective polymeric materials.

In the foregoing constitution, the polymeric materials that may constitute the above-mentioned core and cladding may be respective polymers represented by the following structural formula (I), provided that the polymeric material of the cladding has a refractive index lower than that of the polymeric material of the core.

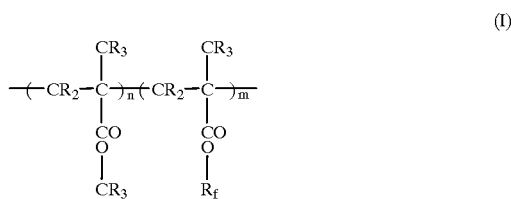

(wherein n and m stand for positive numbers satisfying the relationships: n+m=1, 0<n, and m<1; R stands for deuterium or hydrogen; $R_f$ stands for a substituent represented by $C_sF_{2s+1}$; and s is an integer of at least 1).

Alternatively, the polymeric materials that may constitute the aforementioned core and cladding may be respective epoxy resins each obtained by photo-setting one member selected from the group consisting of substances each represented by any one of the following structural formulae (II) to (IV), and mixtures thereof, provided that the polymeric material of the cladding has a refractive index lower than that of the polymeric material of the core.

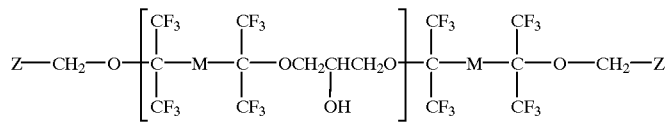

(wherein Z is

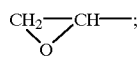

M is

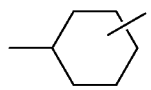

or

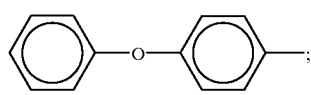

n is 0 or an arbitrary

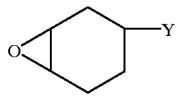
(III)

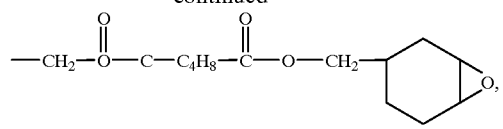
(IV)

-continued

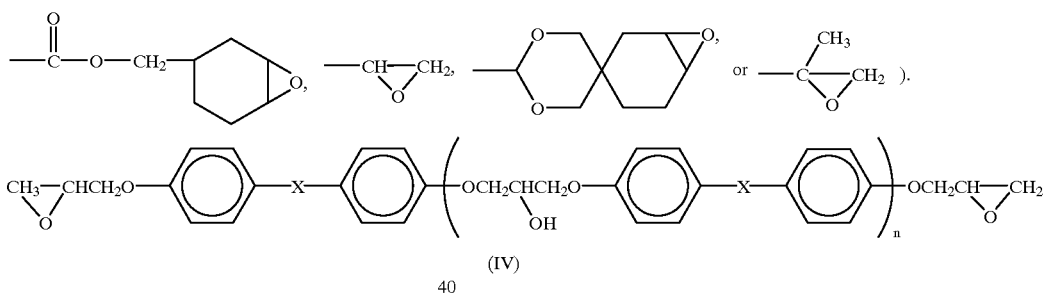

(wherein X is

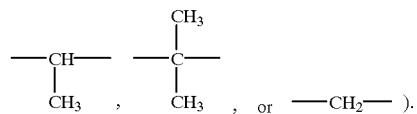

).

Further alternatively, the polymeric materials that may constitute the aforementioned core and cladding may be respective polymers selected from the group consisting of polysiloxanes having recurring units represented by the following structural formula (V) or (VI), copolymerized polysiloxanes having recurring units represented by the same structural formula (v) or (VI), and mixtures thereof, provided that the polymeric material of the cladding has a refractive index lower than that of the polymeric material of the core.

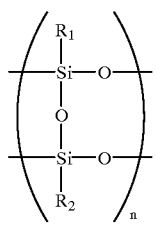

(V)

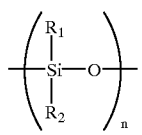

(VI)

[wherein $R_1$ and $R_2$, which may be the same as or different from each other, are each an alkyl, deuterated alkyl or halogenated alkyl group represented by $C_n Y_{2n+1}$ (wherein Y stands for hydrogen, deuterium, or a halogen; and n stands for an integer of at most 5), or a phenyl, deuterated phenyl or halogenated phenyl group represented by $C_6 Y_5$ (wherein Y stands for hydrogen, deuterium, or a halogen)]

Further, the polymeric material that may constitute the core may be a polymer represented by the aforementioned formula (I), while the polymeric material that may constitute the cladding may be an epoxy resin obtained by photo-setting one member selected from the group consisting of substances of the aforementioned structural formulae (II) to (IV), and mixtures thereof. Alternatively, the polymeric material that may constitute the core may be a polymer selected from the group consisting of polysiloxanes having recurring units represented by the following structural formula (V) or (VI), copolymerized polysiloxanes having recurring units represented by the same structural formula (V) or (VI), and mixtures thereof, while the polymeric material that may constitute the cladding may be an epoxy resin obtained by photo-setting one member selected from the group consisting of substances of the aforementioned structural formulae (II) to (IV).

The present invention further provides a process for producing an optical deflector comprising an optical waveguide provided with a deflective oblique end face having a desired angle of inclination, and having a function of deflecting an optical path of light propagated through the optical waveguide to give rise to emergence of the light out of the plane of the optical waveguide or deflecting an optical path of light incident upon the optical waveguide out of the plane of the optical waveguide to effect optical coupling thereof with the optical waveguide, while utilizing reflection on the oblique end face; characterized:

in that a blade having a blade tip set oblique by a predetermined angle at least on one side thereof is perpendicularly pressed against the optical waveguide to effect cutting thereof to thereby form a V-shaped groove having at least one inner side surface thereof serviceable as a desired oblique end face in the optical waveguide.

In the foregoing process, cutting with the blade may be done using a dicing saw machine. Further, the angle of inclination of the blade tip may be set to be smaller than the desired angle of inclination of the oblique end face with a plane perpendicular to the optical axis of the optical waveguide. Further, that angle of inclination may be set to be smaller by 0° to 2° than the desired angle of inclination of the oblique end face with a plane perpendicular to the optical axis of the optical waveguide. A diamond blade having diamond grains of 1 μm to 5 μm in average grain size may be used as the cutting blade.

In the foregoing process, the core and cladding of the optical waveguide may be made of respective glass materials. Alternatively, the core of the optical waveguide may be made of a glass material, while the cladding thereof may be made of a polymeric material. Further alternatively, the core and cladding of the optical waveguide may be made of respective polymeric materials.

The polymeric materials that may constitute the above-mentioned core and cladding may be respective polymers represented by the aforementioned structural formula (I), provided that the polymeric material of the claddings has a refractive index lower than that of the polymeric material of the core. Alternatively, the polymeric materials that may constitute the aforementioned core and cladding may be respective epoxy resins each obtained by photo-setting one member selected from the group consisting of substances of the aforementioned structural formulae (II) to (IV), and mixtures thereof, provided that the polymeric material of the cladding has a refractive index lower than that of the polymeric material of the core. Further alternatively, the polymeric materials that may constitute the aforementioned core and cladding may be respective polymers selected from the group consisting of polysiloxanes having recurring units represented by the aforementioned structural formula (V) or (VI), copolymerized polysiloxanes having recurring units represented by the same structural formula (V) or (VI), and mixtures thereof, provided that the polymeric material of the cladding has a refractive index lower than that of the polymeric material of the core. Further alternatively, the polymeric material that may constitute the core may be a polymer represented by the aforementioned formula (I), while the polymeric material that may constitute the cladding may be an epoxy resin obtained by photo-setting one member selected from the group consisting of substances of the aforementioned structural formulae (II) to (IV), and mixtures thereof. Further alternatively, the polymeric material that may constitute the core may be a polymer selected from the group consisting of polysiloxanes having recurring units represented by the aforementioned structural formula (V) or (VI), copolymerized polysiloxanes having recurring units represented by the same structural formula (V) or (VI), and mixtures thereof, while the polymeric material that may constitute the cladding may be an epoxy resin obtained by photo-setting one member selected from the group consisting of substances of the aforementioned structural formulae (II) to (IV), and mixtures thereof.

In the aforementioned process, after formation of the oblique end face, a flatiron heated at a high temperature may be pressed against the oblique end face to effect a surface smoothing treatment of the oblique end face. Alternatively, the oblique end face, after formed, may be immersed in an organic solvent to effect a surface smoothing treatment of the oblique end face. Further alternatively, the oblique end face, after formed, may be immersed in a mixed solution of hydrogen fluoride and ammonium fluoride to effect a surface smoothing treatment of the oblique end face. In the aforementioned process, the oblique end face, after formed, may be coated with a metal.

In the aforementioned process, the optical waveguide may be either a planar optical waveguide or an optical fiber.

In the aforementioned process, an end portion of the optical fiber, including a portion to be subjected to cutting, may be fixed on a planar substrate with an adhesive film, and then cut while perpendicularly pressing a blade having a blade tip thereof provided with an angle of inclination against the optical fiber. The adhesive film may be an ultraviolet-degradable adhesive film. An end portion of the optical fiber, including a portion to be subjected to cutting, may be fixed on a planar substrate with an ultraviolet-curing resin or a thermosetting resin, and then cut while perpendicularly pressing a blade having a blade tip thereof provided with an angle of inclination against the optical fiber.

The present invention further provides a blade for producing an optical deflector comprising an optical waveguide provided with a deflective oblique end face having a desired angle of inclination, and having a function of deflecting an optical path of light propagated through the optical waveguide to give rise to emergence of the light out of the plane of the optical waveguide or deflecting an optical path of light incident thereupon out of the plane of the optical waveguide to effect optical coupling thereof with the optical waveguide, while utilizing reflection on the oblique end face, the deflective oblique end face being formed by cutting using a dicing saw machine; characterized:

in that the blade has a blade tip, at least one side of which is set oblique by a predetermined angle.

In the foregoing constitution of the blade, the angle of inclination of the blade tip may be set to be smaller than the desired angle of inclination of the oblique end face with a plane perpendicular to the optical axis of the optical waveguide. Further, the angle of inclination of this blade tip may be set to be smaller by 0° to 2° than the desired angle of inclination of the oblique end face with a plane perpendicular to the optical axis of the optical waveguide. This blade may have diamond grains of 1 μm to 5 μm in average grain size as abrasive grains.

The above and other objects, effects, features and advantages of the present invention will become more apparent from the following description of embodiments thereof taken in conjunction with the accompanying drawings.

DETAILED DESCRIPTION OF PREFERRED EMBODIMENTS

The present invention will be described in more detail while referring to the accompanying drawings.

First, an example of a process for producing an optical deflector comprising planar polymer optical waveguides having a 45-degree oblique end face mirror at one end thereof will be described with reference to some drawings.

Figure 1:
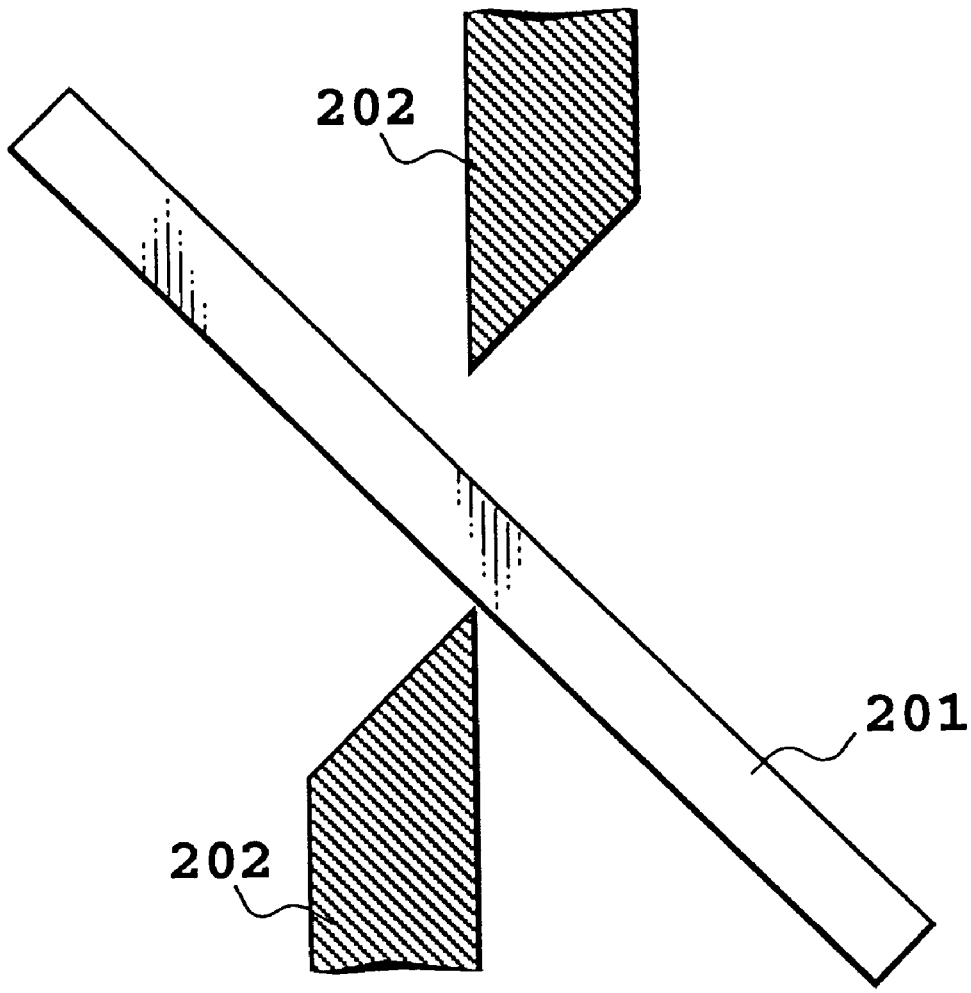
FIG. 1 is a diagram illustrating a conventional method of cutting off an end portion of an optical waveguide with a microtome.
Figure 2:
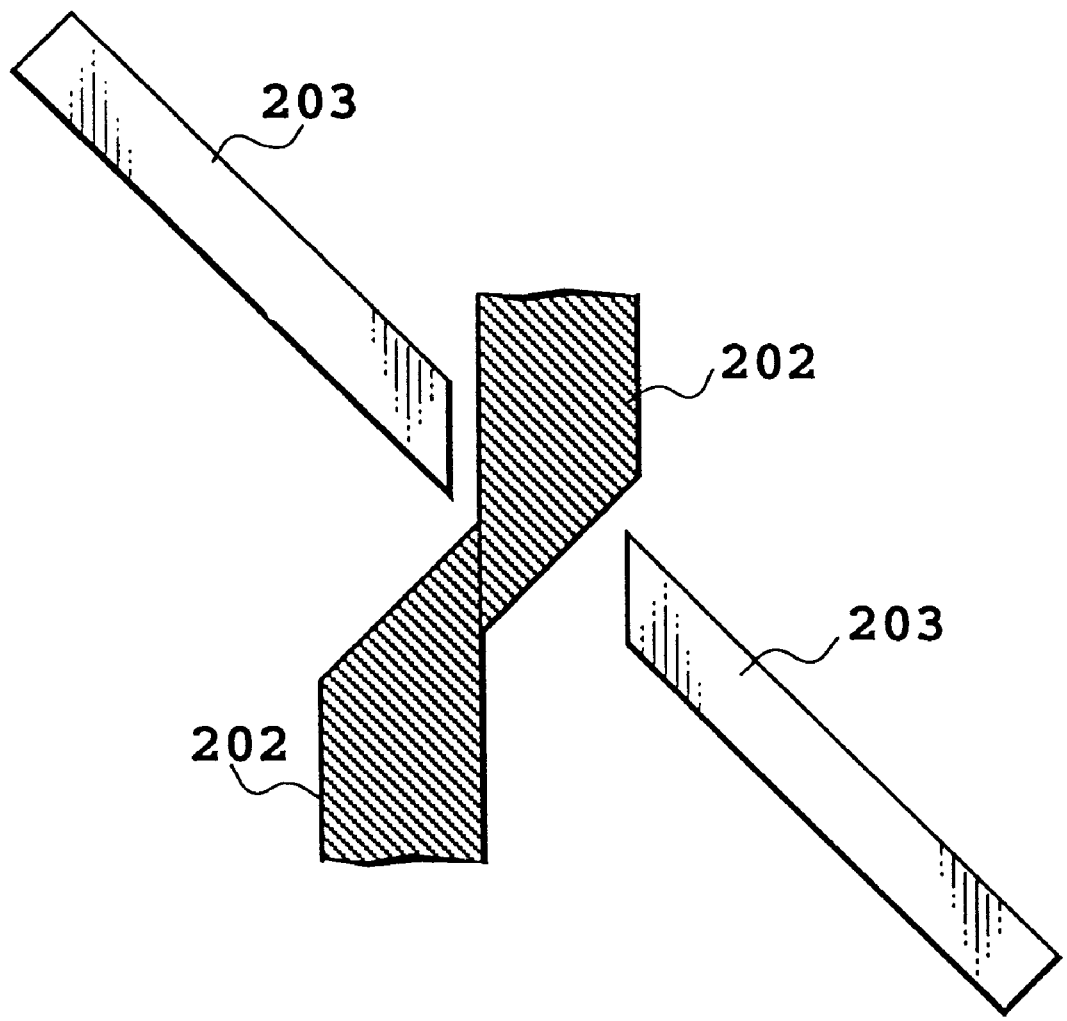
FIG. 2 is a diagram illustrating the conventional method of cutting off an end portion of an optical waveguide with a microtome.
Figure 3:
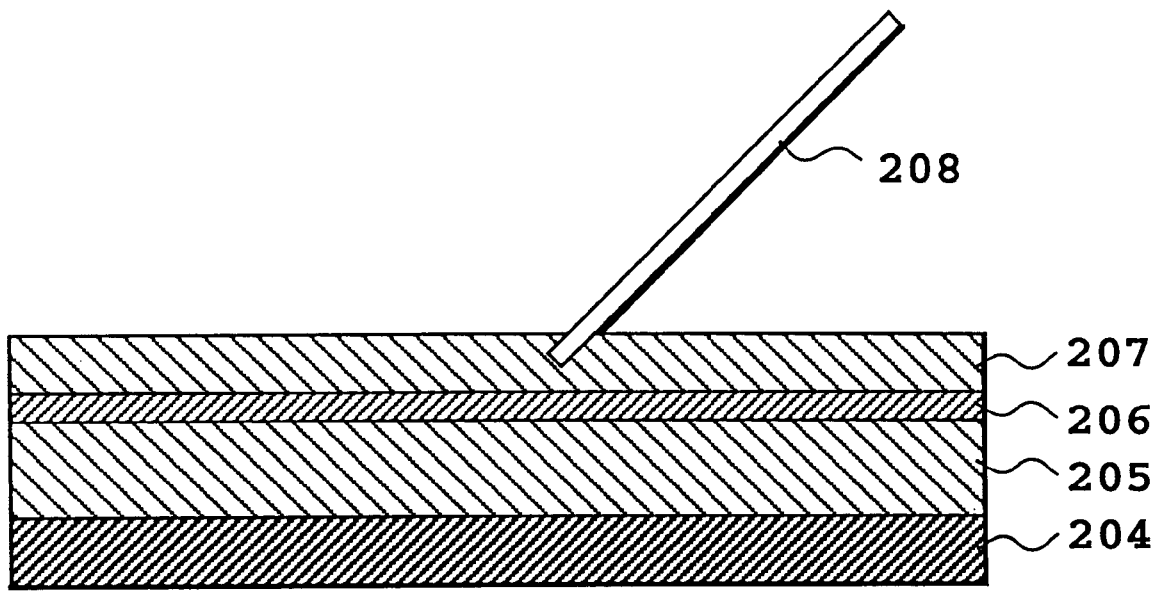
FIG. 3 is a diagram illustrating a conventional method of forming an oblique end face mirror with a rotary blade.
Figure 4:
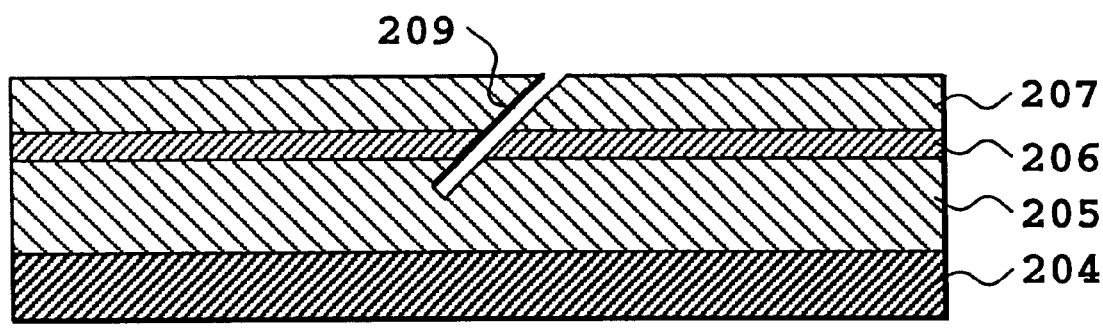
FIG. 4 is a diagram illustrating the conventional method of forming an oblique end face mirror with a rotary blade.
Figure 5:
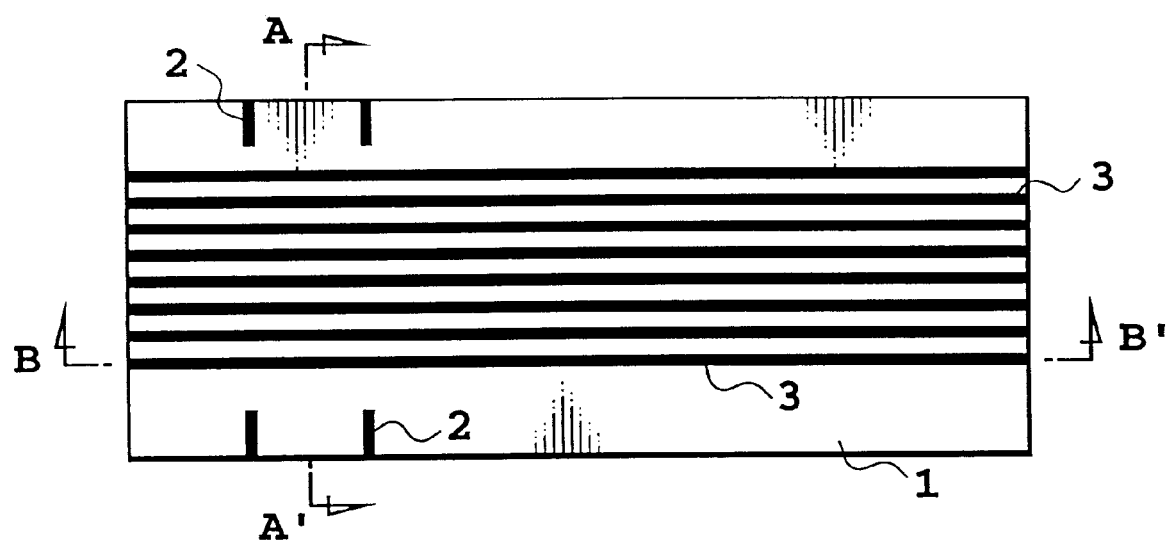
FIG. 5 is a top plan view of a polymer optical waveguide formed on a substrate.

FIG. 5 is a top plan view of planar polymer optical waveguides formed on a substrate 1. Line A–A' of FIG. 5 represents a location where oblique end face mirrors are to be formed, while registration markers 2 are incorporated near the location in the course of formation of the planar optical waveguides.

Figure 6:
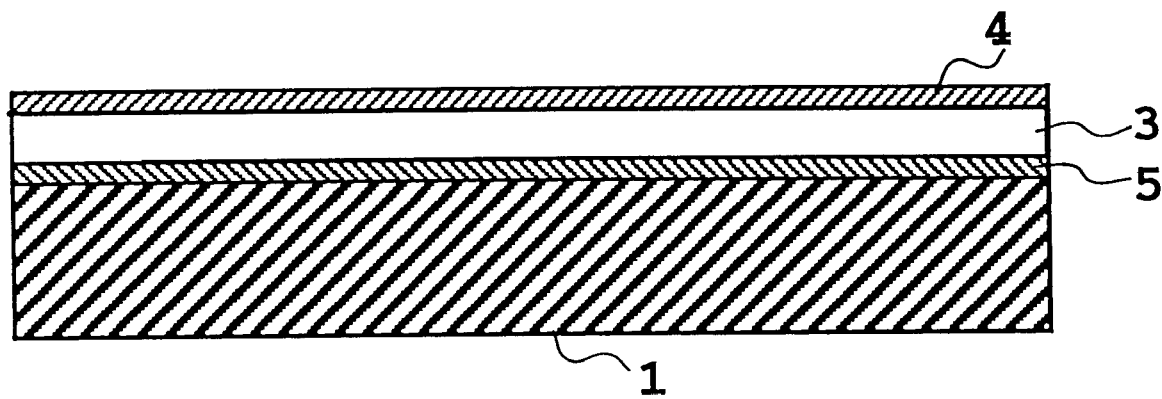
FIG. 6 is a longitudinal cross-sectional view of the polymer optical waveguide, taken on line B–B' of FIG. 5.
Figure 7:
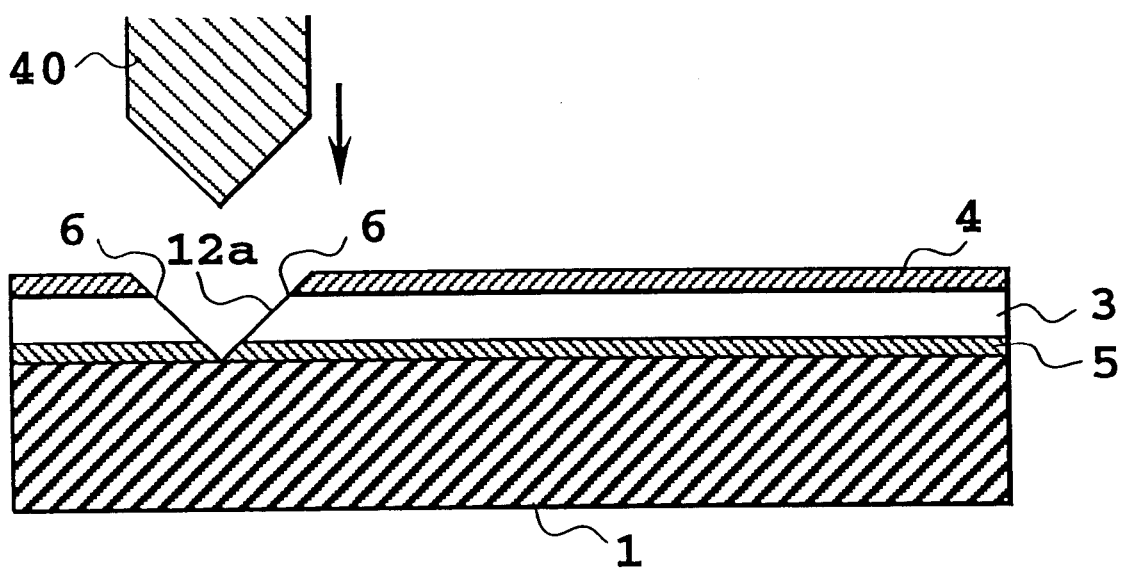
FIG. 7 is a longitudinal cross-sectional view of the polymer optical waveguide having an oblique end face mirror formed by dicing along line A–A' of FIG. 5, the view being taken on line B–B' of FIG. 5.

FIG. 6 is a cross-sectional view of a planar optical waveguide as shown in FIG. 5, cut across the core 3 of the waveguide on line B–B' of FIG. 5. In FIG. 6, numeral 4 refers to an upper cladding layer and 5 to a lower cladding layer. As shown in FIG. 7, the planar optical waveguide is cut along line A–A' of FIG. 5 with an eye on the markers 2 while using a diamond blade 40 having a blade tip worked to have an angle of about 90 degrees according to the present invention. Thus, a V-shaped groove 12a having oblique end faces (micro-mirrors) 6, 6 is formed in the planar optical waveguide.

Use of a cutting machine such as a dicing saw machine for use in cut-out of LSI chips and the like will suffice for cutting. Since the dicing saw machine is provided with a high-performance stage, cutting with the dicing saw machine can be done with a submicron-order positional accuracy in the horizontal direction as well as in the vertical direction. A general-purpose dicing saw machine for use in cut-out of LSI chips and the like may be used herein as that dicing saw machine if only the blade thereof is replaced with the blade of the present invention.

One great advantage of the present invention is no need of special contrivance of the sample fixation method and the like. Herein, a cutting depth down to a location deeper than the interfacial boundary between the core 3 and the lower cladding layer 5 will suffice, so that cutting may either be stopped inside the lower cladding layer 5, or make an inroad into the substrate 1. One advantage of cutting lies in that selection and use of a blade made of a suitable material enables simultaneous cutting of a soft material such as a polymer, a rigid material such as silicon or glass, and a composite material of a silicon substrate and a polymer thereon, or the like. Further, since a fine grain size diamond blade has a fineness comparable to that of a very fine mesh abrasive paper for use in polishing of optical parts such as a lens, the use of such a fine mesh blade makes the step of cutting exert the same effects as would be secured if cutting for oblique end face formation were effected simultaneously with optical-grade high-quality surface polishing. Thus, there can be obtained a cut surface having a very high level of smoothness.

Figure 8:
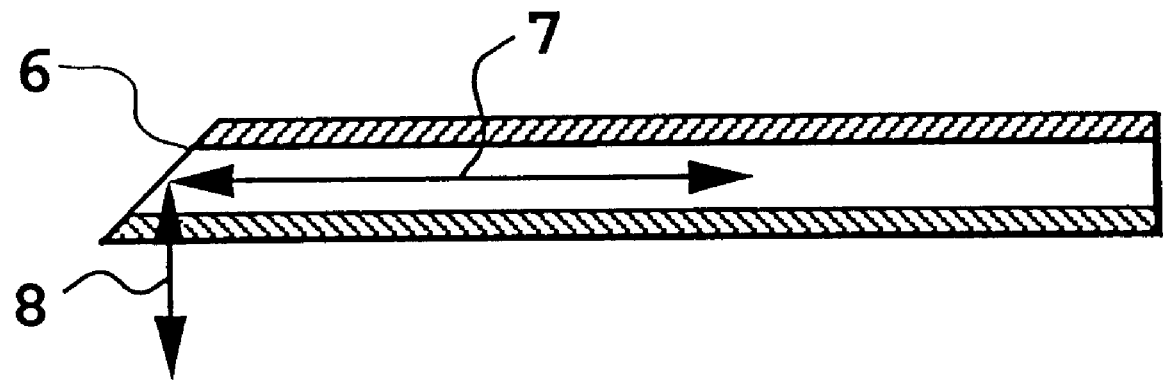
FIG. 8 is a longitudinal cross-sectional view of an optical waveguide film with oblique end face mirrors.

Such planar optical waveguides having respective formed oblique end face mirrors are peeled from the substrate 1 to produce an optical waveguide film with 45-degree oblique end face mirrors as shown in FIG. 8. A 45-degree oblique end face mirror has a function of 90-degree downward deflection of light 7 propagated through a planar optical waveguide as shown in FIG. 8. This 45-degree oblique end face mirror also has a reverse function of 90-degree deflection of light 8 propagated from below through space to effect optical coupling thereof with the planar optical waveguide.

Figure 9:
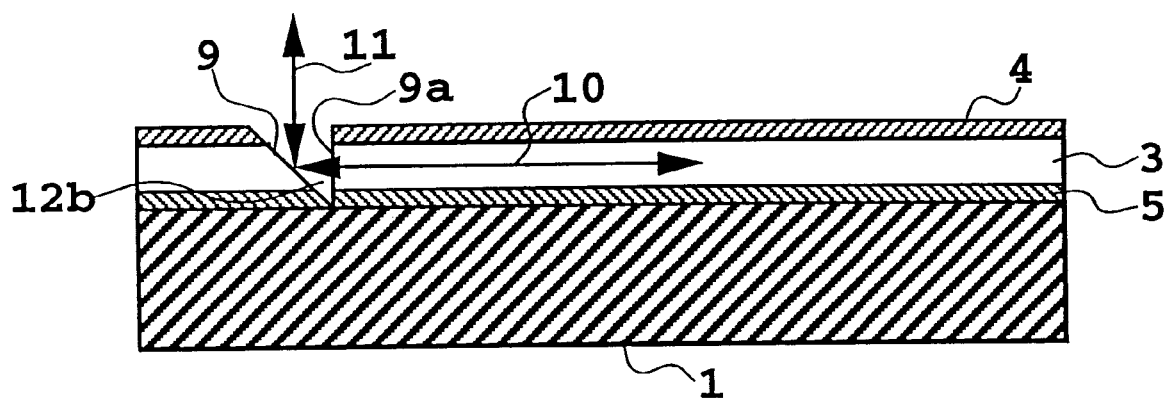
FIG. 9 is a longitudinal cross-sectional view of the polymer optical waveguide having an oblique end face mirror formed by dicing with a single-edged blade along line A–A' of FIG. 5, the view being taken on line B–B' of FIG. 5.

In the case where the substrate 1 is made of a light-transmissive material such as glass, the planar optical waveguides may not necessarily be peeled to form a film, but may also be used as planar optical waveguides attached intact to the substrate 1 as shown in FIG. 9 but having a function of 90-degree deflection of either internally propagational light 10 or externally incident light 11 at the oblique end faces 9 thereof. Additionally stated, in order that a V-shaped groove 12b having an oblique end face 9 and a substantially vertical face 9a facing the oblique end face 9 as shown in FIG. 9 is formed midway of a planar optical waveguide, a blade having a cross section wherein only one side face thereof is set oblique and the other side face is set substantially vertical must be selected and used.

The constitution of the present invention has hereinabove been described briefly in connection with a case where the optical deflector of the present invention comprises planar optical waveguides. Next, the constitution of the present invention will be described in connection with a case where the optical deflector of the present invention comprises a optical fiber.

An example of a process for producing an optical deflector constituted of an optical fiber having a 45-degree oblique end face mirror at one side thereof will be described with reference to some drawings.

Figure 10A:
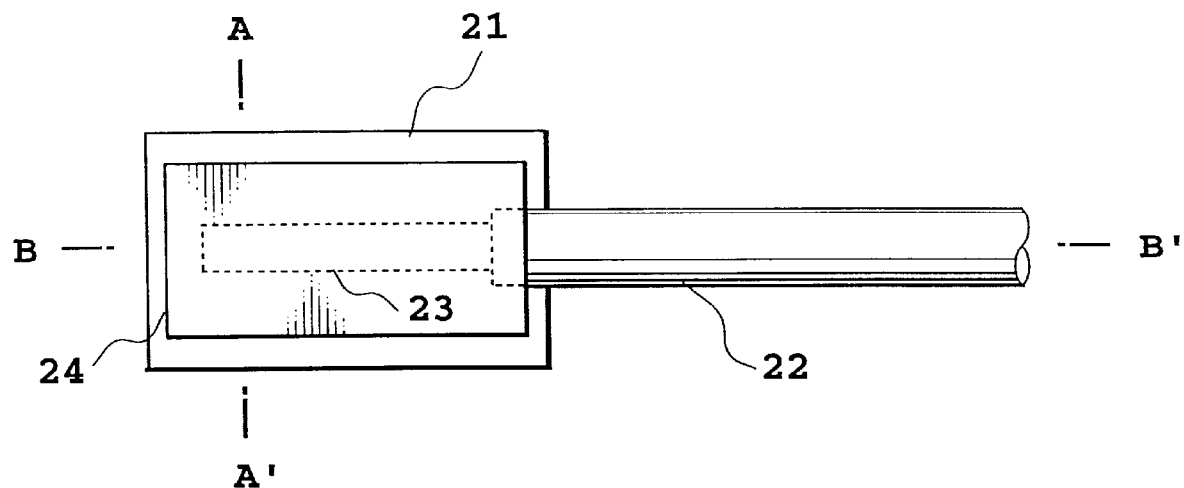
FIG. 10A is a top plan view of an optical fiber fixed on a substrate with an adhesive film.

FIG. 10A is a top plan view of an optical fiber having a end portion thereof fixed on a substrate. In FIG. 10A, numeral 21 refers to the substrate, 22 to the optical fiber, 23 to an end portion of the optical fiber 22 stripped of a cover, and 24 to an adhesive film for fixation of the end portion 23 of the optical fiber, while line A–A' represents a position where an oblique end face mirror is to be formed.

Figure 10B:
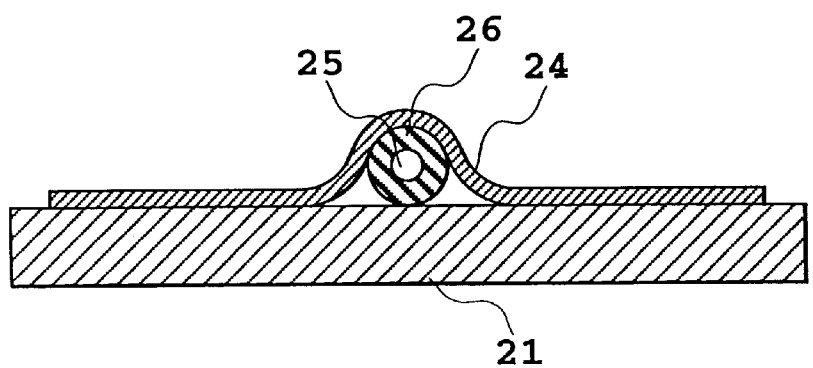
FIG. 10B is a longitudinal cross-sectional view taken on line A–A' of FIG. 10A.

FIG. 10B is a cross-sectional view taken on line A–A' of FIG. 10A. In FIG. 10B, numeral 25 refers to the core of the optical fiber, and 26 to the cladding of the optical fiber.

As shown in FIGS. 10A and 10B, the optical fiber 22 has the end portion 23 fixed on the substrate 21 with the adhesive film 24. Herein, usable examples of the substrate 21 include rigid substrates such as silicon, glass, and thick resin substrates as a matter of course, and flexible films such as a thin resin film.

Thereafter, as shown in FIG. 11, cutting along line A–A' is done using a diamond blade having a blade tip worked to be V-shaped in cross section with an angle of about 90 degrees according to the present invention, whereby a 45-degree oblique end face mirror 27 is formed at an end of the optical fiber 22.

Use of a cutting machine such as a dicing saw machine for use in cut-out of LSI chips and the like will suffice for cutting. One great advantage of the present invention is no need of special contrivance of the sample fixation method and the like just as in the aforementioned case of planar optical waveguides.

One advantage of cutting lies in that selection and use of a blade made of a suitable material enables simultaneous cutting of a soft material such as a polymer, a rigid material such as silicon or glass, and a composite material such as one comprising a glass optical fiber fixed on a silicon substrate with a resin adhesive, or an optical fiber sheet comprising glass optical fibers fixed in a resin. Accordingly, the process of the present invention is not only applicable to a glass optical fiber, a plastic optical fiber, and an optical fiber constituted of a plastic cladding and a glass material core, but also applicable to silicon, a glass material and resin material for use in a substrate for fixation of an optical fiber.

Further, since a fine grain size diamond blade has a fineness comparable to that of a very fine mesh abrasive paper for use in polishing of optical parts such as a lens, the use of such a fine mesh blade makes the step of cutting exert the same effects as would be secured if cutting for oblique end face formation were effected simultaneously with optical-grade high-quality surface polishing. Thus, there can be obtained a cut surface having a very high level of smoothness.

Figure 11A:
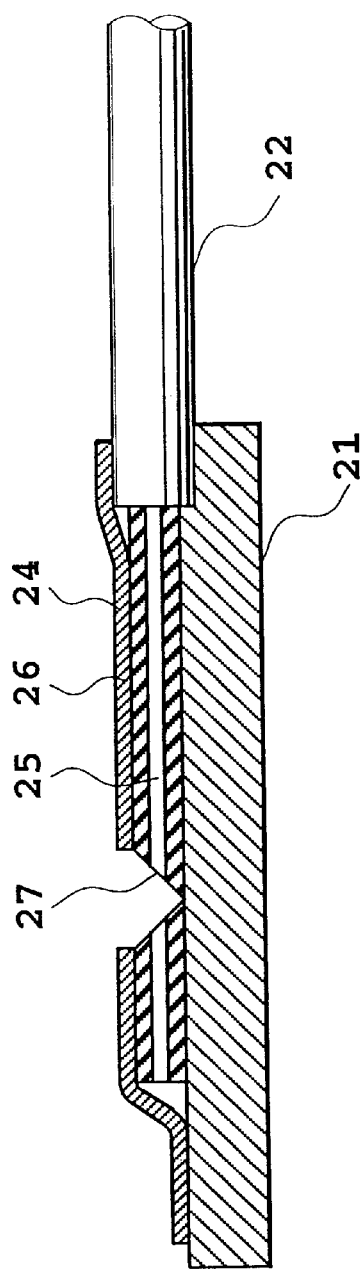
FIG. 11A is a longitudinal cross-sectional view illustrating a worked state of the optical fiber shown in FIGS. 10A and 10B after formation of an oblique end face by cutting along line A–A' of FIG. 10A, the view being taken on line B–B' of FIG. 10A.
Figure 11B:
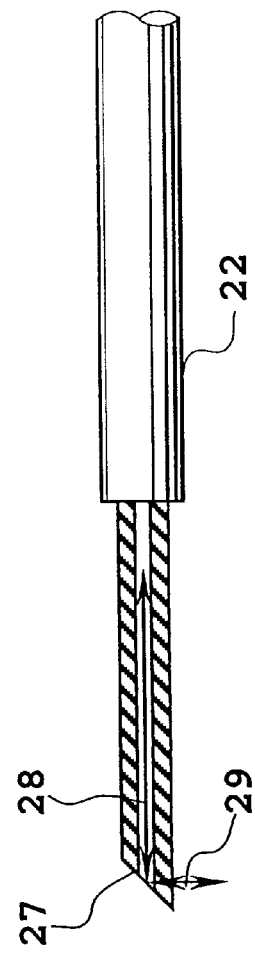
FIG. 11B is a longitudinal cross-sectional view of an optical fiber with an oblique end face mirror, produced by the above-mentioned cutting and subsequent peeling of the adhesive film for separation of the optical fiber from the substrate.

After formation of the oblique end face mirror, the adhesive film 24 is peeled to separate the optical fiber 22 from the substrate 21, whereby an optical fiber with an oblique end face mirror as shown in FIG. 11B can be obtained. The 45-degree oblique end face mirror 27 has a function of 90-degree downward deflection of light 28 propagated through the optical fiber 22 as shown in FIG. 11B. This 45-degree oblique end face mirror also has a reverse function of 90-degree deflection of light 29 propagated from below through space to effect optical coupling thereof with the optical fiber. In the case where the substrate 21 is made of a light-transmissive material such as glass or a transparent resin, the adhesive film 24 may not necessarily be peeled, but the optical fiber attached intact to the substrate 21 as shown in FIG. 11A may also be used as an optical fiber having a function of 90-degree deflection.

The cover is usually attached to the optical fiber in order to reinforce the latter. Although a portion of the cover where cutting is to be done is peeled before fixation of the optical fiber on the substrate in the foregoing case, preliminary peeling of the cover may not necessarily be required. Since the process of the present invention is applicable even to a composite material such as a material comprising a glass and a resin, an optical fiber having a cover attached intact thereto may be fixed on a substrate, and then cut to form an oblique end face. If the cover is made of a material poor in transparency, however, a portion of the cover near the oblique end face intercepts incident or emergent light via the oblique end face into or from the optical fiber. In this case, therefore, a portion of the cover corresponding to an end portion of the optical fiber should be peeled in this case.

In order to efficiently carry out the step of peeling the adhesive film, selection must be made of an adhesive film having a suitable adhesive power, examples of which include an ultraviolet-degradable adhesive film capable of being lowered in adhesive power through degradation of an adhesive upon its absorption of ultraviolet rays. This ultraviolet-degradable adhesive film, when used, can conveniently be peeled simply by irradiation thereof with ultraviolet rays after cutting.

Instead of the adhesive film, an adhesive such as an ultraviolet-curing resin or a thermosetting resin may alternatively be used for fixation of an optical fiber. In this case, the step of separating the optical fiber from the substrate after cutting may be carried out either by dissolving the adhesive in a solvent or by peeling the adhesive together with the optical fiber from the substrate. In this case, when the substrate 21 is made of a light-transmittive material such as glass or a transparent resin, the adhesive may not necessarily be peeled for separation of the optical fiber from the substrate. Thus, the optical fiber attached intact to the substrate 21 as shown in FIG. 11A may be used as an optical fiber having a mechanism of 90-degree deflection of internally propagational light or externally incident light at the oblique end face 27.

The constitution of the present invention has hereinabove been described briefly in connection with the case where the optical deflector of the present invention comprises an optical fiber.

In the optical deflector having the foregoing constitution, the surface smoothness of the oblique end face, affecting the reflectance of the oblique end face mirror, is of course determined substantially by the mesh fineness of the surface of the blade used. Basically, the finer the diamond grain size of the blade used, the smoother the resulting mirror plane. However, use of an excessively fine grain size blade involves problems such as an incapability of cutting because of clogging, wear of the blade in a short time, and a failure in increasing the cutting speed. Accordingly, selection of a suitable blade is very important in forming a good-quality oblique end face mirror.

Figure 12:
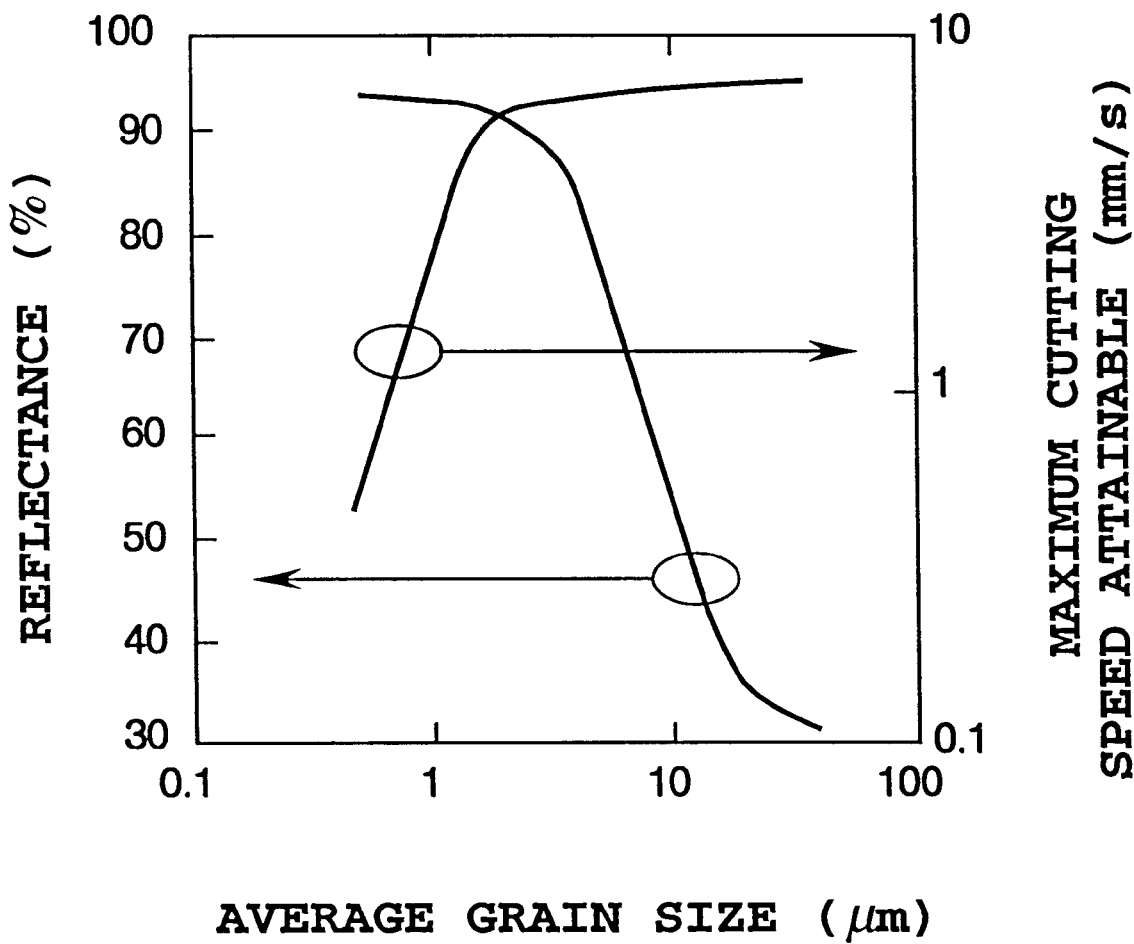
FIG. 12 is a graph showing the relationship between the average grain size of a blade for cutting an optical waveguide for formation of an oblique end face and the reflectance of the formed oblique end face as well as the maximum cutting speed attainable.

FIG. 12 shows the relationship between the average grain size of diamond grains contained in a blade used for cutting and the reflectance of the resulting mirror plane as well as the maximum cutting speed attainable for good-quality mirror plane formation without troubles such as clogging.

When the average grain size of diamond grains is at least 15 $\mu$m (in the form of an aggregate of grains of 10 to 20 $\mu$m in size), the roughness of the mirror plane is so great that the reflectance is lower than 50%. The smaller the average grain size, the higher the reflectance. When a blade of 5 $\mu$m in average grain size (in the form of an aggregate of grains of 4 to 6 $\mu$m in size) is used, a reflectance of about 80% can be secured. When the average grain size is further decreased to be as fine as 1.5 $\mu$m (in the form of an aggregate of grains of 0 to 3 $\mu$m in size), the mirror plane becomes optically sufficiently smooth while securing a high reflectance of at least 95%. Use of a finer grain size blade makes the mirror plane smoother but so saturated in respect of optical properties as to attain little improvement in reflectance. From the standpoint of reflectance, therefore, a blade of at most 5 $\mu$m is desirably used for cutting.

On the other hand, a fine grain size blade is so poorer in cutting power than a rough blade that the cutting speed is generally slowed down with a shorter life span of the blade. As is understandable from FIG. 12, however, use of a blade of at least 1 $\mu$m (in the form of an aggregate of grains of 0 to 2 $\mu$m in size) in average grain size enables cutting to be done at a cutting speed of at least 1 mm/sec, and is therefore believed to be well practical. From the standpoint of cutting efficiency, a blade of at least 1 $\mu$m in average grain size is desirably used for cutting. Thus, in the case of a diamond blade, one feature of the present invention is that the average grain size of diamond grains is at least 1 $\mu$m and at most 5 $\mu$m.

When consideration is given to both of reflectance and cutting efficiency as described above, a blade of 1 to 5 $\mu$m in average grain size is desirably used for cutting.

Although a sufficiently practical optical surface can usually be obtained only by dicing in the foregoing formation of an oblique end face mirror, the following methods may be effective in a case where a cut surface must be highly smoothed to form a higher-quality optical mirror plane with an increase in the reflectance thereof.

When a waveguide material is a polymeric material, a first method is a method wherein a surface is softened by heat. This can be simply effected in such a way that a flatiron heated up to a temperature substantially capable of slightly softening a polymer as the core material of an optical waveguide is lightly pressed against a cut surface. In this case, when the softened polymer adheres to the flatiron, no smooth surface can be obtained. In view of this, the surface of the flatiron is desirably subjected to an adhesion-proofing treatment such as Teflon coating.

A second method is a method wherein a surface is slightly dissolved in a suitable solvent. This can be simply effected in such a way that a cut surface is immersed in a suitable solvent capable of slightly dissolving a polymer as the core material of an optical waveguide.

In the case where the materials of an waveguide are glasses, a cut surface may be immersed in a mixed solution of hydrogen fluoride and ammonium fluoride instead of an organic solvent to effect slight dissolution thereof, whereby the surface can be smoothed.

A third method is a method wherein an oblique surface is subjected to finish polishing with a diamond blade having a by far finer average grain size than that of a blade used in cutting for oblique surface formation. According to this method, after formation of a groove having a desired oblique surface by cutting, the smoothness of a cut surface can be well enhanced only by finish polishing with a replaced blade. Therefore, this method involves an advantage that the step can be simplified because a waveguide may not be transferred to another step in order to improve the smoothness of the cut surface.

Any one of the foregoing methods enables formation of an oblique end face having a very excellent smoothness. Such an operation of improving the smoothness of a cut oblique end face is possible because a V-shaped groove is formed in an optical waveguide as a result of cutting for formation of an oblique surface as a mirror. More specifically, this is so because a form in which the upper side of an oblique surface is widely open is materialized in the neighborhood of a mirror plane in the optical waveguide. Accordingly, in the optical deflector of the present invention having an oblique surface formed by such V-shaped groove formation, various means for smoothing an oblique surface can be easily carried out as described above, and a specular treatment of an oblique surface can also be easily realized as will be described later, while securing such an advantage in packaging that an optical functional element such as a sensitive optical device or an emitting optical device can be disposed in the V-shaped groove, i.e., in the extreme proximity of a mirror plane.

Although the oblique end face can be greatly smoothed according to any one of the foregoing method, there is a case where total reflection conditions on the oblique end face cannot be satisfied for all guided-wave modes though it depends on the angle of inclination of the oblique end face and the refractive index values of the core and the cladding. In this case, a reflectance of 100% cannot be secured in principle because some high modes of light are not reflected on the oblique end face and are instead transmitted therethrough. In this case, a method of coating the cut surface with a highly reflective metal such as gold, silver or aluminum by vacuum deposition or the like is effective. A reflectance close to 100% can be secured by such coating with a highly reflective film.

In order to set the angle of inclination of the oblique end face, i.e., the angle of inclination of the mirror, in agreement with a desired angle with a good accuracy, it is important to preliminarily grasp the relationship between the angle of the tip of a blade and the angle of an oblique end face formed by actual cutting. The angle of a V-shaped groove formed by cutting usually becomes a little larger than the angle of the tip of a blade used for cutting. This is believed to be mainly caused by a dimensional error in the circumferential direction of the blade and vibration during the operation of a dicing saw machine.

Figure 13:
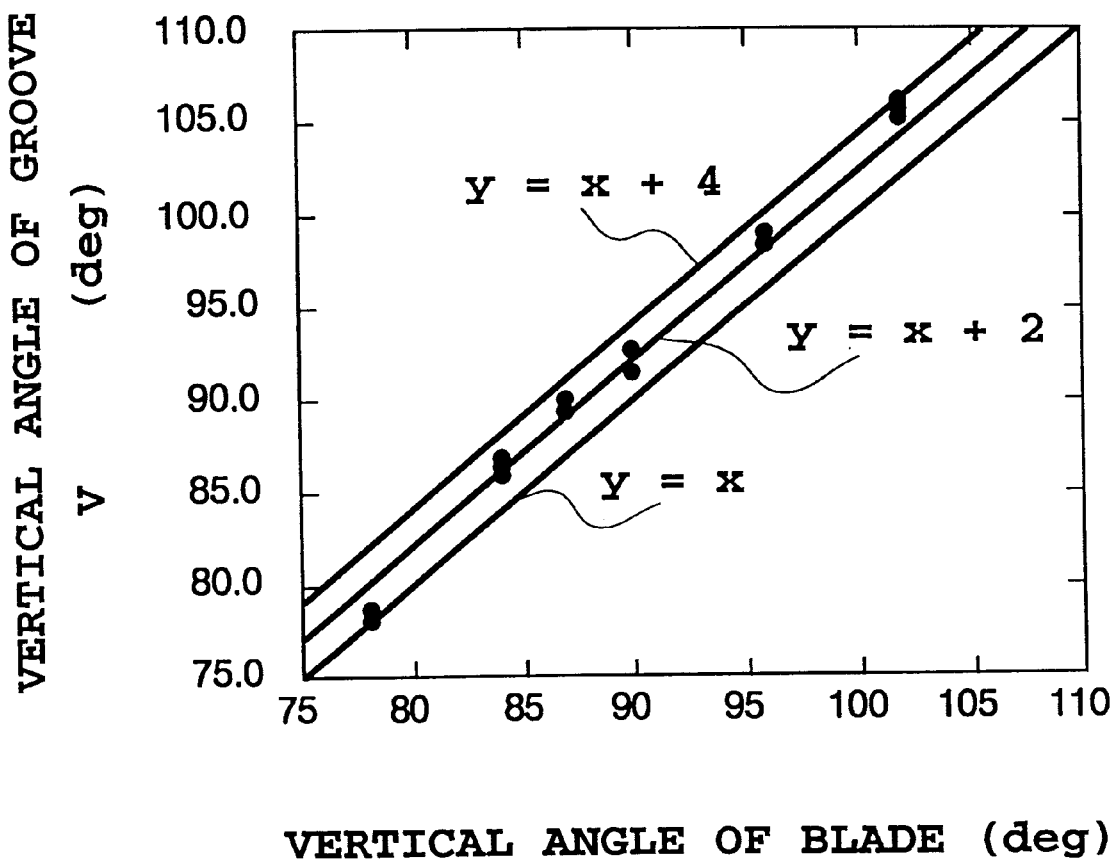
FIG. 13 is a graph showing the relationship between the vertical angle of a blade for cutting an optical waveguide for formation therein of a V-shaped groove including an oblique end face and the vertical angle of the formed groove.

FIG. 13 shows the relationship between the vertical angle of a blade used for cutting and the vertical angle of a V-shaped groove actually formed by cutting. When a suitable grain size blade is used, the vertical angle of the resulting V-shaped groove becomes larger by about 2 degrees than the vertical angle of the blade with a lot-to-lot variation controlled within the range of about 2 degrees. Accordingly, when cutting is done using a blade having a vertical angle of 88 degrees, an oblique end face mirror having an angle of inclination of 45 degrees can be formed with a good reproducibility with an accuracy falling within the range of ±1 degree. Thus, there can be formed an oblique end face mirror having a desired angle of inclination with an error falling within the range of ±1 degree. The term "suitable grain size blade" as used herein is intended to indicate a blade of at least 1 $\mu$m and at most 5 $\mu$m in average grain size according to the present invention. When a larger grain size blade is used, a conversion difference between the vertical angle of the blade and the vertical angle of the resulting V-shaped groove is increased with increases in lot-to-lot variation and repetition errors, whereby a difficulty is encountered in controlling the angle of inclination of the oblique end face mirror with a high accuracy. Accordingly, from the standpoint of controlling the angle of inclination of the oblique end face mirror as well, a blade of at most 5 $\mu$m in average grain size is desirably used for cutting. One feature of the blade of the present invention is that the average grain size of constituent diamond grains of the blade is 1 to 5 $\mu$m. Another feature of the blade of the present invention is that a side face of the blade for oblique surface formation is formed at an angle of inclination of 44 degrees in relation to the cutting accuracy aimed at the above-mentioned angle of inclination of the oblique end face mirror. Accordingly, when a symmetric V-shaped groove is to be formed, the angle of the tip of the blade is set to be 88 degrees.

Figure 14:
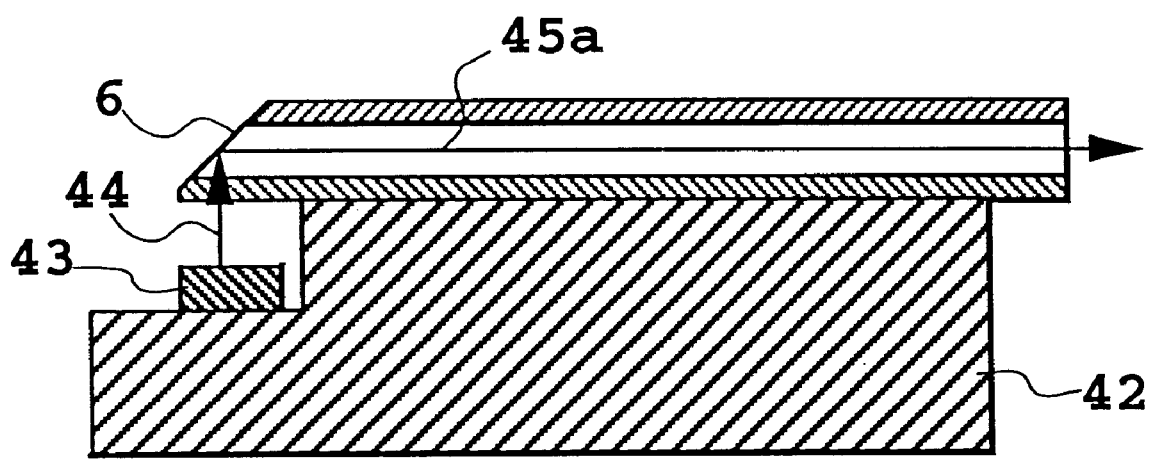
FIG. 14 is a longitudinal cross-sectional view of an optical transmitter comprising an optical waveguide film with oblique end face mirrors, mounted therein.
Figure 15:
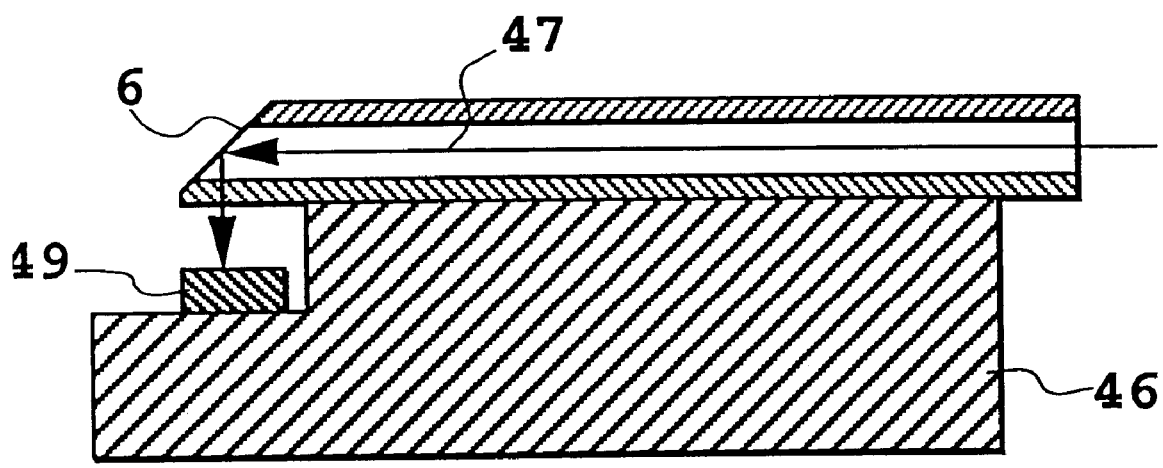
FIG. 15 is a longitudinal cross-sectional view of an optical receiver comprising an optical waveguide film with oblique end face mirrors, mounted therein.

For example, in the case of a planar optical waveguide, the optical deflector produced according to the foregoing process, when mounted on a packaging substrate 42 as shown in FIG. 14, can be used as a part which constitutes an optical transmitter module wherein it deflects a laser beam 44 emitted from a surface emitting laser 43 likewise mounted on the packaging substrate 42 by means of the oblique end face 6 to effect optical coupling thereof with the optical waveguide to thereby turn the beam into a propagational light 45a, or that optical deflector, when mounted on a packaging substrate 46 as shown in FIG. 15, can be used as a part which constitutes the other way around an optical receiver module wherein it deflects a light 47 wave-guided through the optical waveguide by means of the oblique end face 6 to effect optical coupling thereof with a photodiode 49 likewise mounted on the packaging substrate 46.

Figure 16:
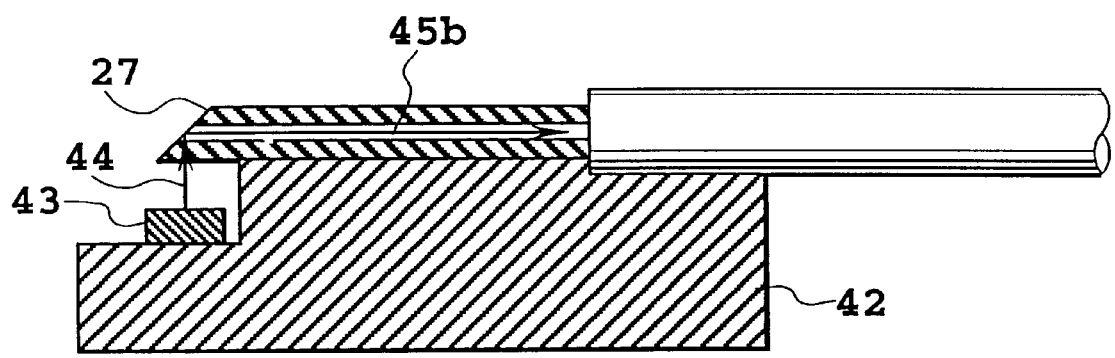
FIG. 16 is a longitudinal cross-sectional view of an optical transmitter comprising an optical fiber with an oblique end face mirror, mounted therein.
Figure 17:
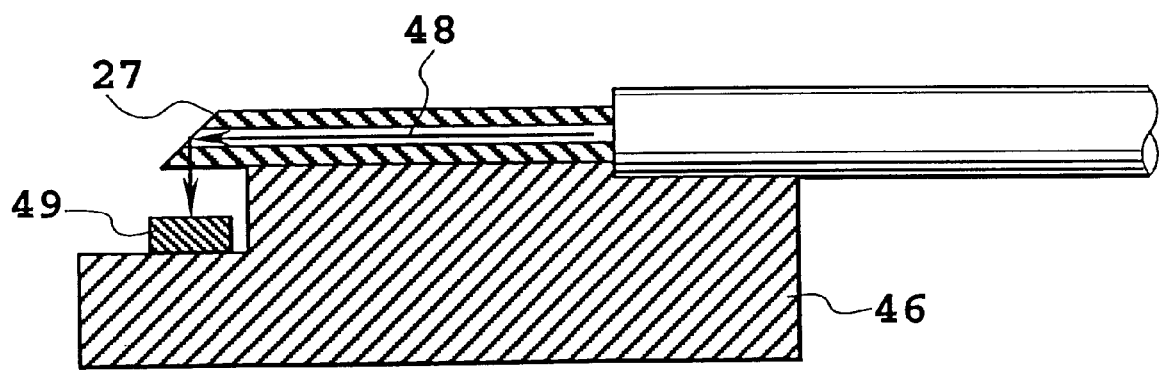
FIG. 17 is a longitudinal cross-sectional view of an optical receiver comprising an optical fiber with an oblique end face mirror, mounted therein.

In the case of an optical fiber as well, the optical deflector, when mounted on a packaging substrate 42 as shown in FIG. 16, can be used as a part which constitutes an optical transmitter module wherein it deflects a laser beam 44 emitted from a surface emitting laser 43 likewise mounted on the packaging substrate 42 by means of the oblique end face 27 to effect optical coupling thereof with the optical fiber to thereby turn the beam into a propagational light 45b, or that optical deflector, when mounted on a packaging substrate 46 as shown in FIG. 17, can be used as a part which constitutes the other way around an optical receiver module wherein it deflects a light 48 wave-guided through the optical fiber by means of the oblique end face 27 for downward emergence thereof to effect optical coupling thereof with a photodiode 49 likewise mounted on the packaging substrate 46.

Figure 18:
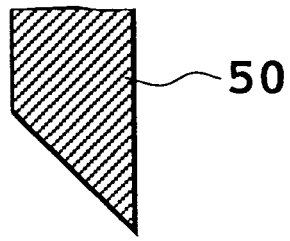
FIG. 18 is a cross-sectional view of the tip of a single-edged blade for use in oblique end face mirror formation.

An oblique end face mirror can be formed using a single-edged blade 50 as shown in FIG. 18 instead of the double-edged blade 40 as shown in FIG. 7. For example, a single-edged blade 50 having a vertical angle of about 44 degrees is used to cut an optical waveguide of FIG. 6 to thereby form an oblique end face mirror, whereby an optical waveguide with a 45-degree oblique end face mirror as shown in FIG. 9 can be obtained. In the case of this type of mirror, since total reflection conditions on the oblique end face 9 are not satisfied, however, the oblique end face 9 must be coated with a high-reflectance metal such as gold, silver or aluminum in order to secure a high reflectance. This coating operation is very easily done since a transformed V-shaped groove 12b materializing the oblique end face 9 is in an enlarged form on the aperture's side thereof. This holds true also in the case where the V-shaped groove is a symmetric V-shaped groove 12a as shown in FIG. 7. Since this symmetric V-shaped groove has such a wider operational space that the operation can be more easily carried out.

Figure 19:
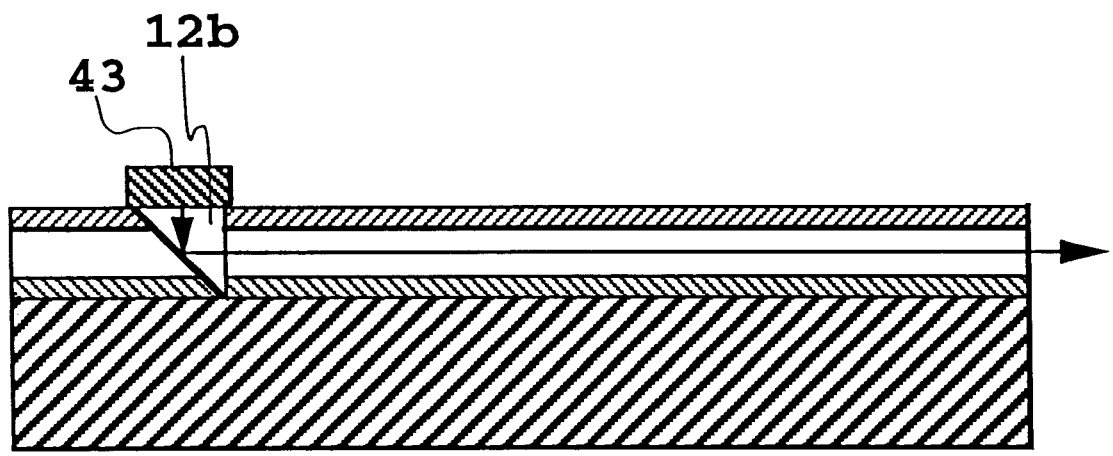
FIG. 19 is a longitudinal cross-sectional view of an optical transmitter comprising an optical waveguide with an oblique end face mirror and an emitting optical device mounted over the oblique end face mirror.
Figure 20:
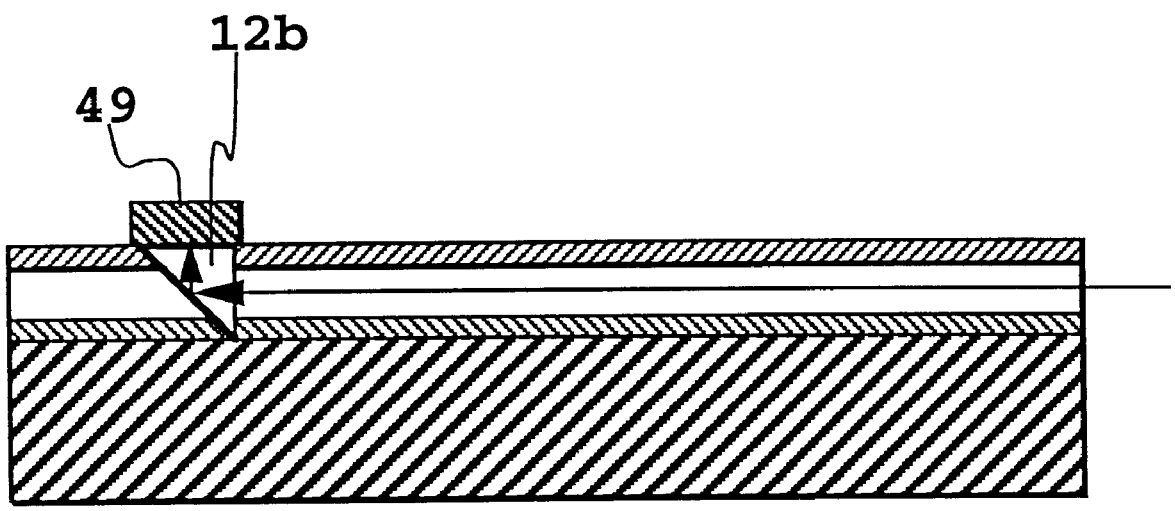
FIG. 20 is a longitudinal cross-sectional view of an optical receiver comprising an optical waveguide with an oblique end face mirror and a sensitive optical device mounted over the oblique end face mirror.
Figure 21:
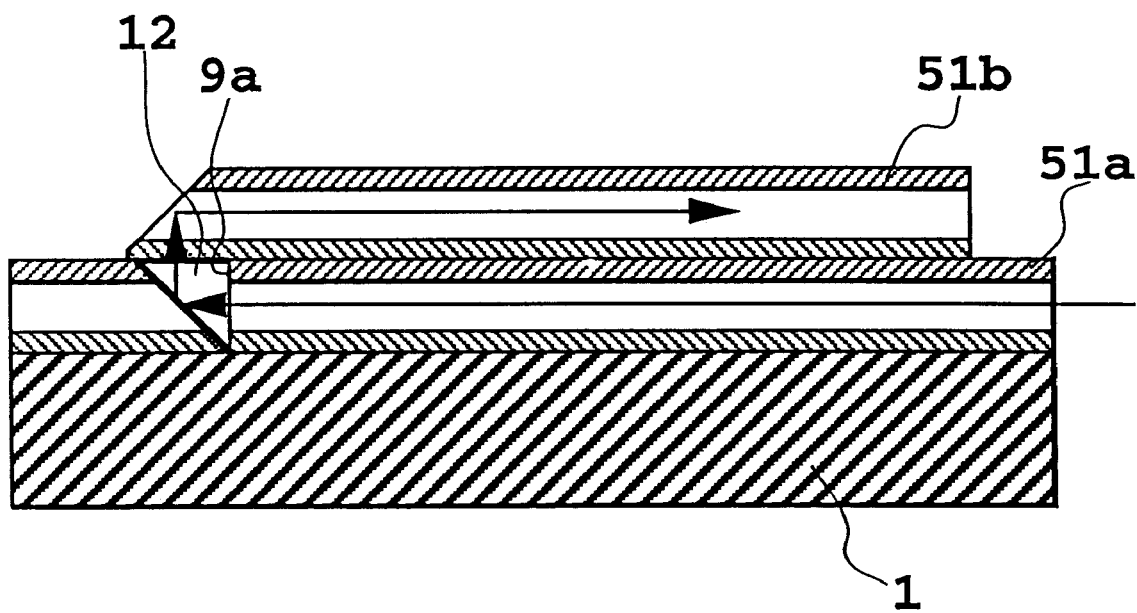
FIG. 21 is a longitudinal cross-sectional view of vertically stacked optical waveguides comprising an optical waveguide of FIG. 9 with an oblique end face mirror as a sensitive element and an optical waveguide film of FIG. 8 with oblique end face mirrors, mounted over the optical waveguide.

A large difference in function between the oblique end face mirror 9 of a type as shown in FIG. 9 and the oblique end face mirror 6 of a type as shown in FIG. 7 is that they are reverse to each other in respect of the direction of deflection. The oblique end face mirror of FIG. 9 has a function of deflecting a light 10 propagated through the optical waveguide in the upward direction, i.e., in a direction opposite to the substrate 1. Of course, it also has a function of deflecting the other way around a light 11 propagated from above the substrate 1 to effect optical coupling thereof with the optical waveguide. Accordingly, an emitting optical device 43 may be disposed on the surface of the optical waveguide or in the V-shaped groove 12b to constitute an optical transmitter as shown in FIG. 19, a sensitive optical device 49 may be disposed on the surface of the optical waveguide or in the V-shaped groove 12b to constitute an optical receiver as shown in FIG. 20, or an optical waveguide with an oblique end face mirror as shown in FIG. 8 may further be superposed on the resulting surface to produce vertically stacked optical waveguides having 2 waveguide layers 51a and 5b as shown in FIG. 21.

However, this type of oblique end face mirror involves a problem of being liable to generate a light going backward toward the incident side of light, i.e., a problem of bad return loss in an aspect of an element, because of Fresnel reflection occurring on the vertical end face 9a constituting the transformed V-shaped groove 12b formed by cutting. For example, when the refractive index of the core is 1.490, an about 3.9% Fresnel reflection occurs on the vertical end face 9a, with the result that the return loss detected on the light-incident end face is about −14 dB without regard for the propagation loss of the optical waveguide.

Means for solving this problem include the following two methods.

Figure 22:
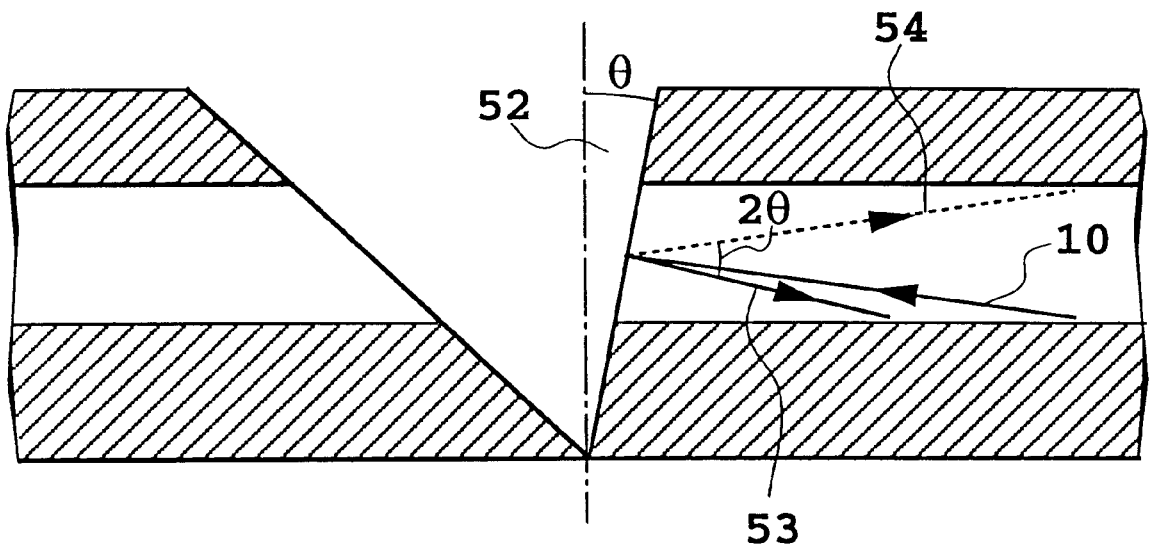
FIG. 22 is a cross-sectional view of the neighborhood of a V-shaped groove formed in an optical waveguide, which view illustrates the relationship between the angle of inclination of a plane of incidence or emergence substantially perpendicular to the optical axis of the optical waveguide in the V-shaped groove with a plane perpendicular to the optical axis of the optical waveguide and the return loss of propagational light emerging from the plane of incidence or emergence.

According to the first method, the end face 9a of the optical waveguide is formed into an end face oblique by a slight angle θ relative to a vertical plane as shown in FIG. 22. When the end face 9a is formed to be oblique by an angle θ, the optical path 53 of reflected light is deflected by an angle 2θ in comparison with the optical path 54 of reflected light in the case where the end face 9a is not oblique. This can be utilized with proper selection of θ to diffuse reflected light out of the waveguide, whereby the return loss can consequently be improved.

In view of total reflection conditions on the core/cladding interface, the angle of a wave-guided light capable of being propagated through a waveguide with the optical axis of the waveguide has the maximum value: $\cos^{-1}(n_{clad}/n_{core})$ wherein n core is the refractive index of the core and $n_{clad}$ is the refractive index of the cladding. Accordingly, when the value of θ is set to be higher than the value of $\cos^{-1}(n_{clad}/n_{core})$, all reflected light can be diffused out of the waveguide. Since this value of $\cos^{-1}(n_{clad}/n_{core})$ is about 5° to 6° in the case of a single-mode waveguide wherein the number of apertures (NA) is about 0.1, and is about 8° to 9° in the case of a multimode waveguide wherein the number of apertures (NA) is about 0.2, the return loss can be drastically decreased through inclination of the end face 9a by an angle of at least 6° in the case of the single-mode waveguide or by an angle of at least 9° in the case of the multimode waveguide.

Figure 23:
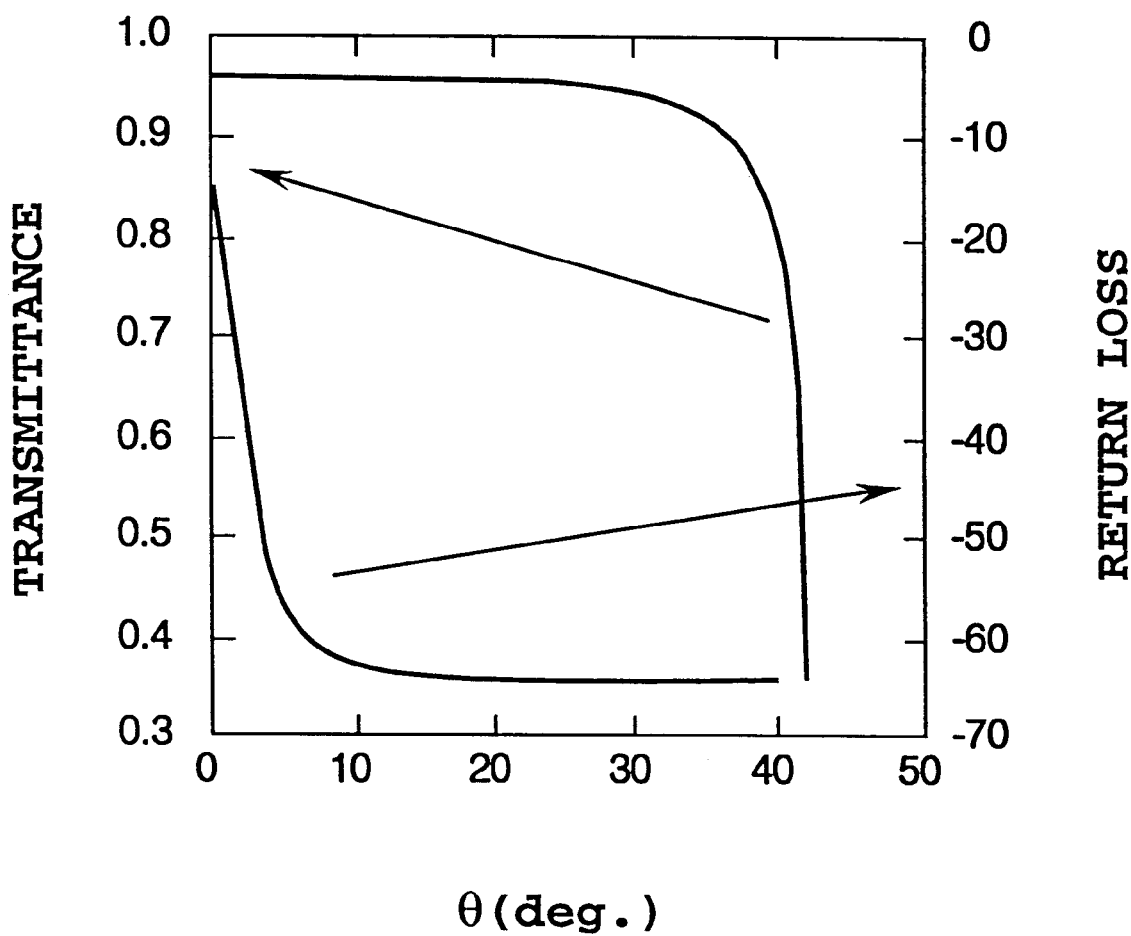
FIG. 23 is a graph showing the relationship between the angle of inclination of a plane of incidence or emergence substantially perpendicular to the optical axis of the optical waveguide in the V-shaped groove with a plane perpendicular to the optical axis of the optical waveguide and the return loss rate of propagational light emerging from the plane of incidence or emergence.

Even if the angle θ is smaller than the foregoing angle, some reflected light is diffused out of the waveguide, whereby a sufficient effect may be exhibited though it depends on requirements. On the other hand, when it is too large, the quantity of light transmitted through this end face 9a is decreased to become a factor in increasing the element loss. FIG. 23 shows the θ dependence of the transmittance and the return loss. When the value of θ is at least 1°, the return loss is at most −20 dB. On the other hand, when the value of θ exceeds 30°, the transmittance is abruptly decreased. Since a return loss of at most −20 dB and a transmittance of at least 90% are required in order to form a practical optical element, the value of θ is advantageously set to be in the range of 1° to 30°. In order to form such a transformed V-shaped groove, the vertical side face of a single-edged blade must be inclined by an angle of 1° to 30°. Thus, a single-edged blade in such a form is also one modification of the blade of the present invention.

As described before, in the case of the oblique end face mirror of a type as shown in FIG. 9, the corresponding vertical end face may be provided with a slight inclination, whereby the resultant element can be improved in respect of return loss. Herein, it should however be noted that the angle of polarization of an optical path by the mirror is changed because the resulting end face 52 has such an inclination as to give rise to refraction in the core/cladding interface thereof.

Figure 24:
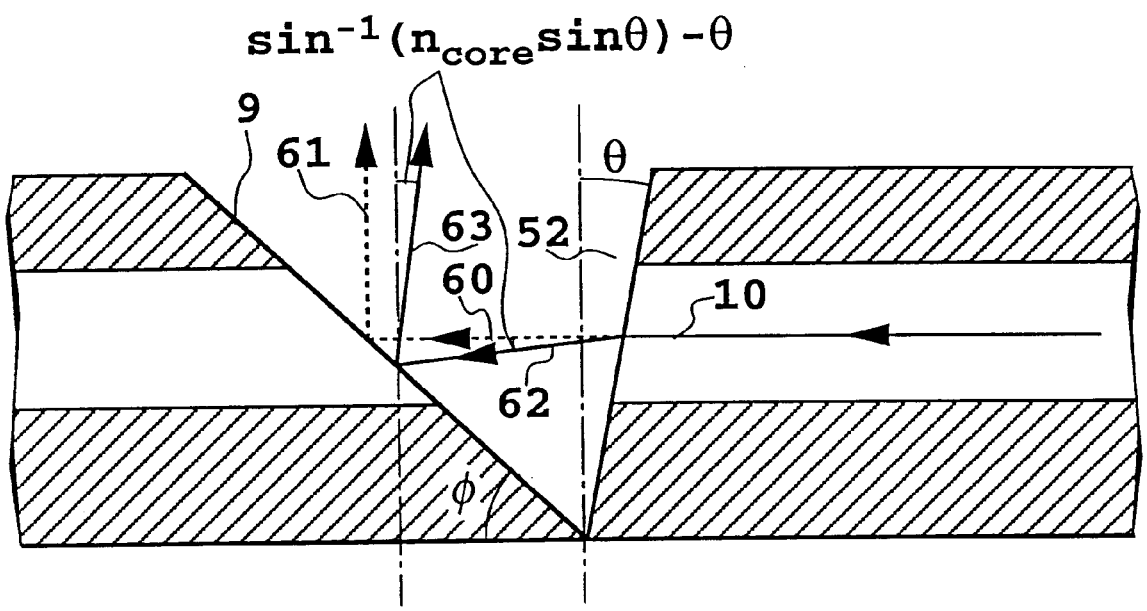
FIG. 24 is a cross-sectional view of the neighborhood of a V-shaped groove formed in an optical waveguide, which view illustrates the relationship between the angle of inclination of a plane of incidence or emergence substantially perpendicular to the optical axis of the optical waveguide in the V-shaped groove with a plane perpendicular to the optical axis of the optical waveguide and the polarization of propagational light emerging from the plane of incidence or emergence.

FIG. 24 is a diagram illustrating a change in the angle of polarization of an optical path by the inclination of the end face 52. If the end face is perpendicular to the optical axis of the waveguide, i.e., if θ=0°, a light beam 10 propagated along the optical axis of the waveguide is propagated while following a course as shown by a broken line 60→61. Herein, the angle of polarization of the optical path is 2φ when φ is the angle of the oblique end face 9 with the optical axis of the waveguide. In other words, when deflection by an angle of Φ is to be effected, it will suffice to satisfy the formula: φ=Φ/2. On the other hand, when the end face 52 is oblique by an angle θ relative to the vertical axis, a light beam 10 is polarized by an angle: $\sin^{-1}(n_{core} \sin\theta) - \theta$ by refraction to be propagated while following a course as shown by a broken line 62→63. Thus, the polarization angle of emergent light 63 with incident light 10 must be set to be $2\phi + \{\sin^{-1}(n_{core} \sin\theta) - \theta\}/2$. In other words, the angle φ of inclination of the oblique end face 52 must be corrected by an angle: $\{\sin^{-1}(n_{core} \sin\theta) - \theta\}/2$ as compared with that in the case where θ=0°.

Figure 25:
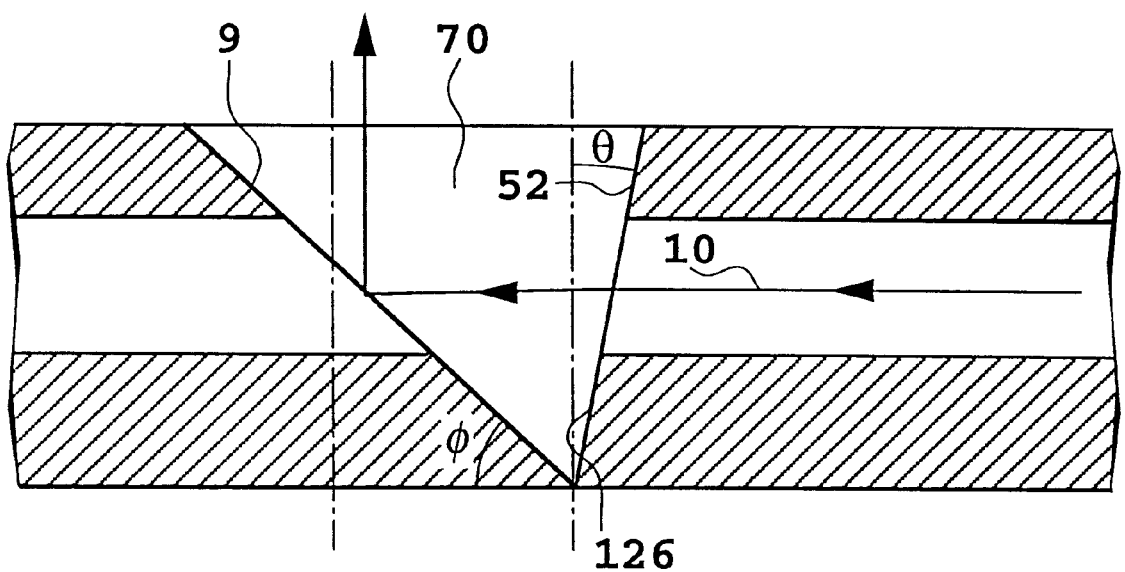
FIG. 25 is a cross-sectional view of the neighborhood of a V-shaped groove formed in an optical waveguide, which view illustrates a state of the V-shaped groove filled with a resin in order to decrease Fresnel reflection occurring on the plane of incidence or emergence substantially perpendicular to the optical axis of the optical waveguide in the V-shaped groove.

The second method show in FIG. 25, is a method wherein a gap between the end face 52 of the waveguide and the oblique end face 9 is filled with a resin 70 or the like having substantially the same refractive index as that of the core after the oblique end face 9 is coated with a highly reflective film made of gold or the like. Substitution of air with the resin 70 as the medium in the V-shaped groove 12b can drastically decrease Fresnel reflection occurring on the end face 52 of the waveguide. For example, when the reflective indices of the core and the resin 70 are 1.49 and 1.485, respectively, Fresnel reflection occurring on this end face 52 is drastically decreased from 3.7% to 0.00028% even if the end face 52 has no inclination, θ=0° whereby the return loss can be drastically decreased from −14 dB to −55 dB. Needless to say, it is a matter of course that this method is more effective when used in combination with the aforementioned inclination of the end face 52 of the waveguide. This method can also decrease the aforementioned change in the polarization angle of the optical path by refraction. More specifically, when the refractive index of the resin 70 is n resin, the change in the polarization angle of the optical path is $\sin^{-1}\{(n_{core}/n_{resin}) \sin\theta\} - \theta$. This resin 70 is also effective in protecting the oblique end face mirror 9.

Figure 26:
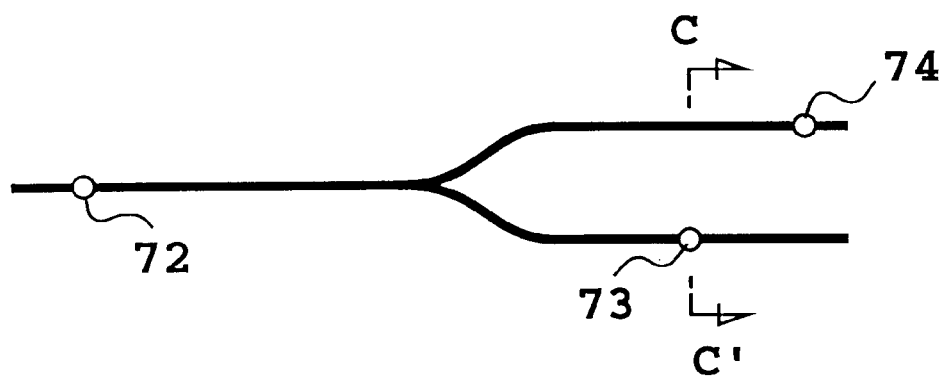
FIG. 26 is a diagram illustrating a Y-branched optical waveguide and positions where oblique end face mirrors are to be formed.

According to the foregoing process for producing the optical deflector of the present invention comprising a planar optical waveguide, not only the operation of cutting the whole element transversely but also localized formation of an oblique end face mirror at an arbitrary position of an optical waveguide is possible. For example, when oblique end face mirrors must be formed at positions 72, 73 and 74 of a Y-branched optical waveguide as shown in FIG. 26, cutting a branched waveguide at a position 73 according to a customary cutting-off method, wherein a cutting apparatus is made of a microtome or the like, involves unavoidable cut-off of the other branched waveguide because cutting off is done along line C–C', whereas partial mirror formation in a branched waveguide is possible without detriment to the other branched waveguide in the case of cutting according to the present invention if the two branched waveguides are apart from each other by about a few millimeters at the cutting location.

The relationship between the V-shaped groove formed in the optical waveguide and the blade used for groove formation, the material properties and form properties of the blade, the function of the optical waveguide having an oblique end face, the adjustment of the polarization angle in relation to refraction by filling the V-shaped groove with the resin, etc., which have all been explained hereinabove, hold true even in the case of an optical fiber type optical deflector, the explanation of which is therefore dispensed with.

As described hereinbefore, a high-performance reflection type optical deflector can be easily produced with a high accuracy according to the process of the present invention for producing an optical deflector.

The following Examples will illustrate the present invention in more detail, but should not be construed as limiting the scope of the present invention.

EXAMPLE 1

Figure 27:
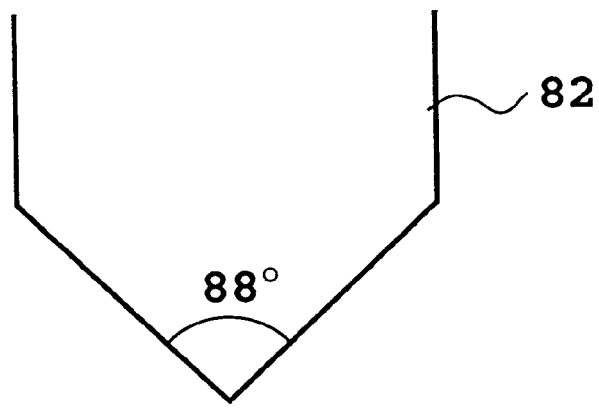
FIG. 27 is a cross-sectional view of a blade tip, which illustrates an example of the blade of the present invention.
Figure 28:
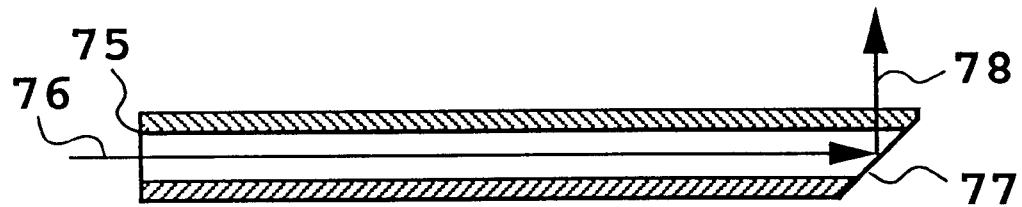
FIG. 28 is a longitudinal cross-sectional view illustrating an example of the optical deflector of the present invention.

An embedded optical waveguide comprising a core of polymethyl methacrylate and a cladding of an epoxy resin was formed on a silicon substrate. The refractive indices of the core and the cladding were 1.490 and 1.475, respectively, while the cross section of the core was square with a width of 40 $\mu$m and a height of 40 $\mu$m. A blade 82 having a blade tip worked to be V-shaped in cross section with a vertical angle of 88 degrees as shown in FIG. 27 was used to cut one end portion of the optical waveguide down to the very surface of the substrate to thereby form an oblique end face. Thereafter, a piece of 5 cm in length and 1 cm in width was cut out of the resulting product. The optical waveguide was then peeled from the substrate to produce a waveguide film type optical deflector as shown in FIG. 28.

A laser beam 76 of 0.85 $\mu$m in wavelength was cast into the produced waveguide film type optical deflector via the vertical end face 75 thereof to examine an intensity profile in far visual field of reflected light 78 resulting from reflection on the oblique end face 77 thereof, whereby the angle of deflection was measured. The angle of deflection was 90 degrees. On the other hand, the total light intensity of the reflected light was measured with an optical detector to examine the reflectance of the oblique end face as a mirror, which was found to be 83%.

EXAMPLE 2

A flatiron heated at a temperature of 180° C. was pressed against the oblique end face 77 of a waveguide film type optical deflector produced in the same manner as in Example 1 to effect a planarization treatment thereof. Thereafter, the angle of deflection and reflectance of the oblique end face mirror were measured to be 90 degrees and 85%, respectively.

EXAMPLE 3

The oblique end face 77 of a waveguide film type optical deflector produced in the same manner as in Example 1 was immersed in methyl isobutyl ketone to effect a planarization treatment thereof. Thereafter, the angle of deflection and reflectance of the oblique end face mirror were measured to be 90 degrees and 85%, respectively.

EXAMPLE 4

The oblique end face 77 of a waveguide film type optical deflector produced in the same manner as in Example 1 was immersed in chlorobenzene to effect a planarization treatment thereof. Thereafter, the angle of deflection and reflectance of the oblique end face mirror were measured to be 90 degrees and 85%, respectively.

EXAMPLE 5

The oblique end face 77 of a waveguide film type optical deflector produced in the same manner as in Example 1 was metallized with gold by vacuum deposition. Thereafter, the angle of deflection and reflectance of the oblique end face mirror were measured to be 90 degrees and 97%, respectively.

EXAMPLE 6

The oblique end face 77 of a waveguide film type optical deflector produced in the same manner as in Example 1 was metallized with silver by vacuum deposition. Thereafter, the angle of deflection and reflectance of the oblique end face mirror were measured to be 90 degrees and 96%, respectively.

EXAMPLE 7

The oblique end face 77 of a waveguide film type optical deflector produced in the same manner as in Example 1 was metallized with aluminum by vacuum deposition. Thereafter, the angle of deflection and reflectance of the oblique end face mirror were measured to be 90 degrees and 90%, respectively.

EXAMPLE 8

Figure 29:
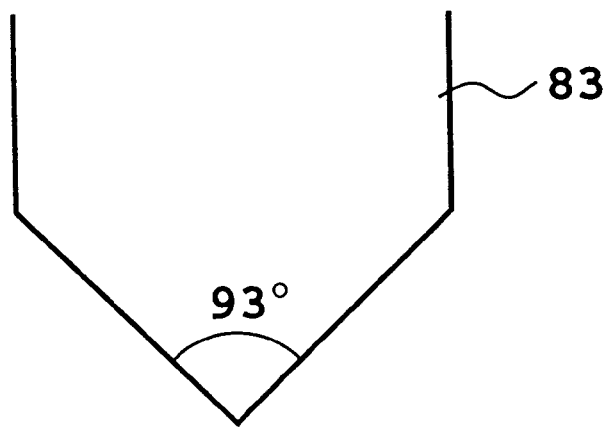
FIG. 29 is a cross-sectional view of a blade tip, which illustrates another example of the blade of the present invention.

An embedded optical waveguide comprising a core of polymethyl methacrylate and a cladding of an epoxy resin was formed on a silicon substrate. The refractive indices of the core and the cladding were 1.490 and 1.475, respectively, while the cross section of the core was square with a width of 40 $\mu$m and a height of 40 $\mu$m. A blade 83 having a blade tip worked to be V-shaped in cross section with a vertical angle of 93 degrees as shown in FIG. 29 was used to cut one end portion of the optical waveguide down to the very surface of the substrate to thereby form an oblique end face. Thereafter, a piece of 5 cm in length and 1 cm in width was cut out of the resulting product. The optical waveguide was then peeled from the substrate to produce a waveguide film type optical deflector.

A laser beam of 0.85 $\mu$m in wavelength was cast into the produced waveguide film type optical deflector via the vertical end face thereof to examine an intensity profile in far visual field of reflected light resulting from reflection on the oblique end face thereof, whereby the angle of deflection was measured. The angle of deflection was 85 degrees. On the other hand, the total light intensity of the reflected light was measured with an optical detector to examine the reflectance of the oblique end face as a mirror, which was found to be 95%.

EXAMPLE 9

A flatiron heated at a temperature of 180° C. was pressed against the oblique end face of a waveguide film type optical deflector produced in the same manner as in Example 8 to effect a planarization treatment thereof. Thereafter, the angle of deflection and reflectance of the oblique end face mirror were measured to be 85 degrees and 97%, respectively.

EXAMPLE 10

The oblique end face of a waveguide film type optical deflector produced in the same manner as in Example 8 was immersed in methyl isobutyl ketone to effect a planarization treatment thereof. Thereafter, the angle of deflection and reflectance of the oblique end face mirror were measured to be 85 degrees and 97%, respectively.

EXAMPLE 11

The oblique end face of a waveguide film type optical deflector produced in the same manner as in Example 8 was immersed in chlorobenzene to effect a planarization treatment thereof. Thereafter, the angle of deflection and reflectance of the oblique end face mirror were measured to be 85 degrees and 97%, respectively.

EXAMPLE 12

Figure 30:
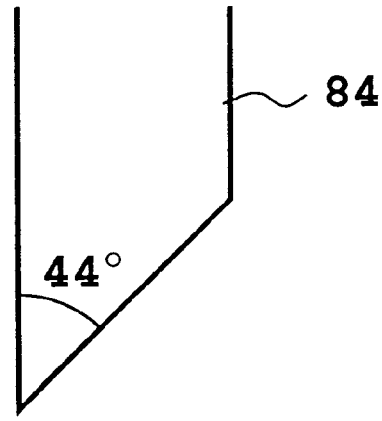
FIG. 30 is a cross-sectional view of a blade tip, which illustrates still another example of the blade of the present invention.
Figure 31:
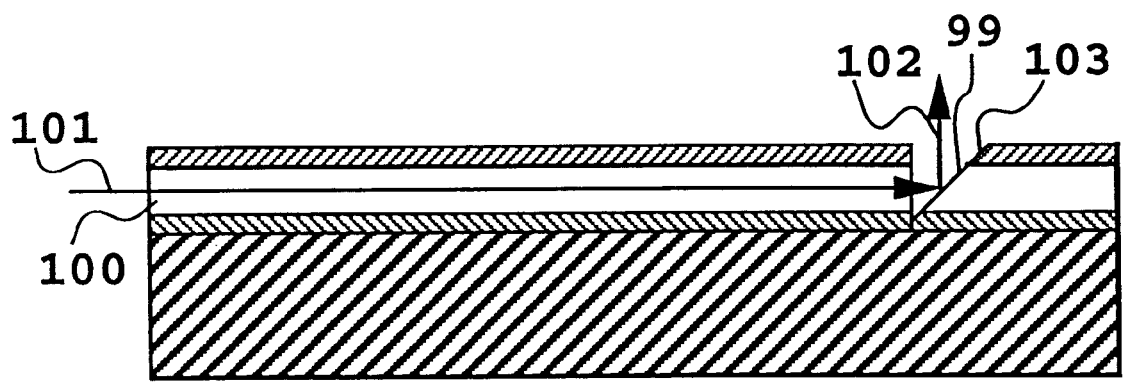
FIG. 31 is a longitudinal cross-sectional view illustrating another example of the optical deflector of the present invention.

An embedded optical waveguide comprising a core of polymethyl methacrylate and a cladding of an epoxy resin was formed on a silicon substrate. The refractive indices of the core and the cladding were 1.490 and 1.475, respectively, while the cross section of the core was square with a width of 40 μm and a height of 40 μm. A blade 84 having a blade tip worked to be cuneiform in cross section with a vertical angle of 44 degrees as shown in FIG. 30 was used to cut one end portion of the optical waveguide down to the very surface of the substrate to thereby form an oblique end face 99, which was then metallized with gold 103 by vacuum deposition. Thereafter, a piece of 5 cm in length and 2 cm in width was cut out of the resulting product to produce a waveguide film type optical deflector as shown in FIG. 31.

A laser beam 101 of 0.85 μm in wavelength was cast into the produced waveguide film type optical deflector via the vertical end face 100 thereof to examine an intensity profile in far visual field of reflected light 102 resulting from reflection on the oblique end face 99 thereof, whereby the angle of deflection was measured. The angle of deflection was 90 degrees. On the other hand, the total light intensity of the reflected light was measured with an optical detector to examine the reflectance of the oblique end face as a mirror, which was found to be 96%. Further, the intensity of light returned to the light-incident end face of the waveguide was measured to examine the return loss, which was found to be −15 dB.

EXAMPLE 13

A waveguide film type optical deflector was produced in substantially the same manner as in Example 12 except that silver was used as the metal for vacuum deposition on the oblique end face.

A laser beam of 0.85 μm in wavelength was cast into the produced waveguide film type optical deflector via the vertical end face thereof to examine an intensity profile in far visual field of reflected light resulting from reflection on the oblique end face thereof, whereby the angle of deflection was measured. The angle of deflection was 90 degrees. On the other hand, the total light intensity of the reflected light was measured with an optical detector to examine the reflectance of the oblique end face as a mirror, which was found to be 95%.

EXAMPLE 14

A waveguide film type optical deflector was produced in substantially the same manner as in Example 12 except that aluminum was used as the metal for vacuum deposition on the oblique end face.

A laser beam of 0.85 μm in wavelength was cast into the produced waveguide film type optical deflector via the vertical end face thereof to examine an intensity profile in far visual field of reflected light resulting from reflection on the oblique end face thereof, whereby the angle of deflection was measured. The angle of deflection was 90 degrees. On the other hand, the total light intensity of the reflected light was measured with an optical detector to examine the reflectance of the oblique end face as a mirror, which was found to be 89%.

EXAMPLE 15

A 1×2Y branched embedded optical waveguide comprising a core of polymethyl methacrylate and a cladding of an epoxy resin as shown in FIG. 26 was formed on a silicon substrate. The total length of the optical waveguide was 5 cm, and the distance between the centers of the two branched cores was 2.5 mm. The refractive indices of the core and the cladding were 1.490 and 1.475, respectively, while the cross section of the core was square with a width of 40 μm and a height of 40 μm. The thickness of the lower cladding layer was 20 μm, while the thickness of the upper cladding layer was 60 μm (20 μm from the upper surface of the core). A blade 84 having a blade tip worked to be cuneiform in cross section with a vertical angle of 44 degrees as shown in FIG. 30 was used to cut the optical waveguide at positions 72, 73 and 74 thereof as shown in FIG. 26 and down to the very surface of the substrate to thereby form oblique end faces, which were then metallized with gold by vacuum deposition. Thereafter, a surface emitting laser of 0.85 μm in oscillation wavelength was mounted over the oblique end face as a mirror formed at the position 72 in such a way that the emitting surface thereof faced the mirror, while photodiodes were respectively mounted over the oblique end faces as mirrors formed at the positions 73 and 74 in such a way that the sensitive surfaces thereof faced the respective mirrors.

An electric current was injected into the surface emitting laser to emit a laser beam (0.80 mW), which was propagated through the waveguide via the mirror, and received by the photodiodes via the mirrors to measure the powers of the received laser beams. The intensities of the laser beams received at the positions 73 and 74 were 0.32 mW and 0.31 mW, respectively

EXAMPLE 16

Two deuterated polyfluoromethacrylates differing in copolymerization ratio (hereinafter referred to as "Polymer A" and "Polymer B," see "Japanese Patent Application No. 282,023/1990 directed to a plastic optical waveguide") were synthesized. The refractive indices of Polymer A and Polymer B were 1.490 and 1.483, respectively. A single-mode embedded optical waveguide comprising a core of Polymer A and a cladding of Polymer B was formed on a silicon substrate. The cross section of the core was square with a width of 7 μm and a height of 7 μm. The thickness of the lower cladding layer was 20 μm, while the thickness of the upper cladding layer was 27 μm (20 μm from the upper surface of the core). An epoxy resin of 50 μm in thickness was applied on the upper cladding layer for the purpose of reinforcement. A blade 82 having a blade tip worked to be V-shaped in cross section with a vertical angle of 88 degrees as shown in FIG. 27 was used to cut one end portion of the optical waveguide down to the very surface of the substrate to thereby form an oblique end face. Thereafter, a piece of 5 cm in length and 1 cm in width was cut out of the resulting product. The optical waveguide was then peeled from the substrate to produce a waveguide film type optical deflector.

A laser beam of 1.3 μm in wavelength was cast into the produced waveguide film type optical deflector via the vertical end face thereof to examine an intensity profile in far visual field of reflected light resulting from reflection on the oblique end face thereof, whereby the angle of deflection was measured. The angle of deflection was 90 degrees. On the other hand, the total light intensity of the reflected light was measured with an optical detector to examine the reflectance of the oblique end face as a mirror, which was found to be 78%.

EXAMPLE 17

A flatiron heated at a temperature of 180° C. was pressed against the oblique end face of a waveguide film type optical deflector produced in the same manner as in Example 16 to effect a planarization treatment thereof. Thereafter, the angle of deflection and reflectance of the oblique end face mirror were measured to be 90 degrees and 80%, respectively.

EXAMPLE 18

The oblique end face of a waveguide film type optical deflector produced in the same manner as in Example 16 was immersed in methyl isobutyl ketone to effect a planarization treatment thereof. Thereafter, the angle of deflection and reflectance of the oblique end face mirror were measured to be 90 degrees and 80%, respectively.

EXAMPLE 19

The oblique end face of a waveguide film type optical deflector produced in the same manner as in Example 16 was immersed in chlorobenzene to effect a planarization treatment thereof. Thereafter, the angle of deflection and reflectance of the oblique end face mirror were measured to be 90 degrees and 80%, respectively.

EXAMPLE 20

The oblique end face of a waveguide film type optical deflector produced in the same manner as in Example 16 was metallized with gold by vacuum deposition. Thereafter, the angle of deflection and reflectance of the oblique end face mirror were measured to be 90 degrees and 94%, respectively.

EXAMPLE 21

The oblique end face of a waveguide film type optical deflector produced in the same manner as in Example 16 was metallized with silver by vacuum deposition. Thereafter, the angle of deflection and reflectance of the oblique end face mirror were measured to be 90 degrees and 92%, respectively.

EXAMPLE 22

The oblique end face of a waveguide film type optical deflector produced in the same manner as in Example 16 was metallized with aluminum by vacuum deposition. Thereafter, the angle of deflection and reflectance of the oblique end face mirror were measured to be 87 degrees and 89%, respectively.

EXAMPLE 23

Two deuterated polysiloxanes differing in copolymerization ratio (hereinafter referred to as "Polymer C" and "Polymer D," see "Japanese Patent Application No. 282,023/1990 directed to a plastic optical waveguide") were synthesized. The refractive indices of Polymer A and Polymer B were 1.545 and 1.537, respectively. A single-mode embedded optical waveguide comprising a core of Polymer C and a cladding of Polymer D was formed on a silicon substrate. The cross section of the core was square with a width of 7 $\mu$m and a height of 7 $\mu$m. The thickness of the lower cladding layer was 20 $\mu$m, while the thickness of the upper cladding layer was 27 $\mu$m (20 $\mu$m from the upper surface of the core). An epoxy resin of 50 $\mu$m in thickness was applied on the upper cladding layer for the purpose of reinforcement. A blade 82 having a blade tip worked to be V-shaped in cross section with a vertical angle of 88 degrees as shown in FIG. 27 was used to cut one end portion of the optical waveguide down to the very surface of the substrate to thereby form an oblique end face. Thereafter, apiece of 5 cm in length and 1 cm in width was cut out of the resulting product. The optical waveguide was then peeled from the substrate to produce a waveguide film type optical deflector.

A laser beam of 1.55 $\mu$m in wavelength was cast into the produced waveguide film type optical deflector via the vertical end face thereof to examine an intensity profile in far visual field of reflected light resulting from reflection on the oblique end face thereof, whereby the angle of deflection was measured. The angle of deflection was 90 degrees. On the other hand, the total light intensity of the reflected light was measured with an optical detector to examine the reflectance of the oblique end face as a mirror, which was found to be 80%.

EXAMPLE 24

A flatiron heated at a temperature of 400° C. was pressed against the oblique end face of a waveguide film type optical deflector produced in the same manner as in Example 23 to effect a planarization treatment thereof. Thereafter, the angle of deflection and reflectance of the oblique end face mirror were measured to be 90 degrees and 83%, respectively.

EXAMPLE 25

The oblique end face of a waveguide film type optical deflector produced in the same manner as in Example 23 was immersed in anisole to effect a planarization treatment thereof. Thereafter, the angle of deflection and reflectance of the oblique end face mirror were measured to be 90 degrees and 83%, respectively.

EXAMPLE 26

The oblique end face of a waveguide film type optical deflector produced in the same manner as in Example 23 was immersed in chlorobenzene to effect a planarization treatment thereof. Thereafter, the angle of deflection and reflectance of the oblique end face mirror were measured to be 90 degrees and 83%, respectively.

EXAMPLE 27

The oblique end face of a waveguide film type optical deflector produced in the same manner as in Example 23 was metallized with gold by vacuum deposition. Thereafter, the angle of deflection and reflectance of the oblique end face mirror were measured to be 90 degrees and 93%, respectively.

EXAMPLE 28

The oblique end face of a waveguide film type optical deflector produced in the same manner as in Example 23 was metallized with silver by vacuum deposition. Thereafter, the angle of deflection and reflectance of the oblique end face mirror were measured to be 90 degrees and 92%, respectively.

EXAMPLE 29

The oblique end face of a waveguide film type optical deflector produced in the same manner as in Example 23 was metallized with aluminum by vacuum deposition. Thereafter, the angle of deflection and reflectance of the oblique end face mirror were measured to be 90 degrees and 87%, respectively.

27

EXAMPLE 30

A quartz glass optical waveguide was formed on a quartz substrate. The refractive indices of the core and the cladding were 1.473 and 1.459, respectively. The cross section of the core was square with a width of 40 μm and a height of 40 μm. The thickness of the lower cladding layer was 20 μm, while the thickness of the upper cladding layer was 40 μm (20 μm from the upper surface of the core). A blade 82 having a blade tip worked to be V-shaped in cross section with a vertical angle of 88 degrees as shown in FIG. 27 was used to cut one end portion of the optical waveguide down to the very surface of the substrate to thereby form an oblique end face. Thereafter, a piece of 5 cm in length and 1 cm in width was cut out of the resulting product to produce a waveguide type optical deflector.

A laser beam of 0.85 μm in wavelength was cast into the produced waveguide type optical deflector via the vertical end face thereof to examine an intensity profile in far visual field of reflected light resulting from reflection on the oblique end face thereof, whereby the angle of deflection was measured. The angle of deflection was 90 degrees. On the other hand, the total light intensity of the reflected light was measured with an optical detector to examine the reflectance of the oblique end face as a mirror, which was found to be 78%.

EXAMPLE 31

The oblique end face of a waveguide film type optical deflector produced in the same manner as in Example 30 was immersed in a mixed solution of hydrogen fluoride and ammonium fluoride to effect a planarization treatment thereof. Thereafter, the angle of deflection and reflectance of the oblique end face mirror were measured to be 90 degrees and 80%, respectively.

EXAMPLE 32

The oblique end face of a waveguide film type optical deflector produced in the same manner as in Example 30 was metallized with gold by vacuum deposition. Thereafter, the angle of deflection and reflectance of the oblique end face mirror were measured to be 90 degrees and 93%, respectively.

EXAMPLE 33

The oblique end face of a waveguide film type optical deflector produced in the same manner as in Example 30 was metallized with silver by vacuum deposition. Thereafter, the angle of deflection and reflectance of the oblique end face mirror were measured to be 90 degrees and 92%, respectively.

EXAMPLE 34

The oblique end face of a waveguide film type optical deflector produced in the same manner as in Example 30 was metallized with aluminum by vacuum deposition. Thereafter, the angle of deflection and reflectance of the oblique end face mirror were measured to be 88 degrees and 88%, respectively.

EXAMPLE 35

A silica-based single-mode optical waveguide was formed on a quartz substrate. The refractive indices of the core and the cladding were 1.455 and 1.444, respectively. The cross section of the core was square with a width of 7 μm and a height of 7 μm. A blade 84 having a blade tip worked to be cuneiform in cross section with a vertical angle of 44 degrees as shown in FIG. 30 was used to cut one end portion of the optical waveguide down to the very surface of the substrate to thereby form an oblique end face, which was then metallized with gold by vacuum deposition. Thereafter, a piece of 5 cm in length and 2 cm in width was cut out of the resulting product to produce a waveguide type optical deflector.

A laser beam of 1.55 μm in wavelength was cast into the produced waveguide type optical deflector via the vertical end face thereof to examine an intensity profile in far visual field of reflected light resulting from reflection on the oblique end face thereof, whereby the angle of deflection was measured. The angle of deflection was 90 degrees. On the other hand, the total light intensity of the reflected light was measured with an optical detector to examine the reflectance of the oblique end face as a mirror, which was found to be 94%

EXAMPLE 36

An ultraviolet-curable resin of 1.485 in reflective index was cast in the cuneiform groove in the optical deflector produced in Example 12, and then cured by irradiation with ultraviolet rays. Thereafter, a piece of 5 cm in length and 2 cm in width was cut out of the resulting product to produce a waveguide type optical deflector.

A laser beam of 0.85 μm in wavelength was cast into the produced waveguide type optical deflector to examine an intensity profile in far visual field of reflected light resulting from reflection on the oblique end face thereof, whereby the angle of deflection was measured. The angle of deflection was 90 degrees. On the other hand, the total light intensity of the reflected light was measured with an optical detector to examine the reflectance of the oblique end face as a mirror, which was found to be 97%. Further, the intensity of light returned to the light-incident end face of the waveguide was measured to examine the return loss, which was found to be at most −55 dB.

EXAMPLE 37

Figure 32:
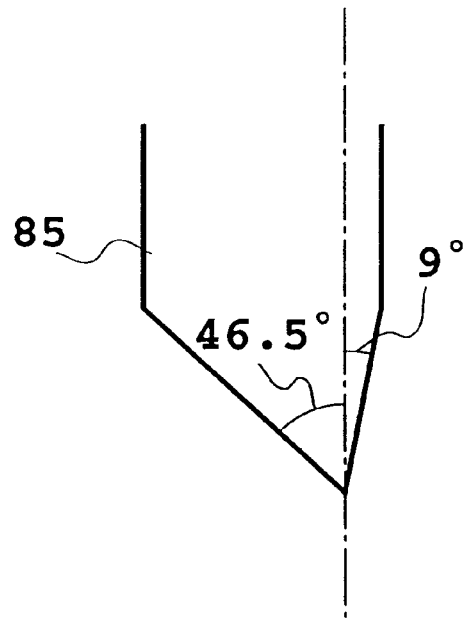
FIG. 32 is a cross-sectional view of a blade tip, which illustrates a further example of the blade of the present invention.

An embedded optical waveguide comprising a core of polymethyl methacrylate and a cladding of an epoxy resin was formed on a silicon substrate. The refractive indices of the core and the cladding were 1.490 and 1.475, respectively, while the cross section of the core was square with a width of 40 μm and a height of 40 μm. A blade 85 having a blade tip worked to be cuneiform in cross section with a vertical angle of 55.5 degrees as shown in FIG. 32 was used to cut one end portion of the optical waveguide down to the very surface of the substrate to thereby form a V-shaped groove as shown in FIG. 24. The angle θ of the end face 52 with a vertical plane was 10 degrees, while the angle φ of the oblique end face 9 with the optical axis of the waveguide was 42.5 degrees. The oblique end face 9 was then metallized with gold by vacuum deposition. Thereafter, a piece of 5 cm in length and 2 cm in width was cut out of the resulting product to produce a waveguide type optical deflector.

A laser beam of 0.85 μm in wavelength was cast into the produced waveguide type optical deflector to examine an intensity profile in far visual field of reflected light 63 resulting from reflection on the oblique end face 9 thereof, whereby the angle of deflection was measured. The angle of deflection was 90 degrees. On the other hand, the total light intensity of the reflected light was measured with an optical detector to examine the reflectance of the oblique end face as a mirror, which was found to be 95%. Further, the intensity of light returned to the light-incident end face of the waveguide was measured to examine the return loss, which was found to be at most −50 dB.

EXAMPLE 38

Figure 33:
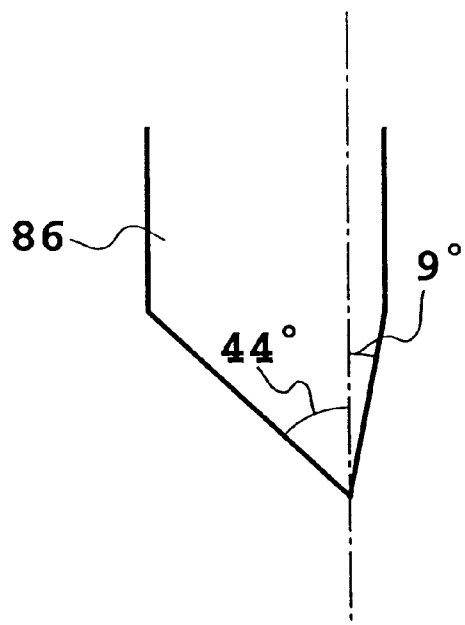
FIG. 33 is a cross-sectional view of a blade tip, which illustrates a further example of the blade of the present invention.

An embedded optical waveguide comprising a core of polymethyl methacrylate and a cladding of an epoxy resin was formed on a silicon substrate. The refractive indices of the core and the cladding were 1.490 and 1.475, respectively, while the cross section of the core was square with a width of 40 μm and a height of 40 μm. A blade 86 having a blade tip worked to be cuneiform in cross section with a vertical angle of 53 degrees as shown in FIG. 33 was used to cut one end portion of the optical waveguide down to the very surface of the substrate to thereby form a V-shaped groove as shown in FIG. 24. The angle θ of the end face 52 with a vertical plane was 10 degrees, while the angle φ of the oblique end face 9 with the optical axis of the waveguide was 45 degrees. The oblique end face 9 was then metallized with gold by vacuum deposition. Thereafter, an ultraviolet-curing resin 70 of 1.485 in refractive index was cast in this V-shaped groove (FIG. 25), and then cured by irradiation with ultraviolet rays. Thereafter, a piece of 5 cm in length and 2 cm in width was cut out of the resulting product to produce a waveguide film type optical deflector.

A laser beam of 0.85 μm in wavelength was cast into the produced planar waveguide type optical deflector to examine an intensity profile in far visual field of reflected light 63 resulting from reflection on the oblique end face 9 thereof, whereby the angle of deflection was measured. The angle of deflection was 90 degrees. On the other hand, the total light intensity of the reflected light was measured with an optical detector to examine the reflectance of the oblique end face as a mirror, which was found to be 96%. Further, the intensity of light returned to the light-incident end face of the waveguide was measured to examine the return loss, which was found to be at most −70 dB.

The foregoing Examples 1 to 38 are each related to a planar waveguide type optical deflector. The following Examples will illustrate an optical fiber type optical deflector.

EXAMPLE 39

Example 39 according to the present invention will be described while referring to FIGS. 10 and 11. In FIGS. 10 and 11, numeral 21 refers to a silicon substrate, 22 to an optical fiber, 23 to an end portion of the optical fiber, 24 to an adhesive film, 25 to the core of the optical fiber, 26 to the cladding of the optical fiber, 27 to an oblique end face, 28 to a light being propagated through the optical fiber, 29 to a light being propagated downward out of the optical fiber through deflection by the oblique end face mirror or a light being cast into the optical fiber from below out of the optical fiber via the oblique end face mirror, 30 to an oblique end face, 31 to a light being propagated through the optical fiber, and 32 to a light being propagated upward out of the optical fiber through deflection by the oblique end face mirror or a light being cast into the optical fiber from above out of the optical fiber via the oblique end face mirror.

The one exposed end portion 23 of the graded index multimode optical fiber 22 of 50 μm in core diameter was placed on the silicon substrate 21, and then fixed using the ultraviolet-curing adhesive film 24 in such a way that the whole end portion and part of the unexposed portion were covered with the adhesive film 24 as shown in FIG. 10. A diamond blade 82 having a blade tip worked to be V-shaped in cross section with a vertical angle of 88 degrees as shown in FIG. 27 was then used to cut the optical fiber down to the very surface of the substrate to thereby form an oblique end face 27. The adhesive film 24 was then irradiated with ultraviolet rays, and peeled to separate the optical fiber 22 from the silicon substrate 21 to thereby produce an optical fiber with an oblique end face mirror as shown in FIG. 11B.

A laser beam of 0.85 μm in wavelength was cast into the produced optical fiber with the oblique end face mirror via the other end thereof to examine an intensity profile in far visual field of reflected light resulting from reflection on the oblique end face 27 thereof, whereby the angle of deflection was measured. The angle of deflection was 90 degrees. On the other hand, the total light intensity of the reflected light was measured with an optical detector to examine the reflectance of the oblique end face mirror, which was found to be 78%.

EXAMPLE 40

The oblique end face of an optical fiber with an oblique end face mirror produced in the same manner as in Example 39 was immersed in a mixed solution of hydrogen fluoride and ammonium fluoride to effect a smoothing treatment thereof. Thereafter, the angle of deflection and reflectance of the oblique end face mirror were measured to be 90 degrees and 80%, respectively.

EXAMPLE 41

The oblique end face of an optical fiber with an oblique end face mirror produced in the same manner as in Example 39 was metallized with gold by vacuum deposition. Thereafter, the angle of deflection and reflectance of the oblique end face mirror were measured to be 90 degrees and 93%, respectively.

EXAMPLE 42

The oblique end face of an optical fiber with an oblique end face mirror produced in the same manner as in Example 39 was metallized with silver by vacuum deposition. Thereafter, the angle of deflection and reflectance of the oblique end face mirror were measured to be 90 degrees and 92%, respectively.

EXAMPLE 43

The oblique end face of an optical fiber with an oblique end face mirror produced in the same manner as in Example 39 was metallized with aluminum by vacuum deposition. Thereafter, the angle of deflection and reflectance of the oblique end face mirror were measured to be 88 degrees and 88%, respectively.

EXAMPLE 44

An optical fiber with an oblique end face mirror was produced in substantially the same manner as in Example 39 except that use was made of a V-shaped blade with a vertical angle of 108 degrees.

A laser beam of 0.85 μm in wavelength was cast into the produced optical fiber with the oblique end face mirror via the other end thereof to examine an intensity profile in far visual field of reflected light resulting from reflection on the oblique end face thereof, whereby the angle of deflection was measured. The angle of deflection was 70 degrees. On the other hand, the total light intensity of the reflected light was measured with an optical detector to examine the reflectance of the oblique end face mirror, which was found to be 93%.

EXAMPLE 45

Figure 11C:
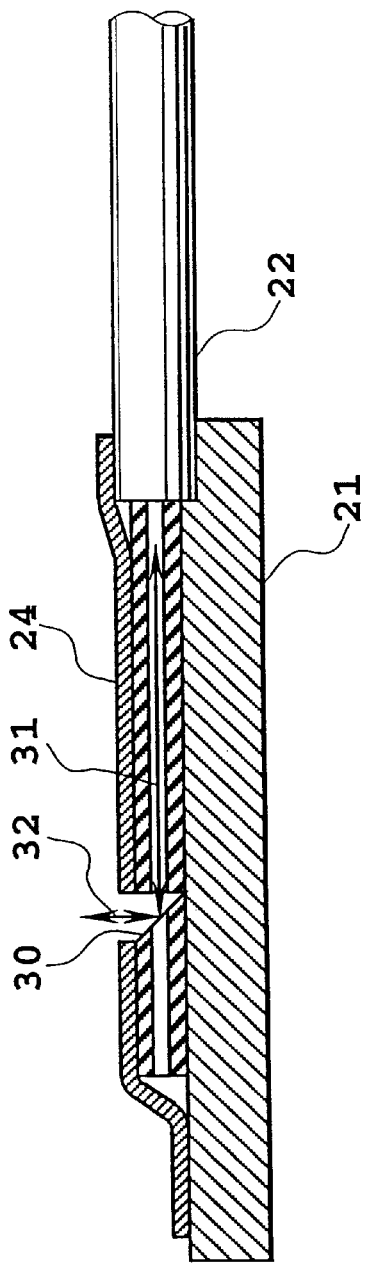
FIG. 11C is a longitudinal cross-sectional view of the optical fiber shown in FIG. 10A after formation of an oblique end face by cutting with a single-edged blade along line A–A' of FIG. 10A, the view being taken on line B–B' of FIG. 10A.

One end portion of a graded index multimode optical fiber 22 of 50 μm in core diameter was placed on a silicon substrate 21, and then fixed using an adhesive film 24 having a strong adhesive power as shown in FIG. 10. A diamond blade 84 having a blade tip worked to be single-edged in cross section with a vertical angle of 44 degrees as shown in FIG. 30 was then used to cut the optical fiber down to the very surface of the substrate to thereby form an oblique end face, which was then metallized with gold by oblique vacuum deposition to produce an optical fiber with an oblique end face mirror as shown in FIG. 11C.

A laser beam of 0.85 μm in wavelength was cast into the produced optical fiber with the oblique end face mirror via the other end thereof to examine an intensity profile in far visual field of reflected light 30 resulting from reflection on the oblique end face thereof, whereby the angle of deflection was measured. The angle of deflection was 90 degrees. On the other hand, the total light intensity of the reflected light was measured with an optical detector to examine the reflectance of the oblique end face mirror, which was found to be 94%.

EXAMPLE 46

A step index single-mode optical fiber of 10 μm in core diameter was worked and processed in the same manner as in Example 39 to produce an optical fiber with an oblique end face mirror.

A laser beam of 1.55 μm in wavelength was cast into the produced optical fiber with the oblique end face mirror via the other end thereof to examine an intensity profile in far visual field of reflected light resulting from reflection on the oblique end face thereof, whereby the angle of deflection was measured. The angle of deflection was 90 degrees. On the other hand, the total light intensity of the reflected light was measured with an optical detector to examine the reflectance of the oblique end face mirror, which was found to be 92%.

EXAMPLE 47

The oblique end face of an optical fiber with an oblique end face mirror produced in the same manner as in Example 46 was immersed in a mixed solution of hydrogen fluoride and ammonium fluoride to effect a smoothing treatment thereof. Thereafter, the angle of deflection and reflectance of the oblique end face mirror were measured to be 90 degrees and 94%, respectively.

EXAMPLE 48

A step index single-mode optical fiber of 10 μm in core diameter was worked and processed in the same manner as in Example 45 to produce an optical fiber with an oblique end face mirror.

A laser beam of 1.55 μm in wavelength was cast into the produced optical fiber with the oblique end face mirror via the vertical end thereof to examine an intensity profile in far visual field of reflected light resulting from reflection on the oblique end face thereof, whereby the angle of deflection was measured. The angle of deflection was 90 degrees. On the other hand, the total light intensity of the reflected light was measured with an optical detector to examine the reflectance of the oblique end face mirror, which was found to be 93%.

EXAMPLE 49

Example 49 according to the present invention will be described while referring to FIGS. 34 and 35.

Figure 34A:
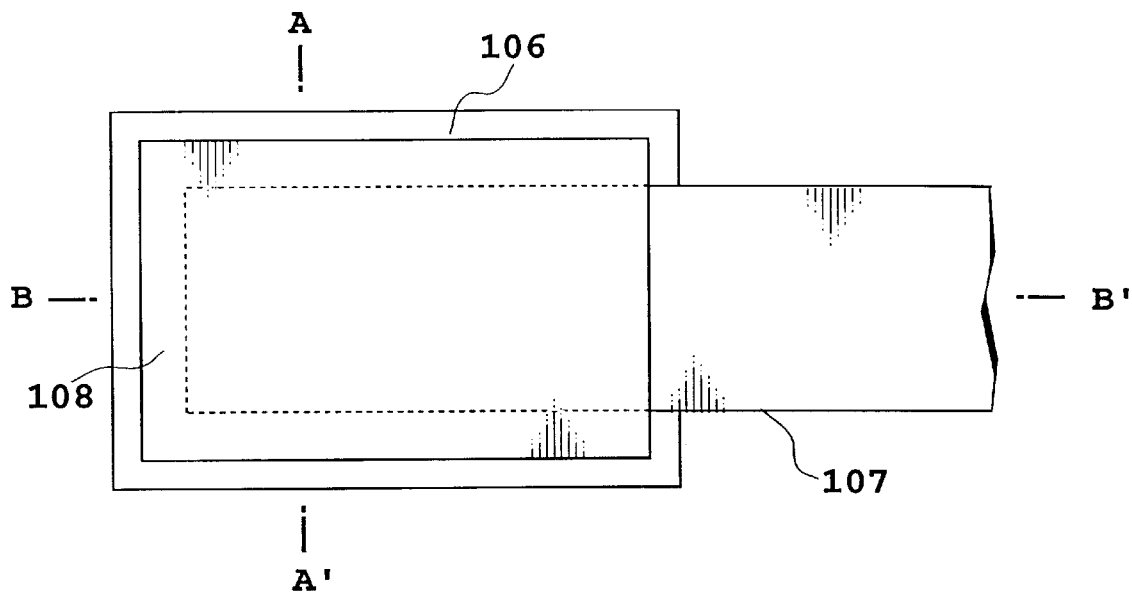
FIG. 34A is a top plan view of an optical fiber ribbon fixed on a substrate with an adhesive film.
Figure 34B:
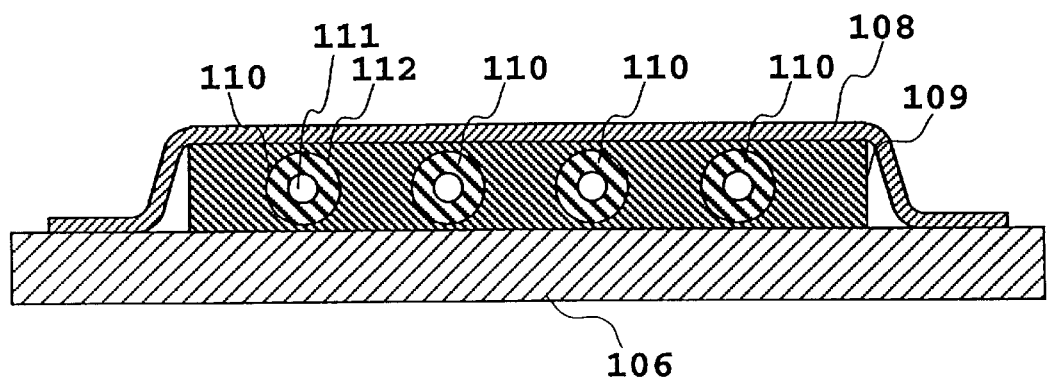
FIG. 34B is a lateral cross-sectional of the optical fiber ribbon, taken on line A–A' of FIG. 34A.
Figure 35A:
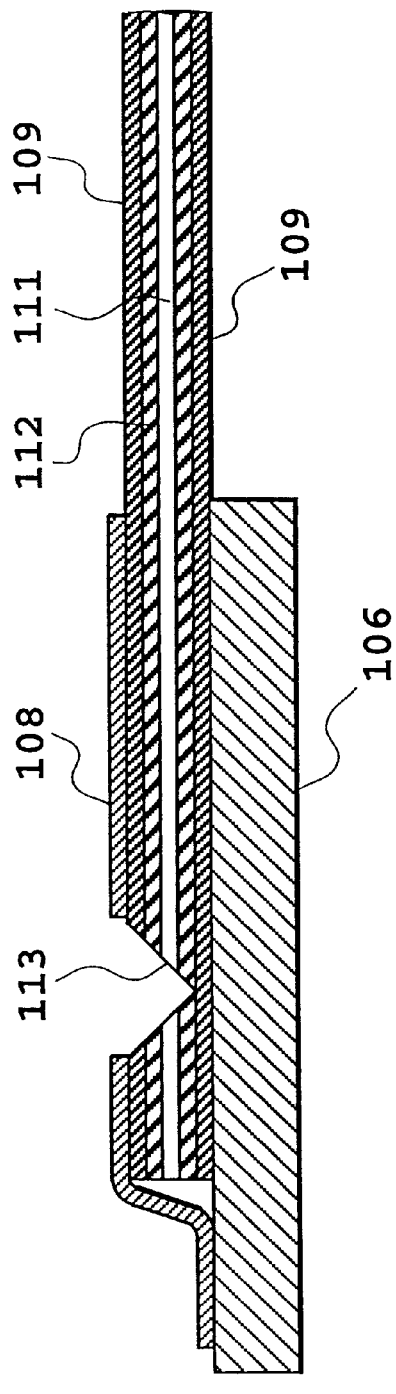
FIG. 35A is a longitudinal cross-sectional view of a worked state of the optical fiber ribbon having oblique end faces formed by cutting along line A–A' of FIG. 34A, the view being taken on line B–B' of FIG. 34A.
Figure 35B:
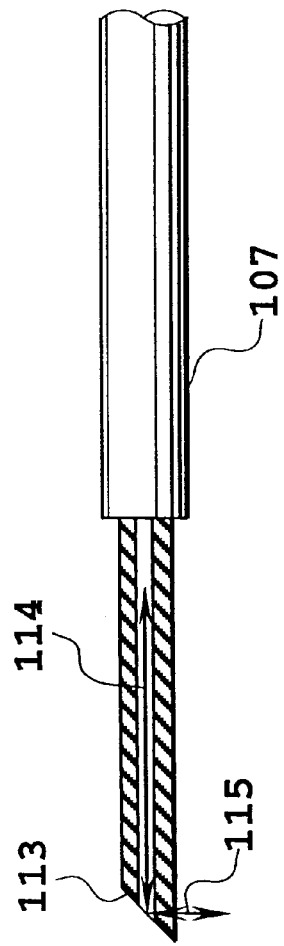
FIG. 35B is a longitudinal cross-sectional view of an optical fiber ribbon with oblique end face mirrors, produced by forming the oblique end faces through the above-mentioned cutting, subsequent peeling of the adhesive film for separation of the optical fiber from the substrate, and subsequent peeling of a cover present in an end portion thereof.

One end portion of a four-core optical fiber ribbon 107 comprising graded index multimode optical fibers 110 of 50 μm in core diameter covered with a covering material 109, while still having the covering material, was placed on a silicon substrate 106, and then fixed using an ultraviolet-degradable adhesive film 108 as shown in FIGS. 34A and 34B. Each optical fiber 110 comprised a core 111 and a cladding 112 wrapping the core. A diamond blade 82 having a blade tip worked to be V-shaped in cross section with a vertical angle of 88 degrees as shown in FIG. 27 was then used to cut the optical fibers 110 down to the very surface of the substrate 106 to thereby form oblique end faces 113 (see FIG. 35A). The adhesive film 108 was then irradiated with ultraviolet rays, and then peeled to separate the optical fiber ribbon 107 from the silicon substrate 106. The covering material 109 in the end portion was then peeled to produce an optical fiber ribbon 107 with oblique end face mirrors as shown in FIG. 35B.

A laser beam of 0.85 μm in wavelength was cast into each of the four produced optical fibers each with an oblique end face mirror via the other end thereof, where no oblique end face mirror was formed, to examine an intensity profile in far visual field of reflected light resulting from reflection on the oblique end face 113 thereof, whereby the angle of deflection was measured. The average angle of deflection was 90 degrees with a dispersion of at most 1 degree.

On the other hand, the total light intensity of the reflected light was measured with an optical detector to examine the reflectance of the oblique end face mirror, which was found to be 78% on the average with a dispersion of at most 2%.

EXAMPLE 50

The oblique end faces of an optical fiber ribbon with oblique end face mirrors produced in the same manner as in Example 49 were immersed in a mixed solution of hydrogen fluoride and ammonium fluoride to effect a smoothing treatment thereof. Thereafter, the angle of deflection and reflectance of every oblique end face mirror were measured to be 90 degrees on the average (dispersion: at most 1 degree) and 80% on the average (dispersion: at most 2%), respectively.

EXAMPLE 51

The oblique end faces of an optical fiber ribbon with oblique end face mirrors produced in the same manner as in Example 49 were metallized with gold by vacuum deposition. Thereafter, the angle of deflection and reflectance of every oblique end face mirror were measured to be 90 degrees on the average (dispersion: at most 1 degree) and 94% on the average (dispersion: at most 2%), respectively.

EXAMPLE 52

Example 52 according to the present invention will be described while referring to FIGS. 36 and 37.

Figure 36A:
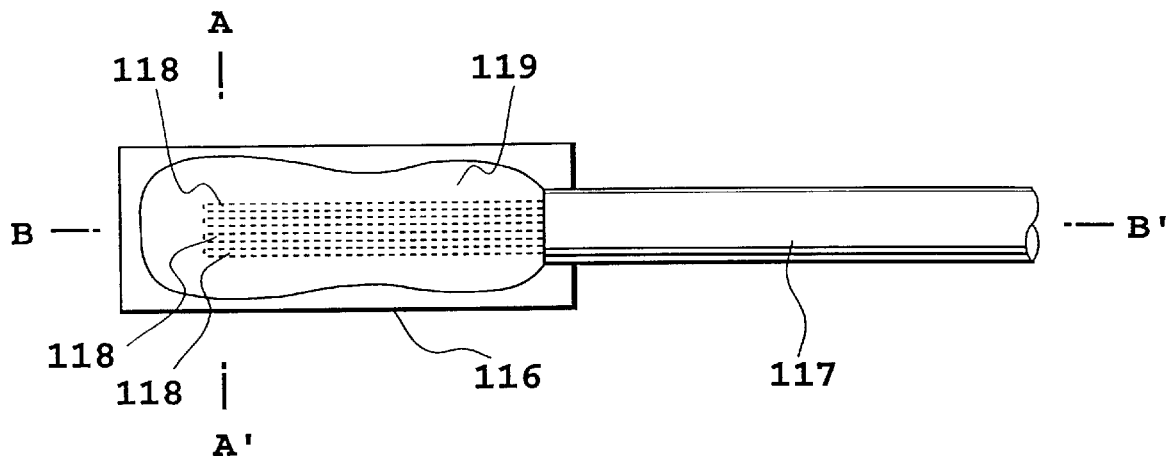
FIG. 36A is a top plan view of an optical fiber ribbon stripped of a cover present in an end portion thereof and then fixed on a substrate with V-shaped grooves with a resin adhesive, the view being a diagram illustrating a step of producing an optical fiber sheet.
Figure 36B:
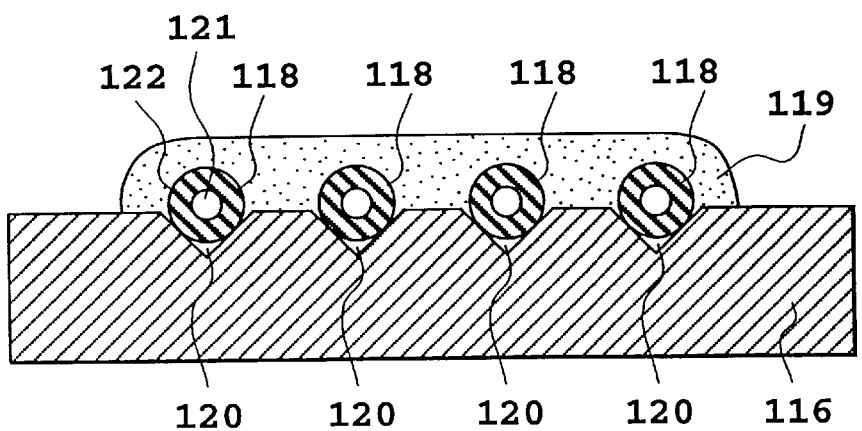
FIG. 36B is a lateral cross-sectional of the optical fiber ribbon, taken on line A–A' of FIG. 36A.
Figure 37:
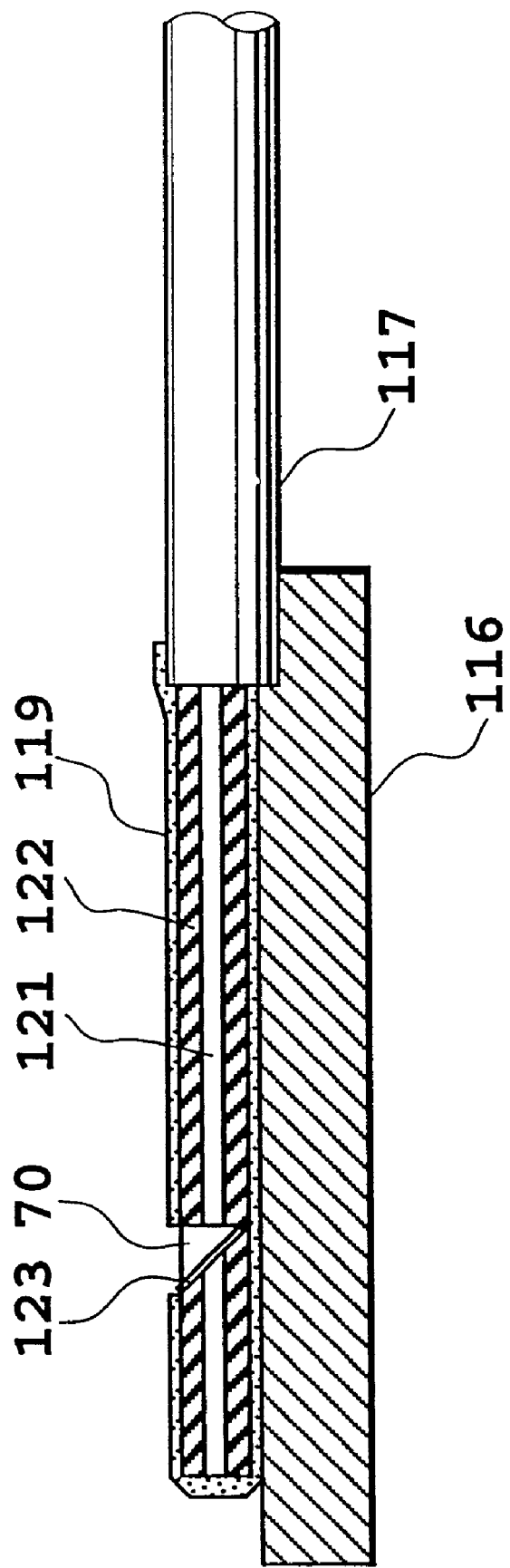
FIG. 37 is a cross-sectional view of an optical fiber fixed on a substrate, which view illustrates a state of a V-shaped groove formed in the optical fiber with a single-edged blade, and then filled with a resin in order to decrease Fresnel reflection.

One end portion of a four-core optical fiber ribbon 117 comprising graded index multimode optical fibers 118 of 50 μm in core diameter (cores 121 and claddings 122) was stripped of a cover, then disposed on a glass substrate 116 having V-shaped fixation grooves 120 formed therein in such a way as to put the optical fibers 118 in and along the respective fixation grooves 120, and then fixed using an ultraviolet-cured resin 119 as shown in FIGS. 36A and 36B. A diamond blade 84 having a blade tip worked to be single-edged in cross section with a vertical angle of 44 degrees as shown in FIG. 30 was then used to cut the optical fibers 118 down to the cladding layers 122 of the optical fibers 118 on the side of the substrate 116 to thereby form oblique end faces 123 as shown in FIG. 37. The oblique end faces was then metallized with gold by oblique vacuum deposition to produce an optical fiber ribbon 117 with oblique end face mirrors.

A laser beam of 0.85 μm in wavelength was cast into every produced optical fiber with an oblique end face mirror via the other end thereof to examine an intensity profile in far visual field of reflected light resulting from reflection on the oblique end face 123 thereof, whereby the angle of deflection was measured. The average angle of deflection was 90 degrees with a dispersion of at most 1 degree. On the other hand, the total light intensity of the reflected light was measured with an optical detector to examine the reflectance of the oblique end face mirror, which was found to be 94% on the average with a dispersion of at most 2%. Further, the intensity of light returned to the light-incident end face of every optical fiber was measured to examine the return loss, which was found to be at most −15 dB on the average.

EXAMPLE 53

Figure 38:
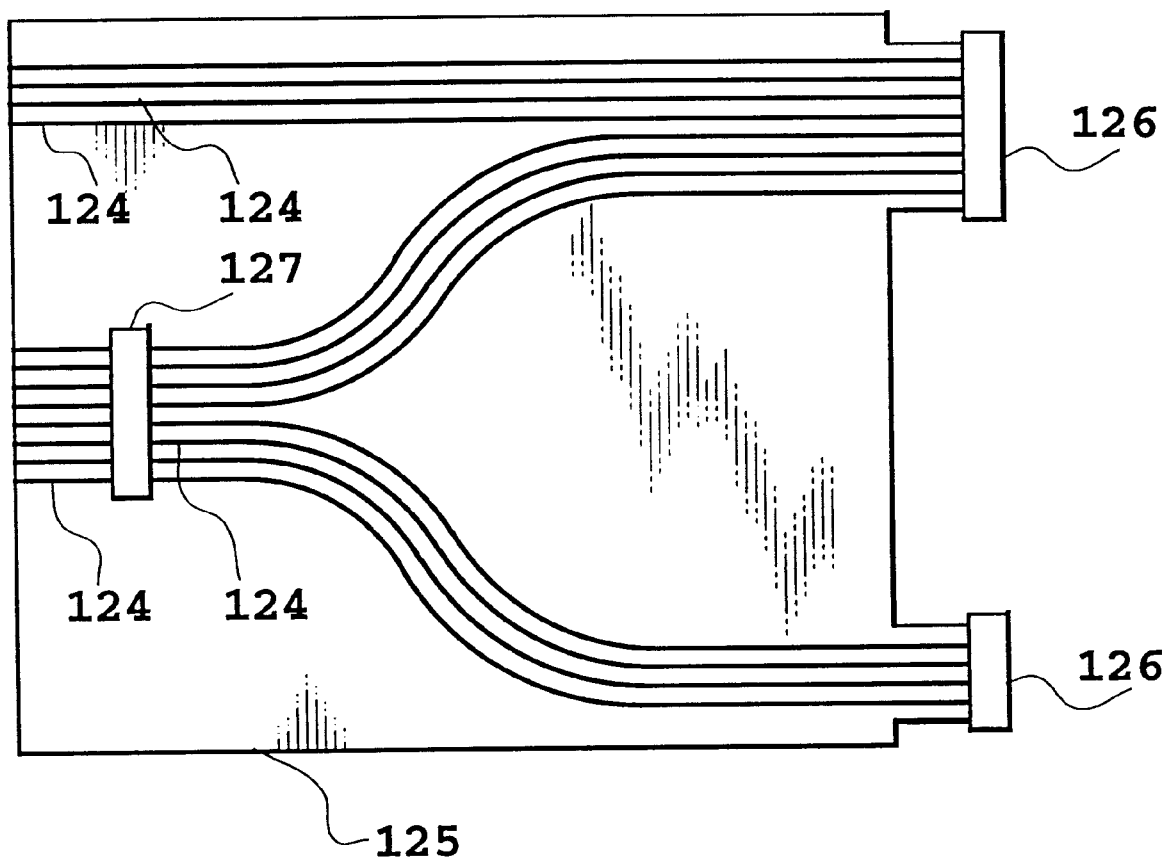
FIG. 38 is a top plan view of an optical fiber sheet produced by embedding optical fibers in a resin.

A diamond blade worked to be single-edged with a vertical angle of 44 degrees was used to partially cut an optical fiber sheet comprising 12 graded index multimode optical fibers 124 of 50 μm in core diameter embedded in a resin 125 as shown in FIG. 38 at a location denoted by numeral 127 in FIG. 38 to thereby form oblique end faces, which were then metallized with gold by oblique vacuum deposition to form deflective mirrors (oblique end faces).

A laser beam of 0.85 μm in wavelength was cast into every optical fiber via the end thereof on the side of connectors 126 to examine an intensity profile in far visual field of reflected light resulting from reflection at the location 127, where the oblique end face mirrors were formed, whereby the angle of deflection was measured for 8 optical fibers wherein the oblique end face mirrors were formed. The average angle of deflection was 90 degrees with a dispersion of at most 1 degree. On the other hand, the total light intensity of the reflected light was measured with an optical detector to examine the reflectance of every oblique end face mirror, which was found to be 94% on the average with a dispersion of at most 2%.

EXAMPLE 54

A plastic optical fiber of 1,000 μm in core diameter, comprising a core of polymethyl methacrylate, was used and cut in the same manner as in Example 39 to produce a plastic optical fiber with an oblique end face mirror.

A laser beam of 0.85 μm in wavelength was cast into the produced plastic optical fiber with the oblique end face mirror via the other end thereof to examine an intensity profile in far visual field of reflected light resulting from reflection on the oblique end face thereof, whereby the angle of deflection was measured. The angle of deflection was 90 degrees. On the other hand, the total light intensity of the reflected light was measured with an optical detector to examine the reflectance of the oblique end face mirror, which was found to be 68%.

EXAMPLE 55

A flatiron heated at a temperature of 180° C. was pressed against the oblique end face of a plastic optical fiber produced in the same manner as in Example 54 to effect a smoothing treatment thereof. Thereafter, the angle of deflection and reflectance of the oblique end face mirror were measured to be 90 degrees and 71%, respectively.

EXAMPLE 56

The oblique end face of a plastic optical fiber with an oblique end face mirror produced in the same manner as in Example 54 was immersed in methyl isobutyl ketone to effect a smoothing treatment thereof. Thereafter, the angle of deflection and reflectance of the oblique end face mirror were measured to be 90 degrees and 70%, respectively.

EXAMPLE 57

The oblique end face of a plastic optical fiber with an oblique end face mirror produced in the same manner as in Example 54 was immersed in chlorobenzene to effect a smoothing treatment thereof. Thereafter, the angle of deflection and reflectance of the oblique end face mirror were measured to be 90 degrees and 71%, respectively.

EXAMPLE 58

The oblique end face of a plastic optical fiber with an oblique end face mirror produced in the same manner as in Example 54 was metallized with gold by vacuum deposition. Thereafter, the angle of deflection and reflectance of the oblique end face mirror were measured to be 90 degrees and 96%, respectively.

EXAMPLE 59

A plastic-clad optical fiber of 200 μm in core diameter, comprising a core of a quartz glass and a cladding of a polymer, was used and cut in the same manner as in Example 39 to produce a plastic-clad optical fiber with an oblique end face mirror.

A laser beam of 0.85 μm in wavelength was cast into the produced plastic-clad optical fiber with the oblique end face mirror via the other end thereof to examine an intensity profile in far visual field of reflected light resulting from reflection on the oblique end face thereof, whereby the angle of deflection was measured. The angle of deflection was 90 degrees. On the other hand, the total light intensity of the reflected light was measured with an optical detector to examine the reflectance of the oblique end face mirror, which was found to be 69%.

EXAMPLE 60

The oblique end face of a plastic-clad optical fiber with an oblique end face mirror produced in the same manner as in Example 59 was immersed in a mixed solution of hydrogen fluoride and ammonium fluoride to effect a smoothing treatment thereof. Thereafter, the angle of deflection and reflectance of the oblique end face mirror were measured to be 90 degrees and 71%, respectively.

EXAMPLE 61

The oblique end face of a plastic-clad optical fiber with an oblique end face mirror produced in the same manner as in Example 59 was metallized with gold by vacuum deposition. Thereafter, the angle of deflection and reflectance of the oblique end face mirror were measured to be 90 degrees and 95%, respectively.

EXAMPLE 62

As shown in FIG. 36, one end portion of a four-core optical fiber ribbon 117 comprising graded index multimode optical fibers 118 of 50 μm in core diameter (cores 121 and claddings 122) was stripped of a cover, then disposed on a glass substrate 116 having V-shaped fixation grooves 120 formed therein in such a way as to put the optical fibers 118 in and along the respective fixation grooves 120, and then fixed using an ultraviolet-cured resin 119 as shown in FIGS. 36A and 36B. A diamond blade 84 having a blade tip worked to be single-edged in cross section with a vertical angle of 44 degrees as shown in FIG. 30 was then used to cut the optical fibers 118 down to the cladding layers 122 of the optical fibers on the side of the substrate 116 to thereby form oblique end faces 123, which were then metallized with gold by oblique vacuum deposition. An ultraviolet-curing resin 70 of 1.455 in refractive index was then cast in the V-shaped grooves, and then cured by irradiation with ultraviolet rays to produce an optical fiber ribbon 117 with oblique end face mirrors.

A laser beam of 0.85 μm in wavelength was cast into every produced optical fiber with an oblique end face mirror via the other end thereof to examine an intensity profile in far visual field of reflected light resulting from reflection on the oblique end face thereof, whereby the angle of deflection was measured. The average angle of deflection was 90 degrees with a dispersion of at most 1 degree. On the other hand, the total light intensity of the reflected light was measured with an optical detector to examine the reflectance of the oblique end face mirror, which was found to be 95% on the average with a dispersion of at most 2%. Further, the intensity of light returned to the light-incident end face of every optical fiber was measured to examine the return loss, which was found to be at most −55 dB on the average.

EXAMPLE 63

Figure 39:
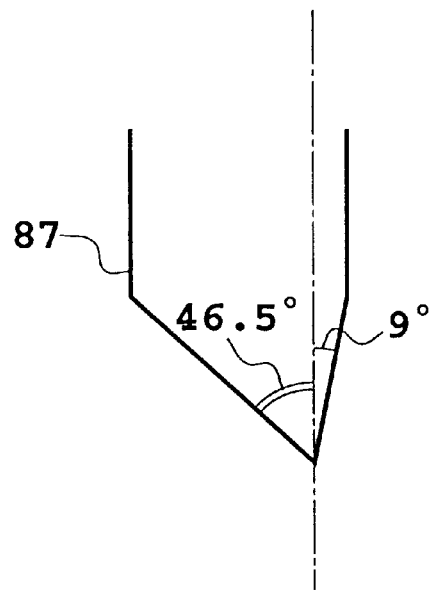
FIG. 39 is a cross-sectional view of a blade tip, which illustrates a further example of the blade of the present invention.
Figure 40:
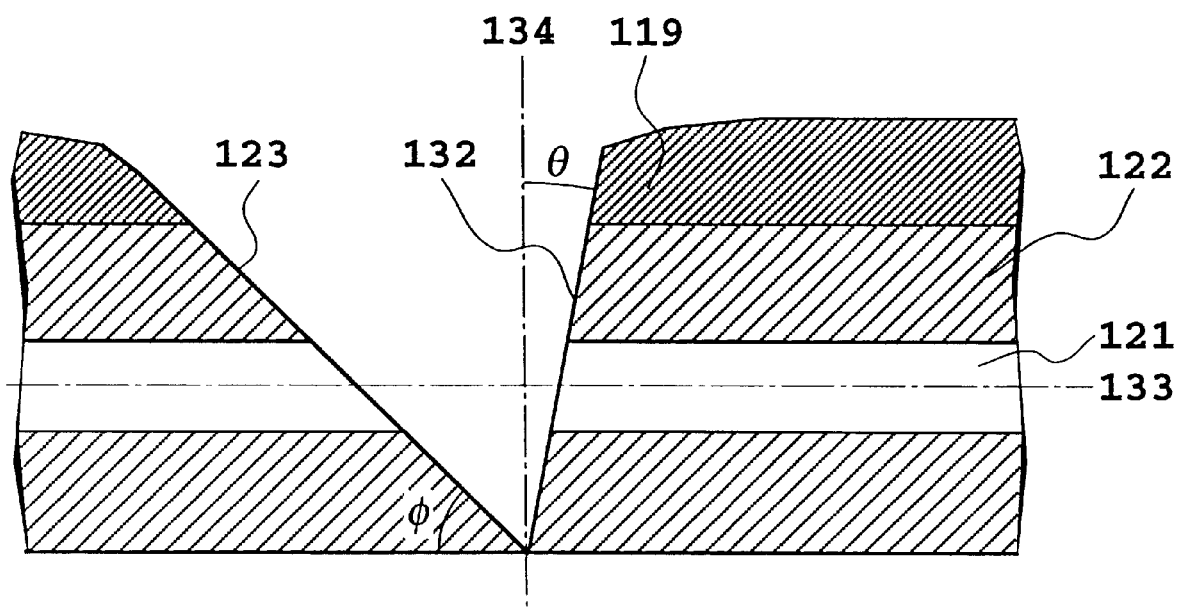
FIG. 40 is a cross-sectional view of the neighborhood of a V-shaped groove formed in an optical fiber with the blade of FIG. 39.
Figure 41:
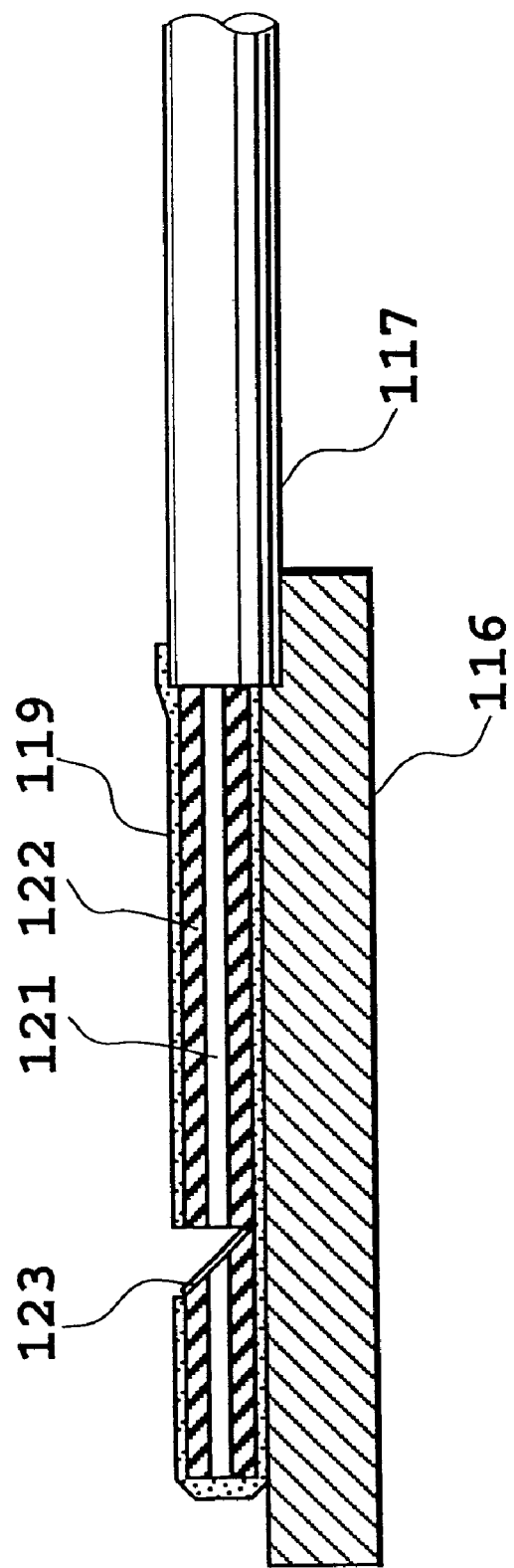
FIG. 41 is a cross-sectional view of an optical fiber fixed on a substrate, which view illustrates a state of a V-shaped groove formed in the optical fiber with a single-edged blade to provide an oblique end face, on which a metal film is then formed in order to improve the reflection of the oblique end face.

As shown in FIG. 36, one end portion of a four-core optical fiber ribbon 117 comprising graded index multimode optical fibers 118 of 50 μm in core diameter (cores 121 and claddings 122) was stripped of a cover, then disposed on a glass substrate 116 having V-shaped fixation grooves 120 formed therein in such a way as to put the optical fibers 118 in and along the respective fixation grooves 120, and then fixed using an ultraviolet-cured resin 119. A diamond blade 87 having a blade tip worked to be single-edged in cross section with a vertical angle of 5.55 degrees as shown in FIG. 39 was then used to cut the optical fibers 118 down to the cladding layers 122 of the optical fibers on the side of the substrate 116 to thereby form V-shaped grooves as shown in FIG. 40. The angle θ of each end face 132 with a vertical plane 134 was 10 degrees, while the angle "â of each oblique end face 123 with the optical axis 133 of the corresponding optical fiber was 42.5 degrees. The oblique end faces 123 were then metallized with gold by oblique vacuum deposition to produce an optical fiber ribbon 117 with oblique end face mirrors as shown in FIG. 41.

A laser beam of 0.85 μm in wavelength was cast into every produced optical fiber with an oblique end face mirror via the other end thereof to examine an intensity profile in far visual field of reflected light resulting from reflection on the oblique end face thereof, whereby the angle of deflection was measured. The average angle of deflection was 90 degrees with a dispersion of at most 1 degree. On the other hand, the total light intensity of the reflected light was measured with an optical detector to examine the reflectance of the oblique end face mirror, which was found to be 95% on the average with a dispersion of at most 2%. Further, the intensity of light returned to the light-incident end face of every optical fiber was measured to examine the return loss, which was found to be at most −55 dB on the average.

EXAMPLE 64

Figure 42:
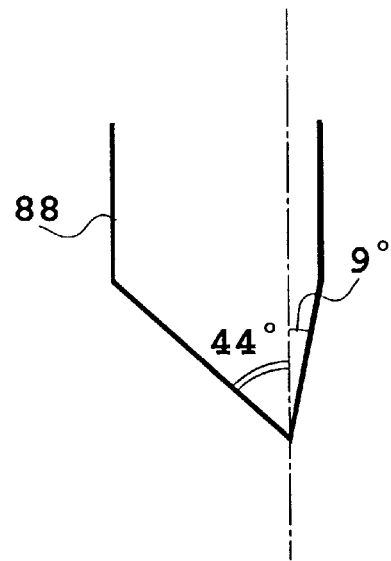
FIG. 42 is a cross-sectional view of a blade tip, which illustrates a further example of the blade of the present invention.
Figure 43:
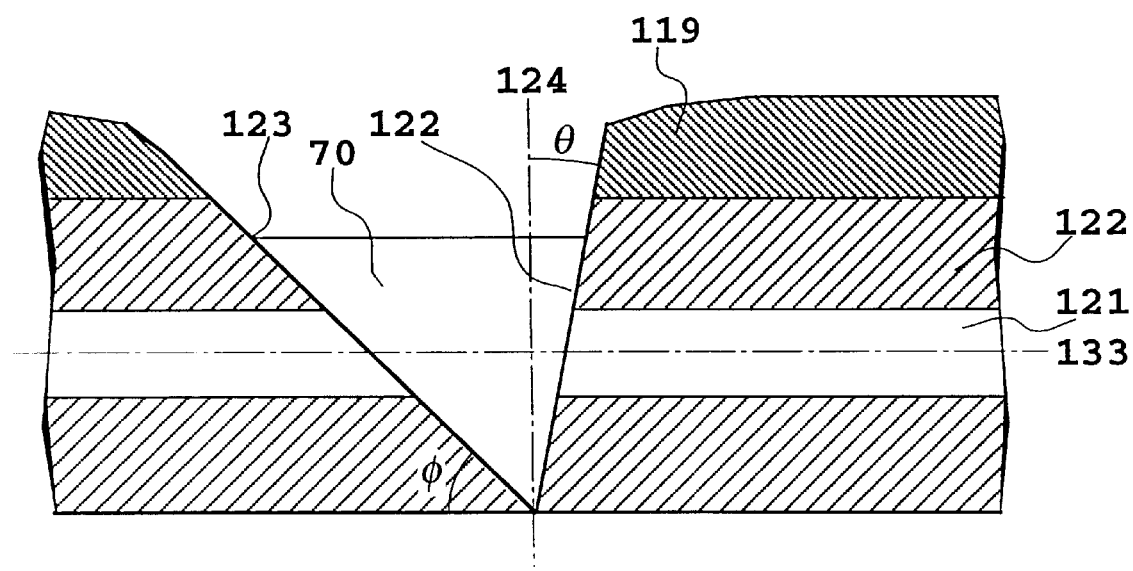
FIG. 43 is a cross-sectional view of the neighborhood of a V-shaped groove formed in an optical fiber with the blade of FIG. 42.

As shown in FIG. 36, one end portion of a four-core optical fiber ribbon 117 comprising graded index multimode optical fibers 118 of 50 μm in core diameter (cores 121 and claddings 122) was stripped of a cover, then disposed on a glass substrate 116 having V-shaped fixation grooves 120 formed therein in such a way as to put the optical fibers 118 in and along the respective fixation grooves 120, and then fixed using an ultraviolet-cured resin 119. A diamond blade 88 having a blade tip worked to be single-edged in cross section with a vertical angle of 53 degrees as shown in FIG. 42 was then used to cut the optical fibers 118 down to the cladding layers 122 of the optical fibers on the side of the substrate 116 to thereby form V-shaped grooves as shown in FIG. 40. The angle θ of each end face 132 with a plane 134 perpendicular to the optical axis 133 of the corresponding optical fiber was 10 degrees, while the angle φ of each oblique end face 123 with the optical axis 133 of the corresponding optical fiber was 45 degrees. The oblique end faces 123 were then metallized with gold by oblique vacuum deposition. Thereafter, an ultraviolet-curing resin 70 of 1.455 in refractive index was cast in these V-shaped grooves, and then cured by irradiation with ultraviolet rays to produce an optical fiber ribbon with oblique end face mirrors as shown in FIG. 43.

A laser beam of 0.85 μm in wavelength was cast into every produced optical fiber with an oblique end face mirror via the other end thereof to examine an intensity profile in far visual field of reflected light resulting from reflection on the oblique end face thereof, whereby the angle of deflection was measured. The average angle of deflection was 90 degrees with a dispersion of at most 1 degree. On the other hand, the total light intensity of the reflected light was measured with an optical detector to examine the reflectance of the oblique end face mirror 123, which was found to be 95% on the average with a dispersion of at most 2%. Further, the intensity of light returned to the light-incident end face of every optical fiber was measured to examine the return loss, which was found to be at most −70 dB on the average.

EXAMPLE 65

A four-core optical fiber ribbon comprising step index single-mode optical fibers of 9 μm in core diameter was disposed on a glass substrate having V-shaped fixation grooves formed therein in such a way as to put the optical fibers in and along the respective fixation grooves, and then fixed using an ultraviolet-cured resin. A diamond blade 84 having a blade tip worked to be single-edged in cross section with a vertical angle of 44 degrees as shown in FIG. 30 was then used in the same manner as in Example 52 to cut the optical fibers down to the cladding layers of the optical fibers on the side of the substrate to thereby form oblique end faces, which were then metallized with gold by oblique vacuum deposition to produce an optical fiber ribbon with oblique end face mirrors.

A laser beam of 1.31 μm in wavelength was cast into every produced optical fiber with an oblique end face mirror via the other end thereof to examine an intensity profile in far visual field of reflected light resulting from reflection on the oblique end face thereof, whereby the angle of deflection was measured. The average angle of deflection was 90 degrees with a dispersion of at most 1 degree. On the other hand, the total light intensity of the reflected light was measured with an optical detector to examine the reflectance of the oblique end face mirror, which was found to be 94% on the average with a dispersion of at most 2%. Further, the intensity of light returned to the light-incident end face of every optical fiber was measured to examine the return loss, which was found to be at most −15 dB on the average.

EXAMPLE 66

A four-core optical fiber ribbon comprising step index single-mode optical fibers of 9 μm in core diameter was disposed on a glass substrate having V-shaped fixation grooves formed therein in such a way as to put the optical fibers in and along the respective fixation grooves, and then fixed using an ultraviolet-cured resin. A diamond blade 84 having a blade tip worked to be single-edged in cross section with a vertical angle of 44 degrees as shown in FIG. 30 was then used in the same manner as in Example 52 to cut the optical fibers down to the cladding layers of the optical fibers on the side of the substrate to thereby form oblique end faces, which were then metallized with gold by oblique vacuum deposition. Thereafter, an ultraviolet-curing resin of 1.455 in refractive index was cast in these V-shaped grooves, and then cured by irradiation with ultraviolet rays to produce an optical fiber ribbon with oblique end face mirrors.

A laser beam of 1.31 μm in wavelength was cast into every produced optical fiber with an oblique end face mirror via the other end thereof to examine an intensity profile in far visual field of reflected light resulting from reflection on the oblique end face thereof, whereby the angle of deflection was measured. The average angle of deflection was 90 degrees with a dispersion of at most 1 degree. On the other hand, the total light intensity of the reflected light was measured with an optical detector to examine the reflectance of the oblique end face mirror, which was found to be 95% on the average with a dispersion of at most 2%. Further, the intensity of light returned to the light-incident end face of every optical fiber was measured to examine the return loss, which was found to be at most −55 dB on the average.

EXAMPLE 67

A four-core optical fiber ribbon comprising step index single-mode optical fibers of 9 μm in core diameter was disposed on a glass substrate having V-shaped fixation grooves formed therein in such a way as to put the optical fibers in and along the respective fixation grooves, and then fixed using an ultraviolet-cured resin. A diamond blade 87 having a blade tip worked to be single-edged in cross section with a vertical angle of 5.55 degrees as shown in FIG. 39 was then used in the same manner as in Example 53 to cut the optical fibers down to the cladding layers of the optical fibers on the side of the substrate to thereby form V-shaped grooves as shown in FIG. 40. The angle θ of each end face 132 with a plane 134 perpendicular to the optical axis 133 of the corresponding optical fiber was 10 degrees, while the angle φ of each oblique end face 123 with the optical axis 133 of the corresponding optical fiber was 42.5 degrees. The oblique end faces 123 were then metallized with gold by oblique vacuum deposition to produce an optical fiber ribbon with oblique end face mirrors as shown in FIG. 41.

A laser beam of 1.31 μm in wavelength was cast into every produced optical fiber with an oblique end face mirror via the other end thereof to examine an intensity profile in far visual field of reflected light resulting from reflection on the oblique end face thereof, whereby the angle of deflection was measured. The average angle of deflection was 90 degrees with a dispersion of at most 1 degree. On the other hand, the total light intensity of the reflected light was measured with an optical detector to examine the reflectance of the oblique end face mirror, which was found to be 95% on the average with a dispersion of at most 2%. Further, the intensity of light returned to the light-incident end face of every optical fiber was measured to examine the return loss, which was found to be at most −55 dB on the average.

EXAMPLE 68

A four-core optical fiber ribbon comprising step index single-mode optical fibers of 9 μm in core diameter was disposed on a glass substrate having V-shaped fixation grooves formed therein in such a way as to put the optical fibers in and along the respective fixation grooves, and then fixed using an ultraviolet-cured resin. A diamond blade 88 having a blade tip worked to be single-edged in cross section with a vertical angle of 53 degrees as shown in FIG. 42 was then used in the same manner as in Example 54 to cut the optical fibers down to the cladding layers of the optical fibers on the side of the substrate to thereby form V-shaped grooves as shown in FIG. 40. The angle θ of each end face 132 with a plane 134 perpendicular to the optical axis 133 of the corresponding optical fiber was 10 degrees, while the angle φ of each oblique end face 123 with the optical axis 133 of the corresponding optical fiber was 45 degrees. The oblique end faces 123 were then metallized with gold by oblique vacuum deposition. Thereafter, an ultraviolet-curing resin 70 of 1.455 in refractive index was cast in these V-shaped grooves, and then cured by irradiation with ultraviolet rays to produce an optical fiber ribbon with oblique end face mirrors as shown in FIG. 43.

A laser beam of 1.31 μm in wavelength was cast into every produced optical fiber with an oblique end face mirror via the other end thereof to examine an intensity profile in far visual field of reflected light resulting from reflection on the oblique end face thereof, whereby the angle of deflection was measured. The average angle of deflection was 90 degrees with a dispersion of at most 1 degree. On the other hand, the total light intensity of the reflected light was measured with an optical detector to examine the reflectance of the oblique end face mirror, which was found to be 95% on the average with a dispersion of at most 2%. Further, the intensity of light returned to the light-incident end face of every optical fiber was measured to examine the return loss, which was found to be at most −70 dB on the average.

In the present invention, polymers each represented by any one of the aforementioned structural formulae (I) to (VI) can be suitably used as described hereinbefore in the case of using a polymeric material(s) as the material(s) of an optical waveguide. These materials all exhibit a low loss of at most 0.1 dB/cm in the short wavelength region to be capable of forming an excellent optical deflector. The loss properties of these materials are shown in the following Table 1. Particularly in the case where light transmission properties in a 0.85 μm band are required of a core, the core may favorably be constituted of PMMA, deuterated PMMA or a deuterated polyfluoromethacrylate (deuterated PMFA) as represented by the aforementioned structural formula (I). On the other hand, in the case where light transmission properties in a 1.3 μm band are required of a core, the core may favorably be constituted of deuterated PMMA or deuterated PFMA as represented by the aforementioned structural formula (I), or a silicone as represented by the aforementioned structural formula (V) or (VI). Further, in the case where light transmission properties in a 1.55 μm band are required of a core, the core may favorably be constituted of a silicone as represented by the structural formula (V) or (VI). On the other hand, in the case where a heat resistance has priority to a loss, the core may favorably be constituted of an epoxy resin as represented by any one of the aforementioned structural formulae (II) to (IV), or a silicone as represented by the structural formula (V) or (VI).

TABLE 1

| Core materials | | PMMA formula (I) | Deuterated PMMA and Deuterated PFMA formula(I) | Photosetting epoxy resin formulae (II)–(IV) | Silicone formulae (V)–(VI) |
| --- | --- | --- | --- | --- | --- |
| Loss (dB/cm) | 0.85 μmband | 0.04 | 0.02 | 0.08 | 0.08 |
| | 1.3 μmband | 0.3 | 0.07 | 0.3 | 0.1 |
| | 1.55 μmband | 0.8 | 1.3 | 2 | 0.2 |
| Solder heat resistance | | Δ | Δ | ○ | ○ |

In the foregoing Examples, polymethyl methacrylate, deuterated polyfluoromethacryaltes, polysiloxanes, epoxy resins, a quartz glass were used as the materials of waveguides by way of example. Needless to say, the process of the present invention can likewise be applied to known materials of optical waveguides, including polymeric materials such as polycarbonates, polyimides, polyamides, polyurethanes, polyacrylates, polyolefins, polyethers, silicone resins, benzocyclobutene (BCB), and acrylic resins; glass materials such as Pyrex glass, oxide glasses, fluoride glasses, and chalcogenide glasses; and other dielectric materials such as lithium niobate and GGG.

As described hereinbefore, the process for producing an optical deflector according to the present invention can be used to highly accurately and easily produce a high-performance reflection type optical deflector, which is expected to be an optical element effective, for example, in attaining a high level of integration of an optical module such as optical transmitter and receiver, and in reducing the assembling cost.

The present invention has been described in detail with respect to preferred embodiments, and it will now be that changes and modifications may be made without departing from the invention in its broader aspects, and it is the invention, therefore, in the appended claimed to cover all such changes and modifications as fall within the true spirit of the invention.

What is claimed is:

1. A blade for producing an optical deflector comprising an optical waveguide provided with a deflective oblique end face having a desired angle of inclination, and having a function of deflecting an optical path of light propagated through said optical waveguide to give rise to emergence of the light out of the plane of said optical waveguide or deflecting an optical path of light incident thereupon out of the plane of said optical waveguide to effect optical coupling thereof with said optical waveguide, while utilizing reflection on said oblique end face, said deflective oblique end face being formed by cutting using a dicing saw machine; characterized:

in that the blade has a blade tip, at least one side of which is set oblique by a predetermined angle.

2. A blade as claimed in claim 1, wherein the angle of inclination of said blade tip is set to be smaller than the desired angle of inclination of said oblique end face with a plane perpendicular to the optical axis of said optical waveguide.

3. A blade as claimed in claim 2, wherein the angle of inclination of said blade tip is set to be smaller by 0° to 2° than the desired angle of inclination of said oblique end face with a plane perpendicular to the optical axis of said optical waveguide.

4. A blade as claimed in claim 1 or 2, which has diamond grains of 1 µm to 5 µm in average grain size as abrasive grains.

5. An optical deflector comprising an optical waveguide provided with a deflective oblique end face having a desired angle of inclination, and having a function of deflecting an optical path of light propagated through said optical waveguide to give rise to emergence of the light out of the plane of said optical waveguide or deflecting an optical path of light incident upon said optical waveguide out of the plane of said optical waveguide to effect optical coupling thereof with said optical waveguide, while utilizing reflection on said oblique end face; characterized:

in that a plane of emergence or incidence having an inclination angle from 1 degree to 30 degrees relative to a plane perpendicular to the optical axis of said optical waveguide is formed in said optical waveguide in such a way as to face said oblique end face, while forming a V-shaped groove defined by said plane of emergence or incidence and said oblique end face in said optical waveguide.

6. An optical deflector as claimed in claim 5, wherein said V-shaped groove is filled with a substance having a reflective index close to that of the core material of said optical waveguide.

7. An optical deflector as claimed in claim 6, wherein said substance having a reflective index close to that of the core material of said optical waveguide is a resin.

8. An optical deflector as claimed in claim 5, wherein said optical waveguide is a planar optical waveguide.

9. An optical deflector as claimed in claim 5, wherein said optical waveguide is an optical fiber.

10. An optical deflector as claimed in claim 5, wherein the core and cladding of said optical waveguide are made of respective glass materials.

11. An optical deflector as claimed in claim 5, wherein the core of said optical waveguide is made of a glass material, and the cladding thereof is made of a polymeric material.

12. An optical deflector as claimed in claim 5, wherein the core and cladding of said optical waveguide are made of respective polymeric materials.

13. An optical deflector as claimed in claim 12, wherein said respective polymeric materials of said core and said cladding are polymers represented by the following structural formula (I), provided that the polymeric material of said cladding has a refractive index lower than that of the polymeric material of said core:

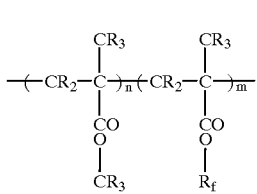

(wherein n and m stand for positive numbers satisfying the relationships: n+m=1, 0<n, and m<1; R stands for deuterium or hydrogen; $R_f$ stands for a substituent represented by $C_sF_{2s}+1$; and s is an integer of at least 1).

14. An optical deflector as claimed in claim 12, wherein said respective polymeric materials of said core and said cladding are epoxy resins each obtained by photo-setting one member selected from the group consisting of substances each represented by any one of the following structural formulae (II) to (IV), and mixtures thereof, provided that the polymeric material of said cladding has a refractive index lower than that of the polymeric material of said core:

(II)
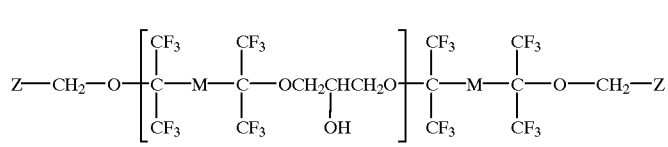

(wherein Z is

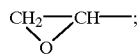

M is

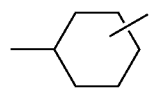

 or

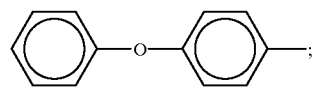;

n is 0 or an arbitrary natural number);

(III)

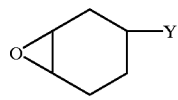

(wherein Y is

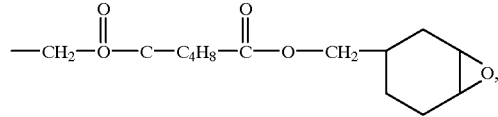

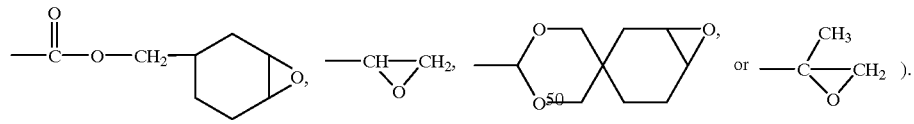

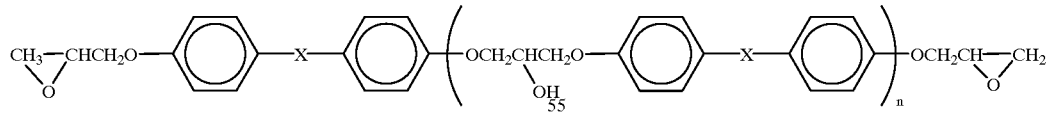

(IV)

(wherein X is

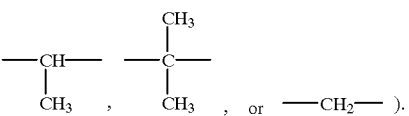, or —CH$_2$— ).

15. An optical deflector as claimed in claim 12, wherein said respective polymeric materials of said core and said cladding are polymers selected from the group consisting of polysiloxanes having recurring units represented by the following structural formula (V) or (VI), copolymerized polysiloxanes having recurring units represented by the same structural formula (V) or (VI), and mixtures thereof, provided that the polymeric material of said cladding has a refractive index lower than that of the polymeric material of said core:

(V)
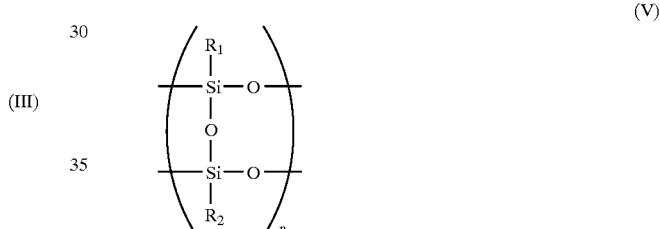

(VI)
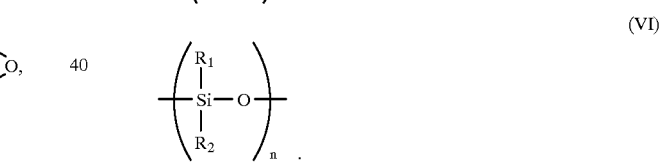

16. An optical deflector as claimed in claim 12, wherein the polymeric material of said core is a polymer represented by the structural formula (I) shown below, and the polymeric material of said cladding is an epoxy resin obtained by photo-setting one member selected from the group consisting of substances of the structural formulae (II) to (IV) shown below, and mixtures thereof:

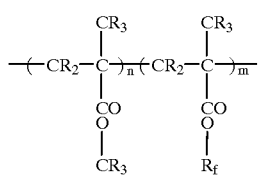  (I)

(wherein n and m stand for positive numbers satisfying the relationships: n+m=1, 0<n, and m<1; R stands for deuterium or hydrogen; $R_f$ stands for a substituent represented by $C_sF_{2s}+1$; and s is an integer of at least 1), n is 0 or an arbitrary

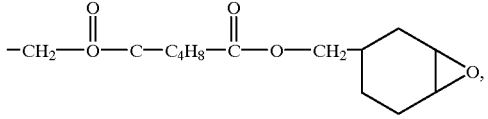  (III)

(wherein Y is

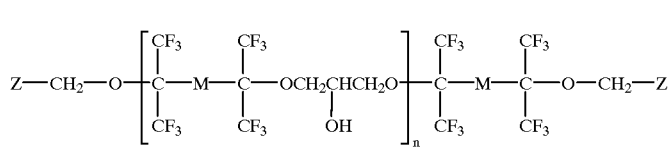  (II)

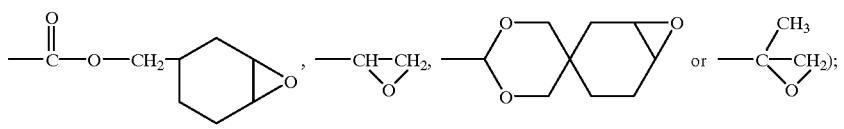

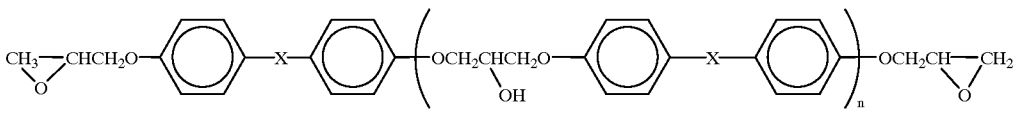  (IV)

(wherein Z is

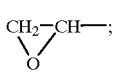

M is

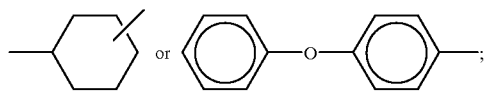

(wherein X is

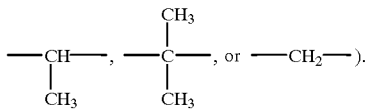

17. An optical deflector as claimed in claim 12, wherein the polymeric material of said core is a polymer selected from the group consisting of polysiloxanes having recurring units represented by the structural formula (V) or (VI) shown below, copolymerized polysiloxanes having recurring units represented by the same structural formula (V) or (VI), and mixtures thereof; and the polymeric material of said cladding is an epoxy resin obtained by photo-setting one member selected from the group consisting of substances of the structural formulae (II) to (IV) shown below, and mixtures thereof:

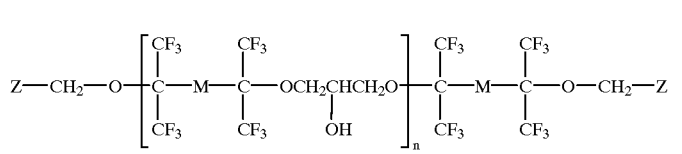
(II)

(wherein Z is

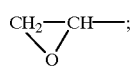

M is

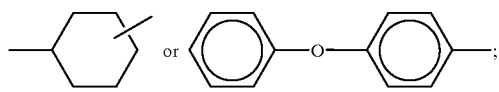

n is 0 or an arbitrary natural number);

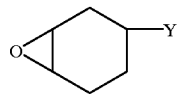
(III)

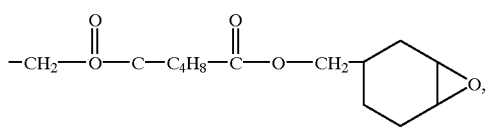

wherein Y is

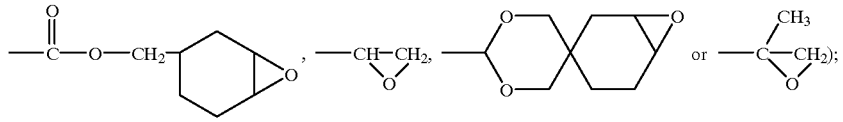

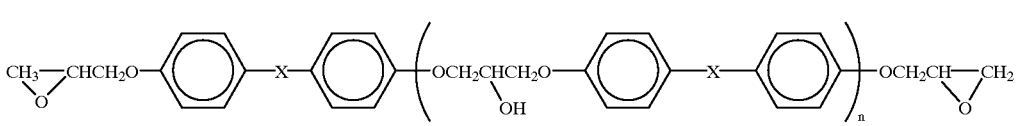
(IV)

(wherein X is

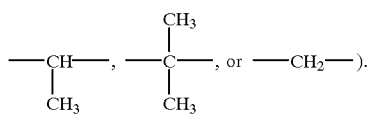

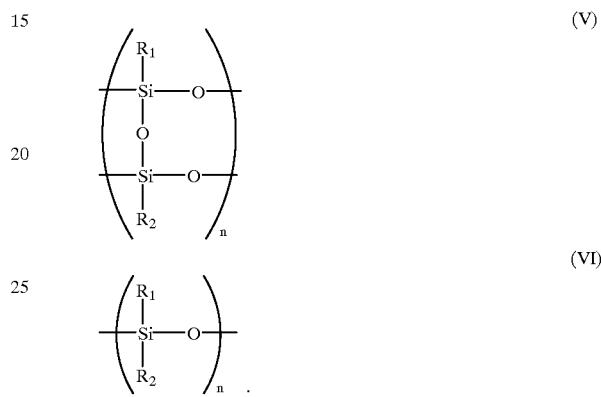
(V)

(VI)

18. An optical deflector comprising a planar optical waveguide provided with a deflective oblique end face having a desired angle of inclination, and having a function of deflecting an optical path of light propagated through said planar optical waveguide to give rise to emergence of the light out of the plane of said planar optical waveguide or deflecting an optical path of light incident upon said planar optical waveguide out of the plane of said planar optical waveguide to effect optical coupling thereof with said planar optical waveguide, while utilizing reflection on said oblique end face; characterized:

in that a plane of emergence or incidence substantially perpendicular to a plane perpendicular to the optical axis of said planar optical waveguide is formed in said planar optical waveguide in such a way as to face said oblique end face, while forming a V-shaped groove defined by said plane of emergence or incidence and said oblique end face in said planar optical waveguide; and in that said groove is filled with a substance having a reflective index close to that of the core material of said planar optical waveguide.

19. An optical deflector as claimed in claim 18, wherein said substance having a reflective index close to that of the core material of said optical waveguide is a resin.

20. An optical deflector as claimed in claim 18, wherein the core and cladding of said optical waveguide are made of respective glass materials.

21. An optical deflector as claimed in claim 18, wherein the core of said optical waveguide is made of a glass material, and the cladding thereof is made of a polymeric material.

22. An optical deflector as claimed in claim 18, wherein the core and cladding of said optical waveguide are made of respective polymeric materials.

23. An optical deflector as claimed in claim 22, wherein said respective polymeric materials of said core and said cladding are polymers represented by the following structural formula (I), provided that the polymeric material of said cladding has a refractive index lower than that of the polymeric material of said core:

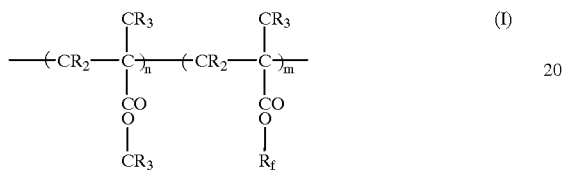
(I)

(wherein n and m stand for positive numbers satisfying the relationships: n+m=1, 0<n, and m<1; R stands for deuterium or hydrogen; $R_f$ stands for a substituent represented by $C_sF_{2s}+1$; and s is an integer of at least 1).

24. An optical deflector as claimed in claim 22, wherein said respective polymeric materials of said core and said cladding are epoxy resins each obtained by photo-setting one member selected from the group consisting of substances each represented by any one of the following structural formulae (II) to (IV), and mixtures thereof, provided that the polymeric material of said cladding has a refractive index lower than that of the polymeric material of said core:

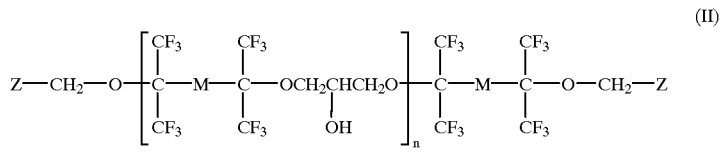
(II)

(wherein Z is

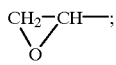

M is

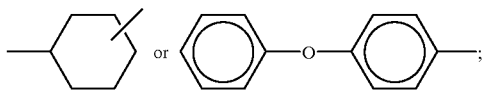

n is 0 or an arbitrary natural number);

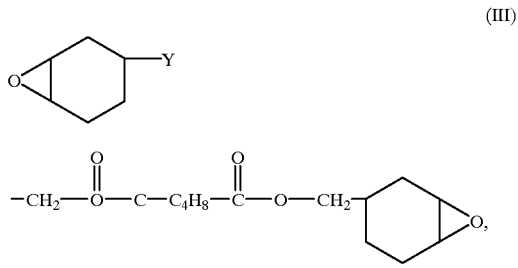
(III)

(wherein Y is

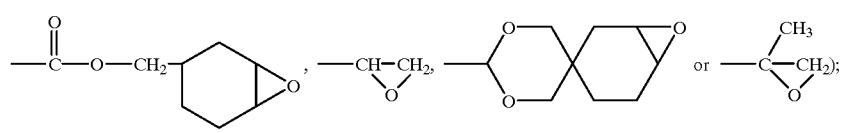

(IV)

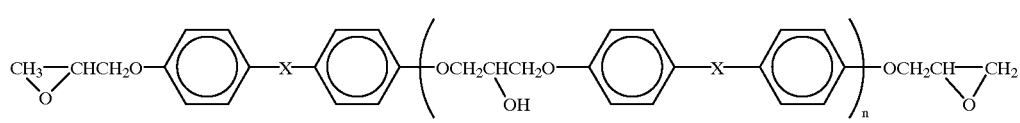

(wherein X is

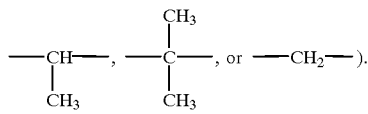

).

25. An optical deflector as claimed in claim 22, wherein said respective polymeric materials of said core and said cladding are polymers selected from the group consisting of polysiloxanes having recurring units represented by the following structural formula (V) or (VI), copolymerized polysiloxanes having recurring units represented by the same structural formula (V) or (VI), and mixtures thereof, provided that the polymeric material of said cladding has a refractive index lower than that of the polymeric material of said core:

(V)

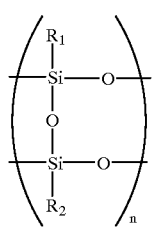

(VI)

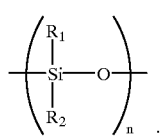

26. An optical deflector as claimed in claim 22, wherein the polymeric material of said core is a polymer represented by the structural formula (I) shown below, and the polymeric material of said cladding is an epoxy resin obtained by photo-setting one member selected from the group consisting of substances of the structural formulae (II) to (IV) shown below, and mixtures thereof:

(I)

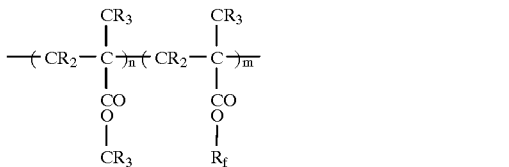

(wherein n and m stand for positive numbers satisfying the relationships: n+m=1, 0<n, and m<1; R stands for deuterium or hydrogen; $R_f$ stands for a substituent represented by $C_sF_{2s}+1$; and s is an integer of at least 1), (II)

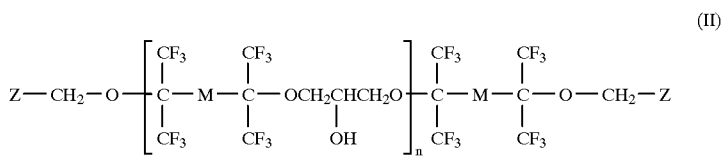

(wherein Z is

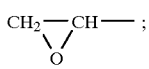

M is

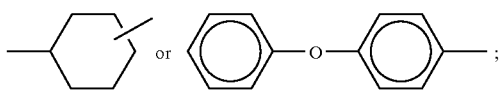

n is 0 or an arbitrary natural number);

(III)

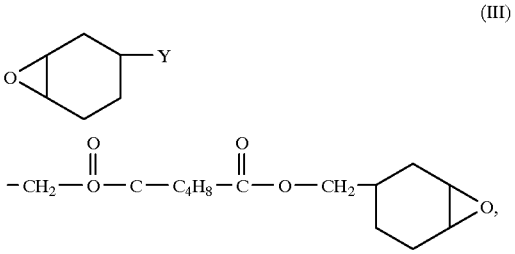

(wherein Y is

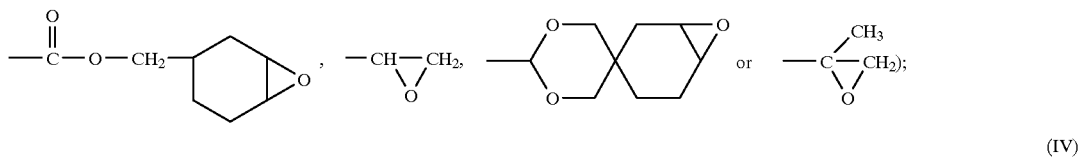

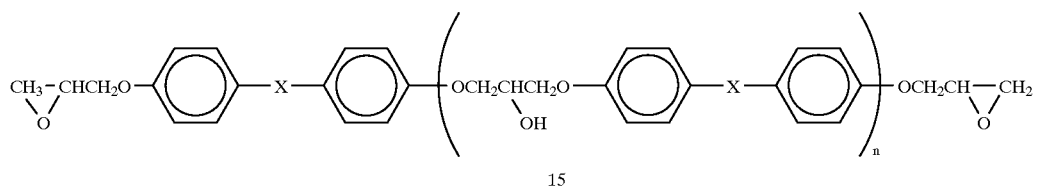

(wherein X is

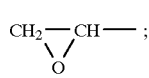

M is

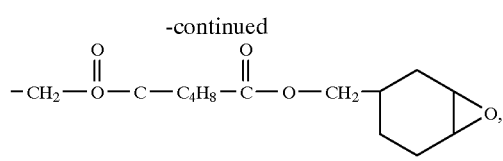

n is 0 or an arbitrary natural number);

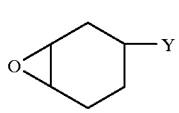

27. An optical deflector as claimed in claim 22, wherein the polymeric material of said core is a polymer selected from the group consisting of polysiloxanes having recurring units represented by the structural formula (V) or (VI) shown below, copolymerized polysiloxanes having recurring units represented by the same structural formula (V) or (VI), and mixtures thereof; and the polymeric material of said cladding is an epoxy resin obtained by photo-setting one member selected from the group consisting of substances of the structural formulae (II) to (IV) shown below, and mixtures thereof:

(wherein Z is

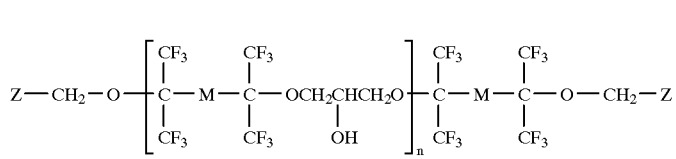

-continued (wherein Y is

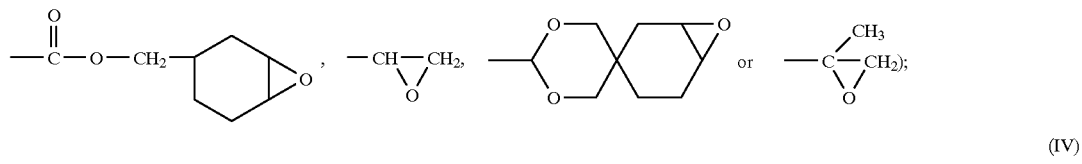

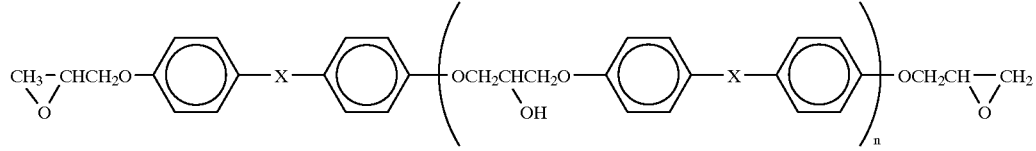

(wherein X is

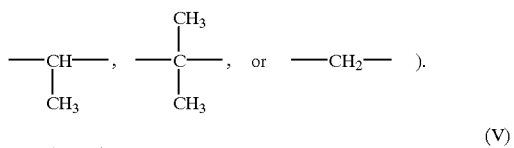

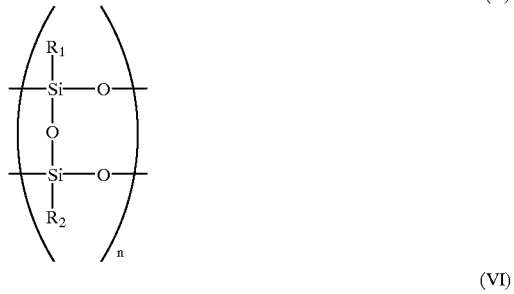

(V)

(VI)

28. A process for producing an optical deflector comprising an optical waveguide provided with a deflective oblique end face having a desired angle of inclination, and having a function of deflecting an optical path of light propagated through said optical waveguide to give rise to emergence of the light out of the plane of said optical waveguide or deflecting an optical path of light incident upon said optical waveguide out of the plane of said optical waveguide to effect optical coupling thereof with said optical waveguide, while utilizing reflection on said oblique end face; characterized:

in that a blade having a blade tip set oblique by a predetermined angle at least on one side thereof is perpendicularly pressed against said optical waveguide to effect cutting thereof using a dicing saw machine to thereby form a V-shaped groove having at least one inner side surface thereof serviceable as a desired oblique end face in said optical waveguide.

29. A process for producing an optical deflector as claimed in claim 28, wherein the angle of inclination of said blade tip is set to be smaller than the desired angle of inclination of said oblique end face relative to a plane perpendicular to the optical axis of said optical waveguide.

30. A process for producing an optical deflector as claimed in claim 29, wherein the angle of inclination of said blade tip is set to be smaller by 0° to 2° than the desired angle of inclination of said oblique end face relative to a plane perpendicular to the optical axis of said optical waveguide.

31. A process for producing an optical deflector as claimed in claim 28, wherein a diamond blade having diamond grains of 1 μm to 5 μm in average grain size is used as said blade for use in said cutting.

32. A process for producing an optical deflector as claimed in claim 28, wherein the core and cladding of said optical waveguide are made of respective glass materials.

33. A process for producing an optical deflector as claimed in claim 32, wherein said oblique end face, after formed, is immersed in a mixed solution of hydrogen fluoride and ammonium fluoride to effect a surface smoothing treatment of said oblique end face.

34. A process for producing an optical deflector as claimed in claim 28, wherein the core of said optical waveguide is made of a glass material, and the cladding thereof is made of a polymeric material.

35. A process for producing an optical deflector as claimed in claim 34, wherein said oblique end face, after formed, is immersed in a mixed solution of hydrogen fluoride and ammonium fluoride to effect a surface smoothing treatment of said oblique end face.

36. A process for producing an optical deflector as claimed in claim 28, wherein the core and cladding of said optical waveguide are made of respective polymeric materials.

37. An optical deflector as claimed in claim 36, wherein said respective polymeric materials of said core and said cladding are polymers represented by the following structural formula (I), provided that the polymeric material of said cladding has a refractive index lower than that of the polymeric material of said core:

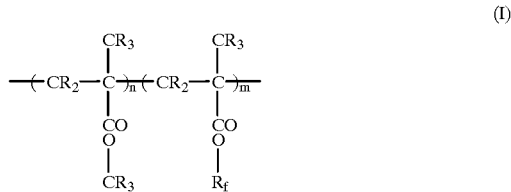

(I)

(wherein n and m stand for positive numbers satisfying the relationships: n+m=1, 0<n, and m<1; R stands for deuterium or hydrogen; $R_f$ stands for a substituent represented by $C_sF_{2s}+1$; and s is an integer of at least 1).

38. An optical deflector as claimed in claim 36, wherein said respective polymeric materials of said core and said cladding are epoxy resins each obtained by photo-setting one member selected from the group consisting of substances each represented by any one of the following structural formulae (II) to (IV), and mixtures thereof, provided that the polymeric material of said cladding has a refractive index lower than that of the polymeric material of said core:

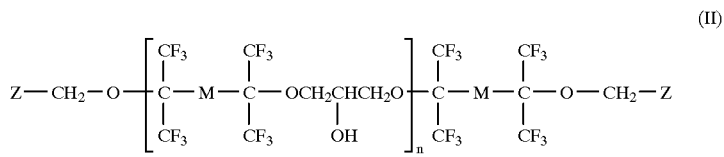

(II)

(wherein Z is

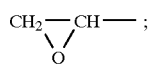

M is

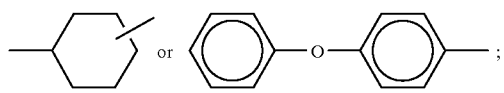

n is 0 or an arbitrary natural number);

(III)

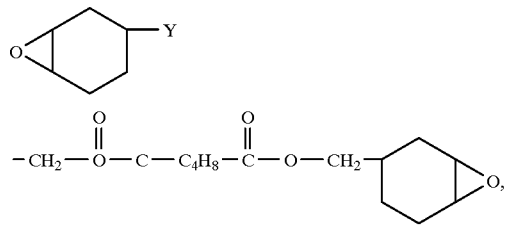

(wherein Y is

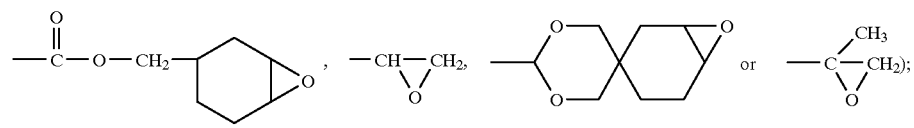

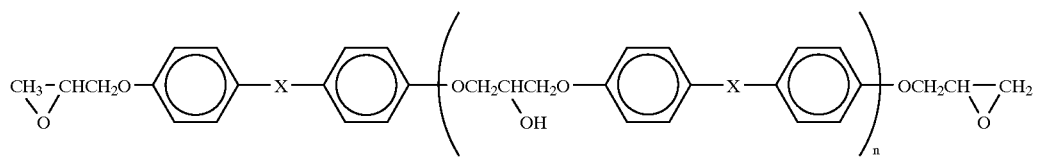

(wherein X is

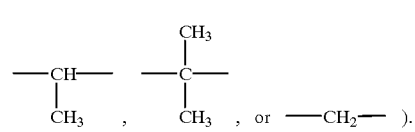

39. An optical deflector as claimed in claim 36, wherein said respective polymeric materials of said core and said cladding are polymers selected from the group consisting of polysiloxanes having recurring units represented by the following structural formula (V) or (VI), copolymerized polysiloxanes having recurring units represented by the same structural formula (V) or (VI), and mixtures thereof, provided that the polymeric material of said cladding has a refractive index lower than that of the polymeric material of said core:

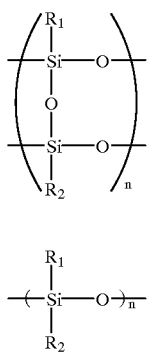

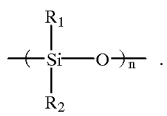

40. An optical deflector as claimed in claim 36, wherein the polymeric material of said core is a polymer represented by the structural formula (I) shown below, and the polymeric material of said cladding is an epoxy resin obtained by photo-setting one member selected from the group consisting of substances of the structural formulae (II) to (IV) shown below, and mixtures thereof:

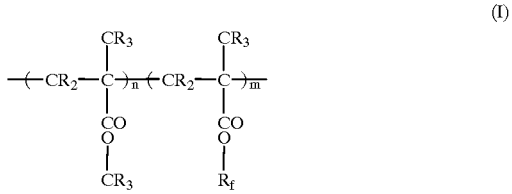

(wherein n and m stand for positive numbers satisfying the relationships: n+m=1, 0<n, and m<1; R stands for deuterium or hydrogen; $R_f$ stands for a substituent represented by $C_sF_{2s}+1$; and s is an integer of at least 1), (II)

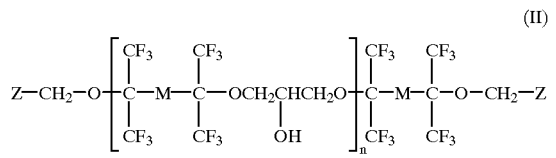

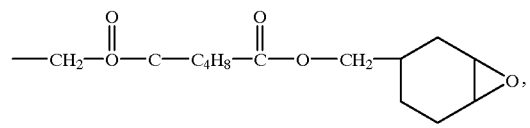

(wherein Y is

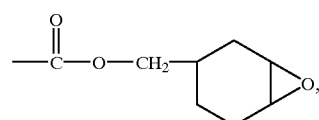

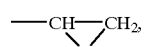

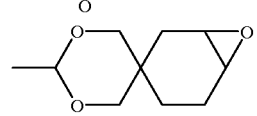

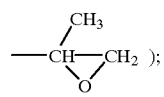

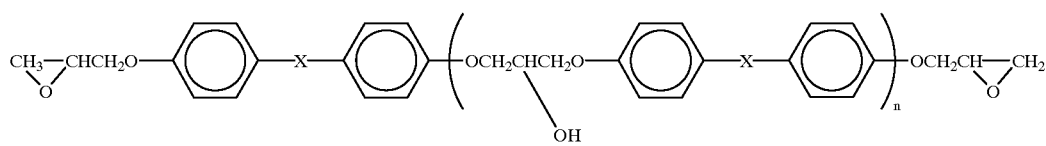

(where in Z

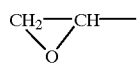

M is

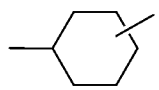

or

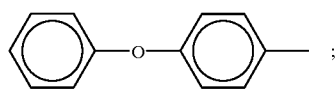

n is 0 or an arbitrary natural number);

(III)

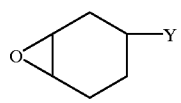

(wherein X is

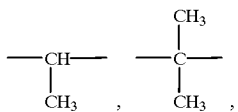

41. An optical deflector as claimed in claim 36, wherein the polymeric material of said core is a polymer selected from the group consisting of polysiloxanes having recurring units represented by the structural formula (V) or (VI) shown below, copolymerized polysiloxanes having recurring units represented by the same structural formula (V) or (VI), and mixtures thereof; and the polymeric material of said cladding is an epoxy resin obtained by photo-setting one member selected from the group consisting of substances of the structural formulae (II) to (IV) shown below, and mixtures thereof:

(II)

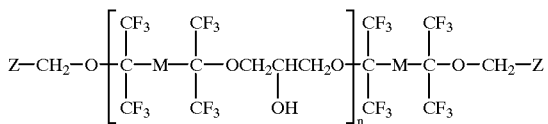

(wherein Z is

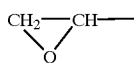

M is

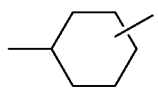

or

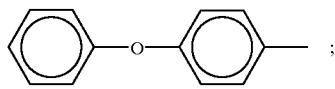;

n is 0 or an arbitrary natural number);

(III)

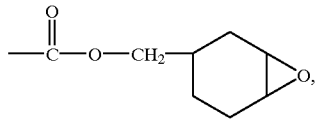

(wherein Y is

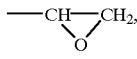

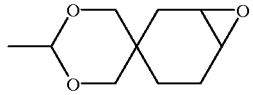

or

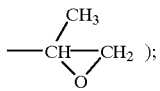);

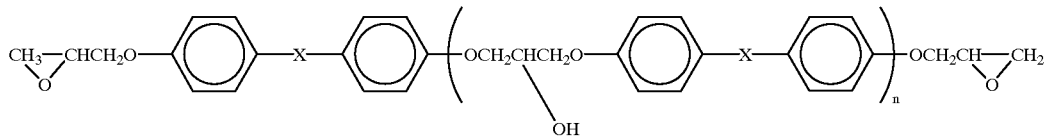

(wherein X is

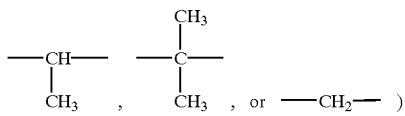

-continued (V)

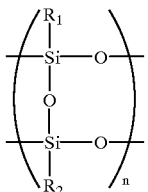

(VI)

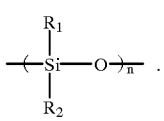

42. A process for producing an optical deflector as claimed in claim 36, wherein, after formation of said oblique end face, a flatiron heated at a high temperature is pressed against said oblique end face to effect a surface smoothing treatment of said oblique end face.

43. A process for producing an optical deflector as claimed in claim 36, wherein said oblique end face, after formed, is immersed in an organic solvent to effect a surface smoothing treatment of said oblique end face.

44. A process for producing an optical deflector as claimed in claim 28, wherein said oblique end face, after formed, is coated with a metal.

45. A process for producing an optical deflector as claimed in claim 28, wherein said optical waveguide is a planar optical waveguide.

46. A process for producing an optical deflector as claimed in claim 28, wherein said optical waveguide is an optical fiber.

(IV)

47. A process for producing an optical deflector as claimed in claim 46, wherein an end portion of the optical fiber, including a portion to be subjected to cutting, is fixed on a planar substrate with an adhesive film, and then cut while perpendicularly pressing a blade having a blade tip thereof provided with an angle of Inclination against said optical fiber.

48. A process for producing an optical deflector as claimed in claim 47, wherein said adhesive film is an ultraviolet-degradable adhesive film.

49. A process for producing an optical deflector as claimed in claim 46, wherein an end portion of said optical fiber, including a portion to be subjected to cutting, is fixed on a planar substrate with an ultraviolet-curing resin or a thermosetting resin, and then cut while perpendicularly pressing a blade having a blade tip thereof provided with an angle of inclination against said optical fiber.

* * * * *